United States Patent
Chida et al.

(10) Patent No.: US 10,715,804 B2
(45) Date of Patent: Jul. 14, 2020

(54) ENCODING APPARATUS AND ENCODING METHOD AS WELL AS DECODING APPARATUS AND DECODING METHOD

(71) Applicant: SONY CORPORATION, Tokyo (JP)

(72) Inventors: Keisuke Chida, Saitama (JP); Takahiro Nagano, Kanagawa (JP); Kenichiro Hosokawa, Kanagawa (JP); Takuro Kawai, Tokyo (JP); Ohji Nakagami, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/094,084

(22) PCT Filed: Apr. 7, 2017

(86) PCT No.: PCT/JP2017/014454
§ 371 (c)(1),
(2) Date: Oct. 16, 2018

(87) PCT Pub. No.: WO2017/183479
PCT Pub. Date: Oct. 26, 2017

(65) Prior Publication Data
US 2019/0132589 A1 May 2, 2019

(30) Foreign Application Priority Data
Apr. 22, 2016 (JP) .................... 2016-086215

(51) Int. Cl.
*H04N 19/117* (2014.01)
*H04N 19/14* (2014.01)
(Continued)

(52) U.S. Cl.
CPC ............. *H04N 19/117* (2014.11); *G06T 7/40* (2013.01); *H04N 19/11* (2014.11); *H04N 19/14* (2014.11);
(Continued)

(58) Field of Classification Search
CPC .. H04N 19/117; H04N 19/147; H04N 19/172; H04N 19/65; G06T 7/40; G06T 2207/20024; G06T 2207/10016
See application file for complete search history.

(56) References Cited

U.S. PATENT DOCUMENTS 5,647,024 A   7/1997  Kawauchi et al.
5,832,128 A * 11/1998 Suzuki ................... H04N 19/60
                                                              382/246
(Continued)

FOREIGN PATENT DOCUMENTS

AT         535890 T       12/2011
AT         537522 T       12/2011
(Continued)

OTHER PUBLICATIONS

Dumitras, et al., "An Encoder-Decoder Texture Replacement Method With Application to Content-Based Movie Coding", IEEE Transactions on Circuits and Systems for Video Technology, vol. 14, Issue 6, Jun. 2004, pp. 825-840.
(Continued)

*Primary Examiner* — Shawn S An
(74) *Attorney, Agent, or Firm* — Chip Law Group

(57) ABSTRACT

Provided is an encoding apparatus, an encoding method, a decoding apparatus, and a decoding method by which a transmission efficiency and picture quality can be improved. The encoding apparatus encodes an input image by a non-reversible encoding method and transmits identification information for identifying match components that are, from among a plurality of texture components registered in a database, texture components that match with the input image and encoded data obtained by encoding the input image. The decoding apparatus receives the encoded data and the identification information, decodes the encoded data into a decoded image, and synthesizes the texture compo-
(Continued)

nent as the match component identified by the identification information from among a plurality of texture components registered in a database and the decoded image. The present technology can be applied, for example, to a codec or the like by which an image is encoded and decoded.

15 Claims, 35 Drawing Sheets

(51) Int. Cl.
*H04N 19/176* (2014.01)
*H04N 19/11* (2014.01)
*H04N 19/147* (2014.01)
*H04N 19/172* (2014.01)
*H04N 19/65* (2014.01)
*G06T 7/40* (2017.01)
*H04N 19/94* (2014.01)

(52) U.S. Cl.
CPC ......... *H04N 19/147* (2014.11); *H04N 19/172* (2014.11); *H04N 19/176* (2014.11); *H04N 19/65* (2014.11); *G06T 2207/10016* (2013.01); *G06T 2207/20024* (2013.01); *H04N 19/94* (2014.11)

(56) References Cited

U.S. PATENT DOCUMENTS

| | | | | |
|---|---|---|---|---|
| 5,835,237 | A * | 11/1998 | Ebrahimi | G06T 9/20 358/448 |
| 2009/0067495 | A1* | 3/2009 | Au | H04N 19/176 375/240.12 |
| 2010/0079609 | A1* | 4/2010 | Hwang | G06T 3/4053 348/222.1 |
| 2012/0288015 | A1 | 11/2012 | Zhang et al. | |
| 2013/0136372 | A1* | 5/2013 | Thoreau | G06T 9/004 382/233 |
| 2013/0266079 | A1* | 10/2013 | Huang | H04N 19/56 375/240.26 |
| 2014/0064630 | A1* | 3/2014 | Racape | G06T 11/001 382/250 |

FOREIGN PATENT DOCUMENTS

| | | |
|---|---|---|
| CN | 102726044 A | 10/2012 |
| CN | 102918838 A | 2/2013 |
| CN | 103229213 A | 7/2013 |
| DE | 69516923 D1 | 6/2000 |
| EP | 0671845 A1 | 9/1995 |
| EP | 2118852 A1 | 11/2009 |
| EP | 2136336 A1 | 12/2009 |
| EP | 2526699 A1 | 11/2012 |
| EP | 2553926 A1 | 2/2013 |
| EP | 2646984 A1 | 10/2013 |
| EP | 2651130 A1 | 10/2013 |
| FR | 2958489 A1 | 10/2011 |
| JP | 07-250247 A | 9/1995 |
| JP | 2013-518464 A | 5/2013 |
| JP | 2013-524597 A | 6/2013 |
| JP | 2014-503885 A | 2/2014 |
| KR | 10-0205491 B1 | 7/1999 |
| KR | 10-2012-0006926 A | 1/2012 |
| KR | 10-2012-0118465 A | 10/2012 |
| KR | 10-2013-0024909 A | 3/2013 |
| KR | 10-2014-0000241 A | 1/2014 |
| TW | 201342901 A | 10/2013 |
| WO | 2008/106995 A1 | 9/2008 |
| WO | 2011/090798 A1 | 7/2011 |
| WO | 2011/120894 A1 | 10/2011 |
| WO | 2012/072402 A1 | 6/2012 |

OTHER PUBLICATIONS

International Search Report and Written Opinion of PCT Application No. PCT/JP2017/014454, dated Jul. 4, 2017, 09 pages of ISRWO.

Dumitras, et al., "An Encoder-Decoder Texture Replacement Method With Application to Content-Based Movie Coding", IEEE Transactions on Circuits and System for Video Technology, vol. 14, Issue 6, Jun. 2004, 16 pages.

Extended European Search Report of EP Patent Application No. 17785821.4, dated Jan. 18, 2019, 10 pages.

Adriana Dumitras, "An Encoder-Decoder Texture Replacement Method With Application to Content-Based Movie Coding", IEEE Transactions on Circuits and System for Video Technology, vol. 14, No. 6, Jun. 2004, pp. 825-840.

Dumitras, et al., "An Encoder-Decoder Texture Replacement Method With Application to Content-Based Movie Coding", IEEE Transactions on Circuits and Systems for Video Technology, vol. 14, No. 6, Jun. 2004, 825-840 pages.

* cited by examiner

F I G. 2
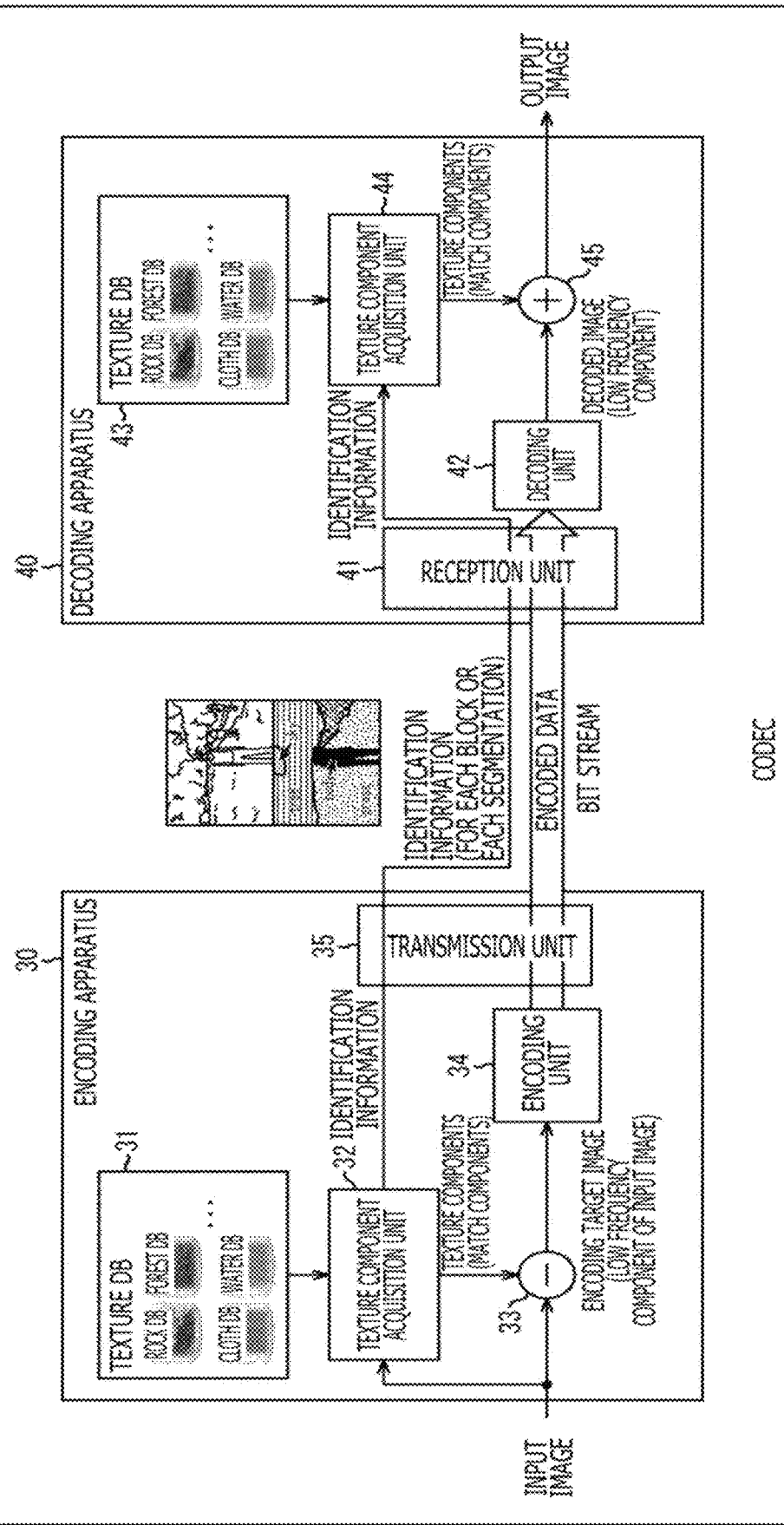

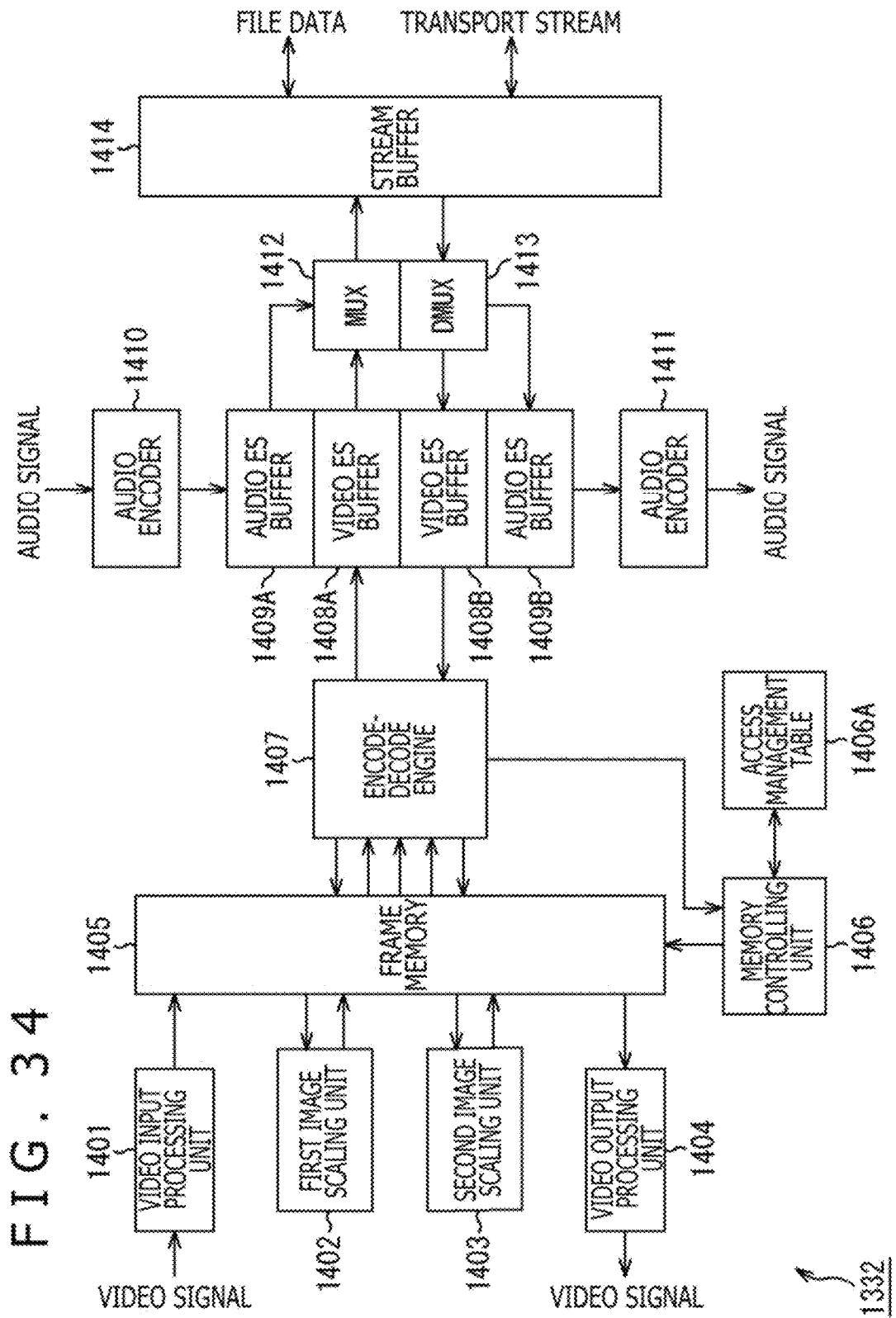
F I G. 34

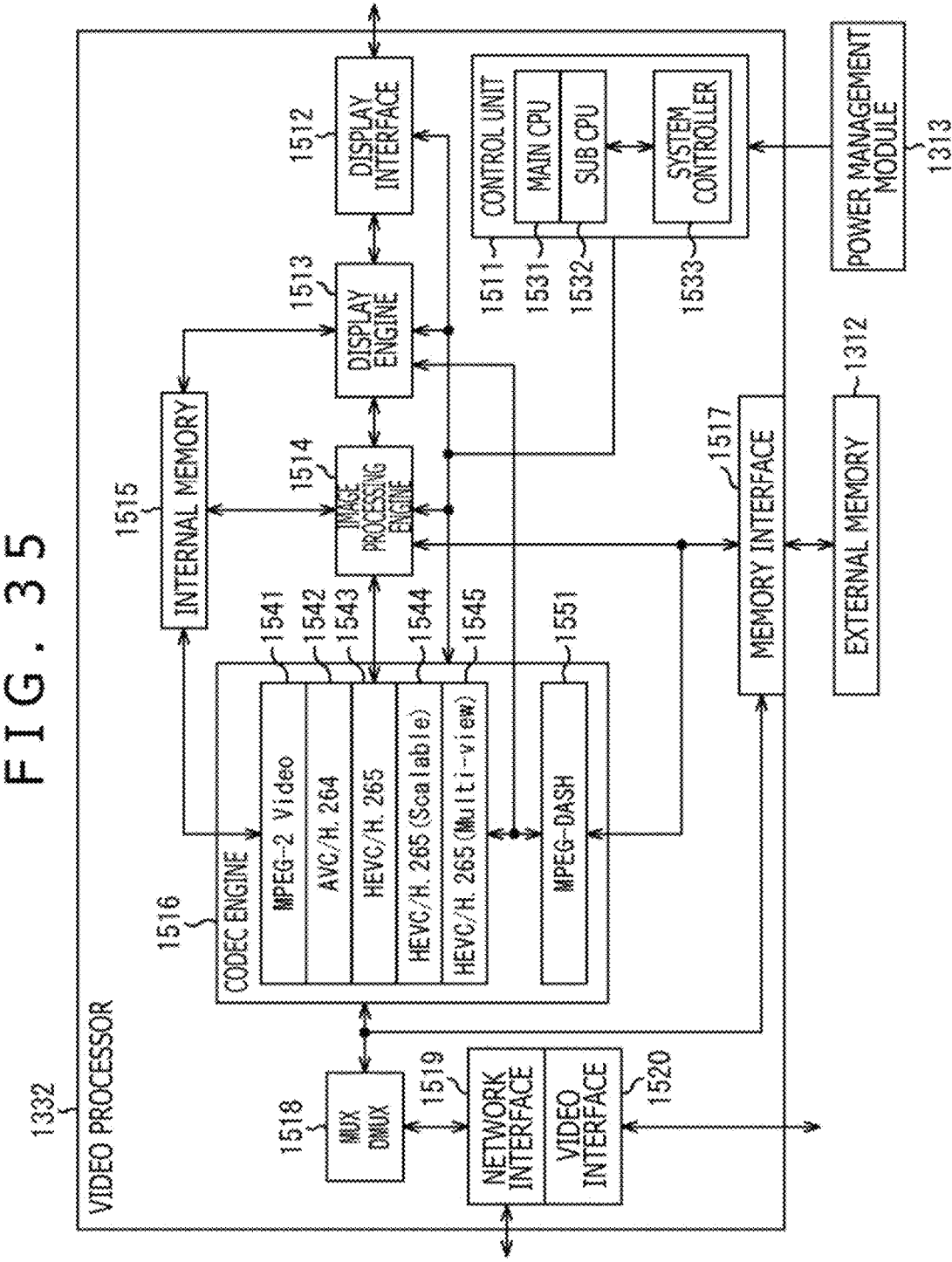

ENCODING APPARATUS AND ENCODING METHOD AS WELL AS DECODING APPARATUS AND DECODING METHOD

CROSS REFERENCE TO RELATED APPLICATIONS

This application is a U.S. National Phase of International Patent Application No. PCT/JP2017/014454 filed on Apr. 7, 2017, which claims priority benefit of Japanese Patent Application No. JP 2016-086215 filed in the Japan Patent Office on Apr. 22, 2016. Each of the above-referenced applications is hereby incorporated herein by reference in its entirety.

TECHNICAL FIELD

The present technology relates to an encoding apparatus and an encoding method as well as a decoding apparatus and a decoding method, and particularly to an encoding apparatus and an encoding method as well as a decoding apparatus and a decoding method by which, for example, a transmission efficiency and picture quality can be improved.

BACKGROUND ART

In an image, a texture is, for example, fine patterns or the like in an image and frequently is a signal of a high frequency (high frequency band). For example, in an encoding method based on FFT (Fast Fourier Transform) (frequency band resolution) such as AVC (Advanced Video Coding), an image is degraded mainly from high frequency components, and therefore, (part of) a texture of the image is lost and the picture quality of an image obtained on the decoding side is degraded.

As a method for suppressing degradation of the picture quality caused by loss of a texture of an image, a method is available by which, in order to restore a texture lost upon encoding of an image, a texture of an image is transmitted separately in addition to encoded data of an encoded image (for example, refer to PTL 1 or NPL 1).

For example, in the method based on NPL 1, texture components are removed from an original image in an encoding apparatus and the original image after the texture components are removed is encoded. Then, in the encoding apparatus, a small amount of texture components (image) and synthesis parameters are transmitted together with encoded data obtained by encoding.

On the other hand, in a decoding apparatus, the encoded data is decoded and the texture components from the encoding apparatus are synthesized with a decoded image obtained by the decoding using the synthesis parameters and then a restoration image obtained by restoring the original image is generated.

In PTL 1, a technology is proposed in which, in an encoding apparatus, a texture (texture pattern) is reduced and transmitted and, in a decoding apparatus, the reduced texture is enlarged by a super-resolution technology.

CITATION LIST

Patent Literature

[PTL 1]
WO 2011/090798
[NPL 2]
A. Dumitras and B. Haskell: "An Encoder-Decoder Texture Replacement Method with Application to Content-Based Movie Coding," IEEE Transaction son Circuits and Systems for Video Technology, vol. 14, No. 6, June 2004

SUMMARY

Technical Problems

In the case where the number of texture components (number of patterns) transmitted from the encoding apparatus to the decoding apparatus is small, the texture of an input image cannot be restored sufficiently and the picture quality of the restoration image is degraded.

Although, if the number of texture components to be transmitted from the encoding apparatus to the decoding apparatus is increased, then the picture quality of the restoration image can be improved. However, the transmission efficiency degrades as the number of texture components transmitted from the encoding apparatus to the decoding apparatus increases.

It is to be noted that, although a method is available by which an image having a fixed pattern or random noise or the like is deformed to restore a texture, according to such a method as just described, it is difficult to generate a pattern like a thin line and a sufficient number of textures cannot be represented.

Further, by an indeterminate problem that, in the case where a reduced texture is enlarged by a super-resolution technology, it is difficult to restore high frequency components of a texture lost upon reduction, the expressiveness of the texture degrades in comparison with that in the case where a texture is transmitted without reduction.

The present technology has been made in view of such a situation as described above, and it is an object of the present disclosure to improve the transmission efficiency and picture quality.

Solution to Problems

The encoding apparatus of the present technology is an encoding apparatus including an encoding unit configured to encode an input image by a non-reversible encoding method, a database in which a plurality of texture components are registered, and a transmission unit configured to transmit identification information for identifying match components that are, from among the plurality of texture components registered in the database, the texture components that match with the input image and encoded data obtained by encoding the input image.

The encoding method of the present technology is an encoding method including encoding an input image by a non-reversible encoding method, and transmitting identification information for identifying a match component that is a texture component that matches with the input image from among a plurality of texture components registered in a database in which the plurality of texture components are registered and encoded data obtained by encoding the input image.

In the encoding apparatus and the encoding method of the present technology, an input image is encoded by a non-reversible encoding method, and identification information for identifying a match component that is a texture component that matches with the input image from among a plurality of texture components registered in a database in which the plurality of texture components are registered and encoded data obtained by encoding the input image are transmitted.

The decoding apparatus of the present technology is a decoding apparatus including a reception unit configured to receive encoded data obtained by encoding an input image by a non-reversible encoding method and identification information for identifying a match component that is a texture component that matches with the input image, a decoding unit configured to decode the encoded data into a decoded image, a database in which a plurality of texture components are registered, and a synthesis unit configured to synthesize the texture component as the match component identified by the identification information from among the plurality of texture components registered in the database and the decoded image.

The decoding method of the present technology is a decoding method including receiving encoded data obtained by encoding an input image by a non-reversible encoding method and identification information for identifying a match component that is a texture component that matches with the input image, decoding the encoded data into a decoded image, and synthesizing the texture component as the match component identified by the identification information from among a plurality of texture components registered in a database in which the plurality of texture components are registered and the decoded image.

In the decoding apparatus and the decoding method of the present technology, encoded data obtained by encoding an input image by a non-reversible encoding method and identification information for identifying a match component that is a texture component that matches with the input image are received. Then, the encoded data is decoded into a decoded image, and the texture component as the match component identified by the identification information from among a plurality of texture components registered in a database in which the plurality of texture components are registered and the decoded image are synthesized.

It is to be noted that the encoding apparatus and the decoding apparatus can be implemented by causing a computer to execute a program.

Further, the program to be executed by a computer can be provided by transmitting the same through a transmission medium or by recording the same on a recording medium.

Furthermore, the encoding apparatus and the decoding apparatus may each be an independent apparatus or an internal block that configures one apparatus.

Advantageous Effect of Invention

With the present technology, the transmission efficiency and picture quality can be improved.

It is to be noted that the advantageous effect described herein is not necessarily restrictive, and any advantageous effect described in the present disclosure may be applicable.

BRIEF DESCRIPTION OF DRAWINGS

FIG. 2 is a block diagram depicting a second example of a configuration of a codec that restores a texture lost upon encoding.

FIG. 34 is a block diagram depicting an example of a schematic configuration of a video processor.

FIG. 35 is a block diagram depicting another example of a schematic configuration of the video processor.

DESCRIPTION OF EMBODIMENTS

<First Example of Configuration of Codec>

Figure 1:
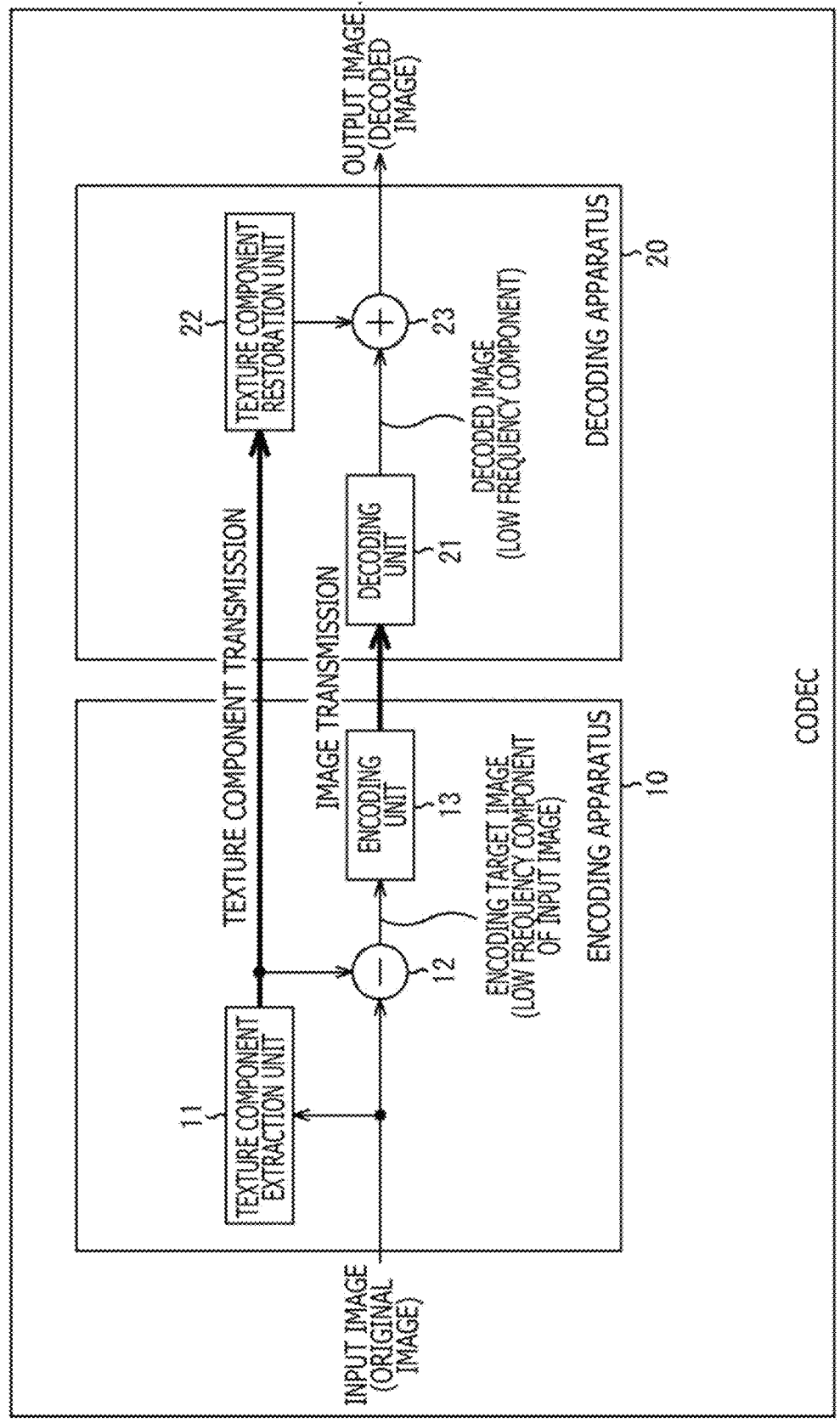
FIG. 1 is a block diagram depicting a first example of a configuration of a codec that restores a texture lost upon encoding.

FIG. 1 is a block diagram depicting a first example of a configuration of a codec that restores of a texture lost upon encoding.

Referring to FIG. 1, the codec includes an encoding apparatus 10 and a decoding apparatus 20.

The encoding apparatus 10 includes a texture component extraction unit 11, a removal unit 12 and an encoding unit 13.

An original image (moving picture, still picture) as an input image inputted to the encoding apparatus 10 is supplied to the texture component extraction unit 11.

The texture component extraction unit 11 extracts and supplies texture components of an input image from the input image to the removal unit 12 and transmits the texture components to the decoding apparatus 20.

Not only the texture components of the input image but also the input image is supplied from the texture component extraction unit 11 to the removal unit 12.

The removal unit 12 arithmetically operates the difference between the input image and a texture component of the input image from the texture component extraction unit 11 to remove the texture component of the input image from the input image and supplies the input image from which the texture component is removed as an encoding target image of a target of encoding by the encoding unit 13 to the encoding unit 13.

Here, the encoding target image obtained by the removal unit 12 is an image obtained by removing a texture component from the input image, namely, an image from which a high frequency component is removed, and therefore, can be regarded as a low frequency component of the input image.

The encoding unit 13 encodes the encoding target image from the removal unit 12 by a non-reversible (irreversible) encoding method such as, for example, MPEG (Moving Picture Experts Group), AVC, HEVC (High Efficiency Video Coding) or some other method as a hybrid method that is a combination of predictive coding and orthogonal transformation, and transmits encoded data obtained as a result of the encoding to the decoding apparatus 20.

Here, in encoding of the non-reversible encoding method by the encoding unit 13, since an image is converted into a signal of the frequency domain and the signal of the frequency domain is quantized as in AVC or the like, a frequency component included in the image and having a low level, namely, for example, a high frequency component such as a texture component or the like is lost.

The decoding apparatus 20 includes a decoding unit 21, a texture component restoration unit 22 and a synthesis unit 23.

The decoding unit 21 accepts encoded data transmitted from (the encoding unit 13 of) the encoding apparatus 10 by receiving the encoded data and decodes the encoded data by a method corresponding to the encoding method of the encoding unit 13. The decoding unit 21 supplies a decoded image obtained by the decoding of the encoded data to the synthesis unit 23.

Here, the decoded image obtained by the decoding unit 21 corresponds to a low frequency component of an encoding target image, namely, of the input image.

The texture component restoration unit 22 receives a texture component transmitted from (the texture component extraction unit 11 of) the encoding apparatus 10, performs necessary processing to restore the texture component of the input image and supplies the restored texture component to the synthesis unit 23.

The synthesis unit 23 synthesizes a low frequency component of the input image as the decoded image from the decoding unit 21 and a texture component of the input image from the texture component restoration unit 22 to generate a restoration image that restores the input image (original image), and outputs the restoration image as an output image outputted from the decoding apparatus 20.

In the codec of FIG. 1, since a texture component of an input image is transmitted from the encoding apparatus 10 to the decoding apparatus 20, the decoding apparatus 20 can obtain an output image in which the texture of the input image is restored, namely, can improve the picture quality of the output image.

However, in the codec of FIG. 1, since a texture component of an input image is transmitted from the encoding apparatus 10 to the decoding apparatus 20, the transmission efficiency degrades.

Although the transmission efficiency can be improved by decreasing the number of texture components (pattern number) to be transmitted from the encoding apparatus 10 to the decoding apparatus 20, if the number of texture components to be transmitted from the encoding apparatus 10 to the decoding apparatus 20 is decreased, then the picture quality of the output image degrades.

<Second Example of Configuration of Codec>

FIG. 2 is a block diagram depicting a second example of a configuration of a codec that restores a texture lost by encoding.

Referring to FIG. 2, the codec includes an encoding apparatus 30 and a decoding apparatus 40.

The encoding apparatus 30 includes a texture DB (database) 31, a texture component acquisition unit 32, a removal unit 33, an encoding unit 34 and a transmission unit 35.

In the texture DB 31, texture components of various patterns, namely, a plurality of texture components (of a plurality of kinds of textures), are registered.

To the texture component acquisition unit 32, an original image as an input image is supplied.

The texture component acquisition unit 32 acquires, for each predetermined block of an input image, a match component that is a texture component that best matches with the block from among the texture components registered in the texture DB 31 and supplies the acquired match component to the removal unit 33. In particular, the texture component acquisition unit 32 acquires a texture component that, for example, minimizes the sum total of square errors of pixel values from a predetermined block of the input image as a match component from texture components registered in the decoding unit 21 and supplies the match component to the removal unit 33.

Furthermore, the texture component acquisition unit 32 supplies identification information for identifying the match component to the transmission unit 35.

Here, in the texture DB 31, the texture component is registered together with unique identification information for identifying the texture component.

To the removal unit 33, not only the match component is supplied from the texture component acquisition unit 32, but also the input image is supplied.

The removal unit 33 arithmetically operates the difference between the input image and the match component of the input image from the texture component acquisition unit 32 to remove the texture component as the match component of the input image, and supplies the input image, from which the texture component is removed, as an encoding target image of a target of encoding by the encoding unit 34 to the encoding unit 34.

Here, the encoding target image obtained from the removal unit 33 is an image obtained by removing the texture component, namely, a high frequency component, from the input image, and therefore, it can be regarded that it is a low frequency component of the input image.

The encoding unit 34 encodes the encoding target image from the removal unit 33 by a non-reversible encoding method such as, for example, MPEG, AVC, HEVC or some other method and supplies encoded data obtained as a result of the encoding to the transmission unit 35.

In FIG. 2, the encoding target image of the encoding unit 34 is the input image from which the texture component is removed and efficient encoding can be performed, namely, the data mount of encoded data can be reduced, in comparison with that in the case where the input image itself is an encoded target image.

Here, in the encoding of the non-reversible encoding method by the encoding unit 34, since an image is converted into a signal in the frequency domain and the signal in the frequency domain is quantized, a high frequency component such as a texture component or the like is lost similarly as in the encoding unit 13 of FIG. 1.

The transmission unit 35 transmits identification information from the texture component acquisition unit 32 and encoded data from the encoding unit 34. The identification information and the encoded data transmitted from the transmission unit 35 are supplied to the decoding apparatus 40 through a transmission medium not depicted or is recorded on a recording medium not depicted and is then read out from the recording medium and supplied to the decoding apparatus 40.

It is to be noted that the transmission unit 35 can transmit the identification information and the encoded data separately from each other and also it is possible for the transmission unit 35 to transmit them integrally, namely, to multiplex and transmit the identification information and the encoded data or the like.

Further, since the texture component acquisition unit 32 acquires, for each predetermined block of the input image, a match component that is a texture component that best matches with the block, the match component and hence the identification information can be obtained for each block.

The transmission unit 35 not only can transmit the identification information for each block but also can transmit the identification information in a unit of segmentation greater than a block, namely, collectively in a unit of a frame or the like.

The decoding apparatus 40 includes a reception unit 41, a decoding unit 42, a texture DB 43, a texture component acquisition unit 44 and a synthesis unit 45.

The reception unit 41 accepts by receiving encoded data and identification information transmitted from the transmission unit 35 or the like, and supplies the encoded data to the decoding unit 42 and supplies the identification information to the texture component acquisition unit 44.

The decoding unit 42 decodes the encoded data from the reception unit 41 by a method corresponding to the encoding method of the encoding unit 34 and supplies a decoded image obtained as a result of the decoding to the synthesis unit 45.

Here, the decoded image obtained by the decoding unit 42 corresponds to an encoding target image, namely, here, to a low frequency component of the input image.

In the texture DB 43, texture components of various patterns, namely, a plurality of texture components, are registered. For example, in the texture DB 43, at least a plurality of texture components same as those registered in the texture DB 31 of the encoding apparatus 30 are registered.

The texture component acquisition unit 44 acquires a texture component as a match component identified by the identification information from the reception unit 41 from among the texture components registered in the texture DB 43 and supplies the acquired texture component to the synthesis unit 45.

The synthesis unit 45 synthesizes the low frequency component of the input image as a decoded image from the decoding unit 42 and the texture component as a match component from the texture component acquisition unit 44 with each other to generate a restoration image that restores the input image (original image) and outputs the generated restoration image as an output image.

In the codec of FIG. 2, a plurality of texture components are registered (retained) in advance in the texture DBs 31 and 43 in the encoding apparatus 30 and the decoding apparatus 40, and identification information for identifying a texture component as a match component that matches with the input image from among the plurality of texture components is transmitted from the encoding apparatus 30 to the decoding apparatus 40.

Accordingly, the decoding apparatus 40 can obtain an output image that restores a texture of an input image using a texture component as a match component identified by the identification information, namely, can improve the picture quality of the output image.

Furthermore, since, in the codec of FIG. 2, a plurality of texture components are registered in advance in the texture DBs 31 and 43 in the encoding apparatus 30 and the decoding apparatus 40 and not a texture component itself as a match component that matches with an input image but identification information for identifying the texture component is transmitted from the encoding apparatus 30 to the decoding apparatus 40, the transmission efficiency (compression efficiency) can be improved in comparison with that in the codec of FIG. 1 in which a texture component itself is transmitted. Further, in the codec of FIG. 2, since an image obtained by removing a texture component from an input image is made an encoding target image and the encoding target image is encoded by the encoding unit 34, the compression efficiency can be improved in comparison with that in the case where an input image itself is encoded by the encoding unit 34, and as a result, the transmission efficiency can be improved.

As described above, with the codec of FIG. 2, the picture quality of an output image can be improved and the transmission efficiency can be improved.

It is to be noted that, by increasing the number of texture components to be registered in advance into the texture DBs 31 and 43, the picture quality of an output image can be improved further without degrading the transmission efficiency.

Figure 3:
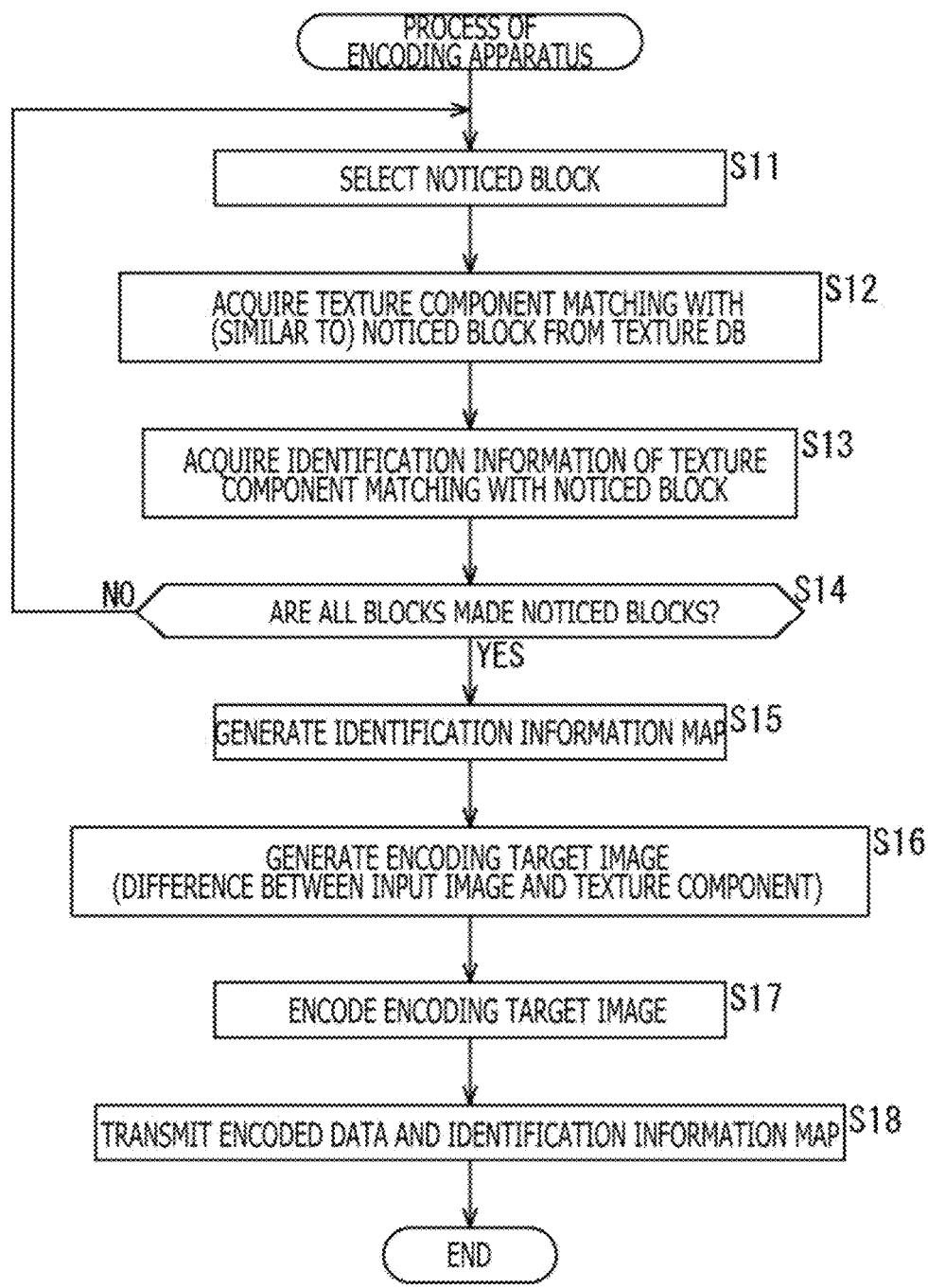
FIG. 3 is a flow chart illustrating an example of an encoding process of an encoding apparatus 30.

FIG. 3 is a flow chart illustrating an example of an encoding process of the encoding apparatus 30 of FIG. 2.

The encoding apparatus 30 successively determines frames of an input image supplied to the encoding apparatus 30 as a noticed frame and performs an encoding process in accordance with the flow chart of FIG. 3.

In particular, the texture component acquisition unit 32 divides (separates) a noticed frame of the input image into blocks for detecting a match component that matches with a texture component of the texture DB 31. Thus, at step S11, the texture component acquisition unit 32 selects one block that has not yet been selected as a noticed block as a noticed block from among the blocks of the noticed frame of the input image, and the processing advances to step S12.

At step S12, the texture component acquisition unit 32 acquires a match component that is a texture component that best matches with the noticed block of the input image from among the texture components registered in the texture DB 31.

Here, the texture component acquisition unit 32 acquires, for example, a texture component that is most similar to the texture of the noticed block among the texture components registered in the texture DB 31 as a match component.

The texture component acquisition unit 32 supplies the match component acquired in regard to the noticed block to the removal unit 33, and the processing advances to step S13.

At step S13, the texture component acquisition unit 32 acquires identification information for identifying the match component from the texture DB 31 and supplies the identification information to the transmission unit 35, and the processing advances to step S14.

At step S14, the texture component acquisition unit 32 decides whether or not all blocks of the noticed frame of the input image have been selected as a noticed block.

In the case where it is decided at step S14 that all blocks of the noticed frame of the input image have not yet been selected as a noticed block, the processing returns to step S11, and thereafter, similar processes are repeated.

On the other hand, in the case where it is decided at step S14 that all blocks of the noticed frame of the input image have been selected as a noticed block, the processing advances to step S15.

At step S15, the transmission unit 35 generates an identification information map that associates the blocks of the noticed frame of the input image and identification information of match components acquired in regard to the blocks (identification information from the texture component acquisition unit 32) with each other, and the processing advances to step S16.

At step S16, the removal unit 33 generates a low frequency component of (the noticed frame of) the input image obtained by removing, from the blocks of the noticed frame of the input image, match components of the blocks from the texture component acquisition unit 32, namely, a difference between the input image and the texture components as the match components, as an encoding target image and supplies the encoding target image to the encoding unit 34, and the processing advances to step S17.

At step S17, the encoding unit 34 encodes the encoding target image from the removal unit 33 by a non-reversible encoding method and supplies encoded data obtained as a result of the encoding to the transmission unit 35, and the processing advances to step S18.

At step S18, the transmission unit 35 transmits the identification information map and the encoded data from the encoding unit 34, and the encoding apparatus 30 ends the processing for the noticed frame of the input image.

Figure 4:
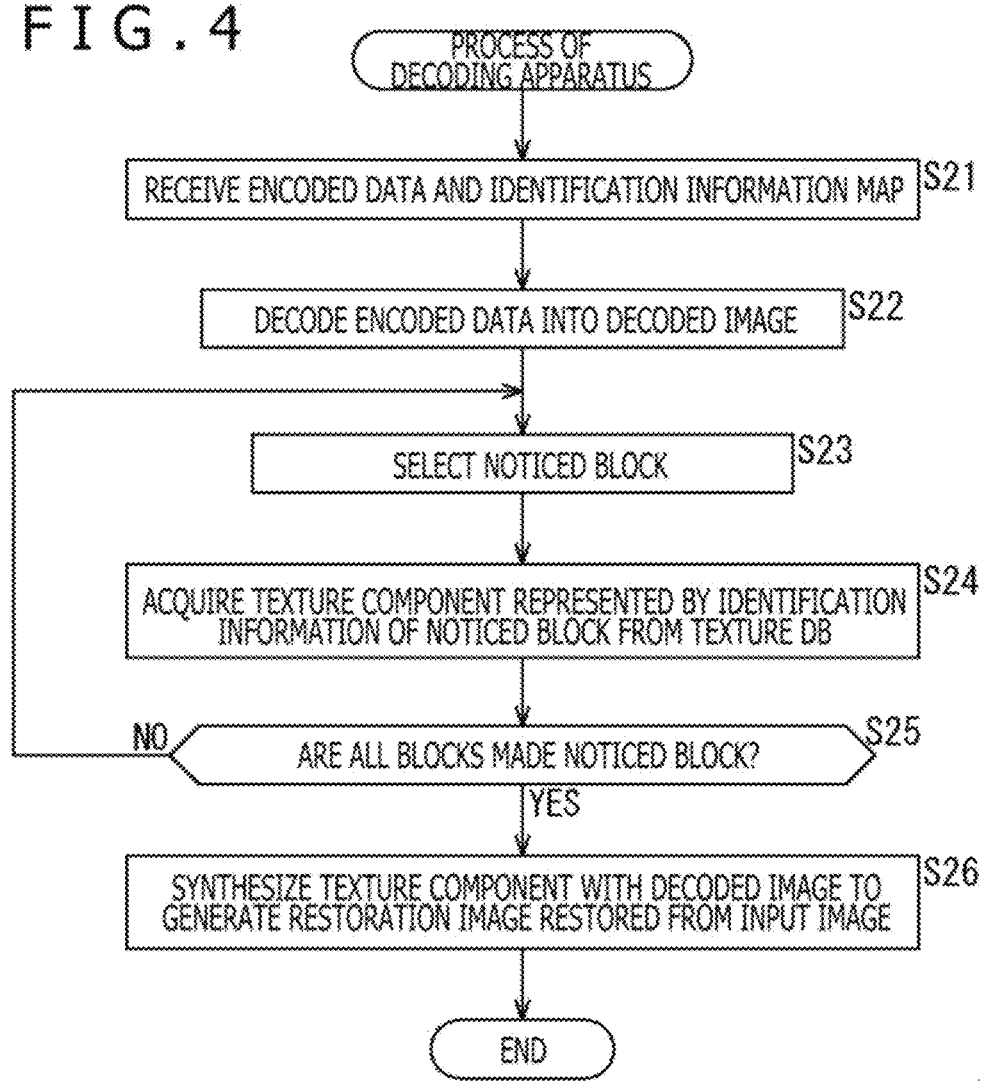
FIG. 4 is a flow chart illustrating an example of a decoding process of a decoding apparatus 40.

FIG. 4 is a flow chart illustrating an example of a decoding process of the decoding apparatus 40 of FIG. 2.

At step S21, the reception unit 41 receives (accepts) encoded data for one frame and an identification information map transmitted thereto from the encoding apparatus 30. Further, the reception unit 41 supplies the encoded data to the decoding unit 42 and supplies the identification information map to the texture component acquisition unit 44, and the processing advances from step S21 to step S22.

At step S22, the decoding unit 42 decodes the encoded data from the reception unit 41 and supplies (a frame of) a decoded image obtained as a result of the decoding to the synthesis unit 45, and the processing advances to step S23.

At step S23, the texture component acquisition unit 44 selects one of the blocks that have not yet been selected as a noticed block from among the blocks of the identification information map from the reception unit 41 as a noticed block, and the processing advances to step S24.

At step S24, the texture component acquisition unit 44 acquires a texture component identified by the identification information (represented by the identification information) of the noticed block as a match component of the noticed block from the texture component of the texture DB 43. Then, the texture component acquisition unit 44 supplies the match component of the noticed block to the synthesis unit 45, and the processing advances from step S24 to step S25.

At step S25, the texture component acquisition unit 44 decides whether or not all blocks of the identification information map have been selected as a noticed block.

In the case it is decided at step S25 that all blocks of the identification information map have not yet been selected as a noticed block, the processing returns to step S23, and thereafter, similar processes are repeated.

On the other hand, in the case where it is decided at step S25 that all blocks of the identification information map have been selected as a noticed block, the processing advances to step S26.

At step S26, the synthesis unit 45 synthesizes the texture component as a match component for each block from the texture component acquisition unit 44 at the corresponding position of the block of (the frame of) the decoded image from the decoding unit 42 to generate (a frame of) a restoration image that restores the input image (original image) and outputs the generated restoration image as an output image, thereby ending the processing for the encoded data and the identification information map for one frame.

<Third Example of Configuration of Codec>

Figure 5:
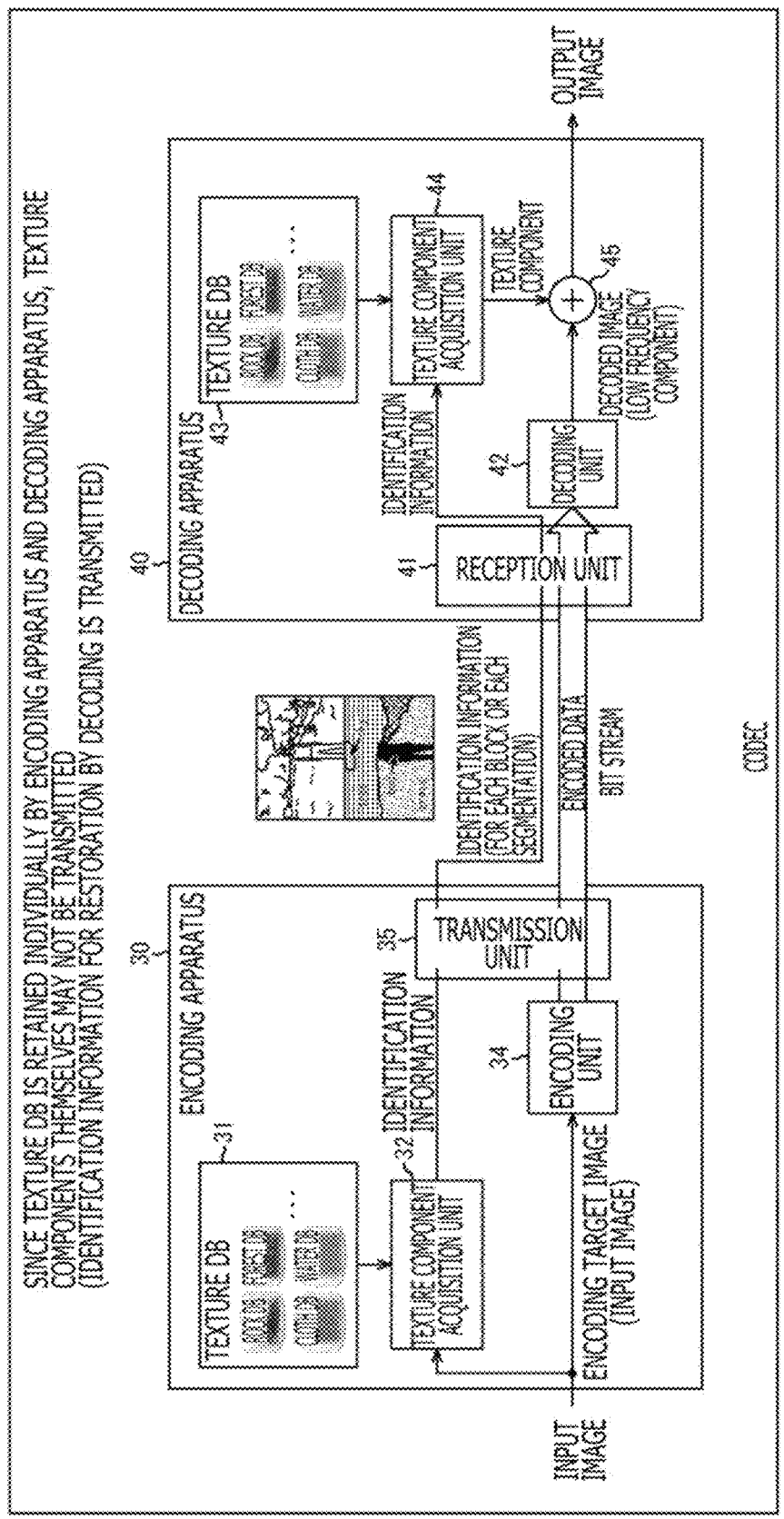
FIG. 5 is a block diagram depicting a third example of a configuration of a codec that restores a texture lost upon encoding.

FIG. 5 is a block diagram depicting a third example of a configuration of a codec that restores a texture lost by encoding.

It is to be noted that, in FIG. 5, elements corresponding to those of the case of FIG. 2 are denoted by same reference numerals, and description of them is hereinafter omitted suitably.

Referring to FIG. 5, the codec is common to that in the case of FIG. 2 in that it includes an encoding apparatus 30 and a decoding apparatus 40.

Furthermore, referring to FIG. 5, the encoding apparatus 30 is common to that in the case of FIG. 2 in that it includes a texture DB 31, a texture component acquisition unit 32, an encoding unit 34 and a transmission unit 35, and the decoding apparatus 40 is common to that in the case of FIG. 2 in that it includes a reception unit 41, a decoding unit 42, a texture DB 43, a texture component acquisition unit 44 and a synthesis unit 45.

However, in FIG. 5, the encoding apparatus 30 is different from that in the case of FIG. 2 in that it does not include the removal unit 33.

Referring to FIG. 5, since the encoding apparatus 30 does not include the removal unit 33, to the encoding unit 34, not the input image from which a texture component is removed, namely, not a low frequency component of the input image, but the input image itself is supplied as an encoding target image.

Accordingly, in FIG. 5, the encoding unit 34 encodes an input image itself as an encoding target image.

The encoding unit 34 encodes the encoding target image by a non-reversible encoding method such as, for example, MPEG, AVC, HEVC or some other method as described hereinabove with reference to FIG. 2.

With the encoding by the non-reversible encoding method of the encoding unit 34, a high frequency component of the input image as an encoding target image, namely, for example, at least part of a texture component, is lost.

However, in the decoding apparatus 40, the synthesis unit 45 synthesizes a decoded image from the decoding unit 42, namely, the input image from which (at least part of) texture components are lost, and a texture component as a match component from the texture component acquisition unit 44 with each other.

Consequently, in the synthesis unit 45, a restoration image that restores the texture component lost by the encoding of the encoding unit 34 is generated as an output image.

As described above, in the codec of FIG. 5, processing similar to that of the codec of FIG. 2 is performed except that the encoding unit 34 of the encoding apparatus 30 performs encoding by a non-reversible encoding method using not a low frequency component of the input image but the input image itself as an encoding target image.

Accordingly, with the codec of FIG. 5, the picture quality of the output image is improved and the transmission efficiency can be improved similarly as in the case of FIG. 2.

<Fourth Example of Configuration of Codec>

Figure 6:
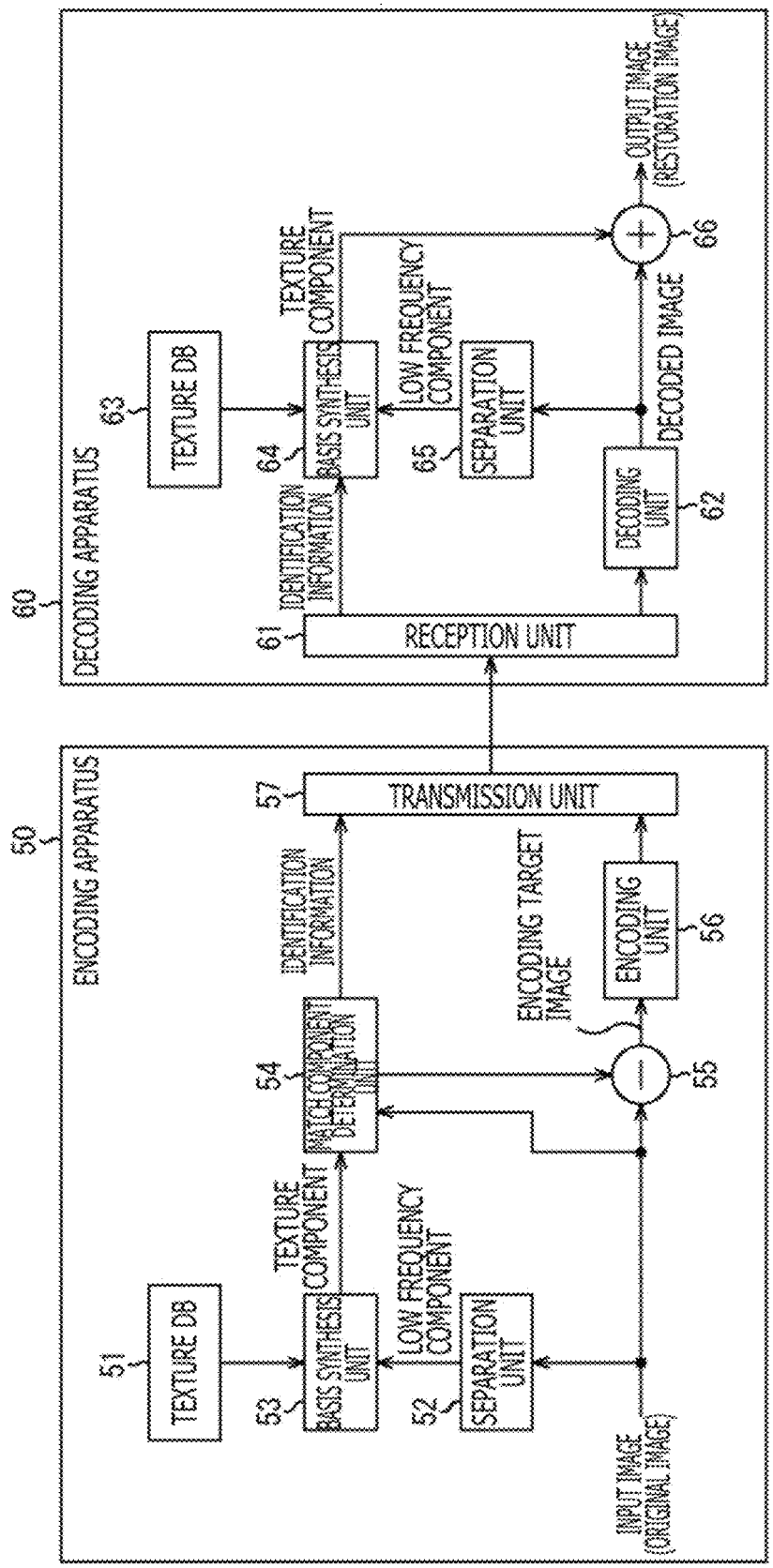
FIG. 6 is a block diagram depicting a fourth example of a configuration example of a codec that restores a texture lost upon encoding.

FIG. 6 is a block diagram depicting a fourth example of a configuration of a codec that restores a texture lost by encoding.

Referring to FIG. 6, the codec includes an encoding apparatus 50 and a decoding apparatus 60.

The encoding apparatus 50 includes a texture DB 51, a separation unit 52, a basis synthesis unit 53, a match component determination unit 54, a removal unit 55, an encoding unit 56 and a transmission unit 57.

In the texture DB 51, various kinds of texture components, namely, a plurality of texture components, are registered.

However, in the texture DB 51, each texture component is formed as a basis (basis learning) and is registered in the form of a basis. The basis of a texture component is an image component that can represent a texture by a linear combination of a finite number of bases.

To the separation unit 52, an original image as an input image is supplied. The separation unit 52 filters the input image to separate a low frequency component of the input image from the input image and supplies the low frequency component to the basis synthesis unit 53.

The basis synthesis unit 53 performs, for each of a plurality of texture contents whose basis is registered in the texture DB 51, basis synthesis of the low frequency component of the input image from the separation unit 52 and a basis registered in the texture DB 51.

The basis synthesis unit 53 generates, for each of a plurality of texture components whose basis is registered in the texture DB 51, a texture component as a restoration component that restores a texture component of the input image by basis synthesis and supplies the generated texture component to the match component determination unit 54.

To the match component determination unit 54, not only a restoration component regarding each of the plurality of texture components whose basis is registered in the texture DB 51 is provided from the basis synthesis unit 53, but also the input image is inputted.

The match component determination unit 54 determines, for each predetermined block of the input image, a match component that is a texture component as a restoration component that best matches with the block from among the restoration components from the basis synthesis unit 53 and supplies the determined match component to the removal unit 55.

In particular, the match component determination unit 54 divides (a frame of) the input image into blocks for determination of a match component. As a block for determination of a match component, a block of an arbitrary size such as, for example, a block with 16×16 pixels in length and width or the like can be adopted.

Furthermore, the match component determination unit 54 determines, for each block of the input image, a restoration component whose error with respect to the block is in the minimum among the restoration components from the basis synthesis unit 53 as a match component.

As the error of a restoration component with respect to the block, for example, the S/N, namely, the sum total of squares of differences between the restoration components and the pixel values of the block (sum total of the square errors), the difference between predetermined feature amounts of an activity or the like between the restoration component and the block or the like can be adopted.

Furthermore, the match component determination unit 54 supplies identification information for identifying the match components to the transmission unit 57.

In particular, in the texture DB 51, bases of texture components are registered together with unique identification information for identifying the texture components similarly as in the texture DB 31 of FIG. 2.

The match component determination unit 54 acquires identification information (of the basis) of the texture component determined as a match component in regard to each block of the input image from the texture DB 51 and supplies the identification information to the transmission unit 57.

As the identification information, a bit string whose size (data amount) is sufficiently smaller than that of a texture component such as, for example, 6 bits or the like can be adopted. With 6 bits, bases of $64=2^6$ texture components can be identified in the maximum.

To the removal unit 55, not only a match component is supplied from the match component determination unit 54, but also an input image is supplied.

The removal unit 55 removes a texture component as a match component of the input image from the input image by arithmetically operating the difference between the input image and the match component (for each block) of the input image from the match component determination unit 54, and supplies the input image, from which the texture component is removed, as an encoding target image of a target of encoding by the encoding unit 56 to the encoding unit 56.

Here, since the encoding target image obtained by the removal unit 55 is an image obtained by removing a texture component, namely, a high frequency component, from the input image, it can be regarded as a low frequency component of the input image.

The encoding unit 56 encodes the encoding target image from the removal unit 55 by a non-reversible encoding method such as, for example, MPEG, AVC, HEVC or some other method as a hybrid method that is a combination of prediction coding and orthogonal transformation, and supplies encoded data obtained as a result of the encoding to the transmission unit 57.

Here, in the encoding of the non-reversible encoding method by the encoding unit 56, since an image is converted into a signal of the frequency domain and the signal of the frequency domain is quantized similarly as in the encoding unit 13 of FIG. 1, a high frequency component such as a texture component or the like is lost.

The transmission unit 57 transmits the identification information from the match component determination unit 54 and the encoded data from the encoding unit 56. The identification information and the encoded data transmitted from the transmission unit 57 are supplied to the decoding apparatus 60 through a transmission medium not depicted or recorded on a recording medium not depicted and then read out from the recording medium and supplied to the decoding apparatus 60.

It is to be noted that the transmission unit 57 can transmit the identification information and the encoded data not only separately from each other but also integrally with each other similarly to the transmission unit 35 of FIG. 2.

Further, the transmission unit 57 not only can transmit the identification information for each block but also can transmit the identification information after it is collected in a unit of a segmentation greater than a block, namely, in a unit of a frame or the like.

The decoding apparatus 60 includes an reception unit 61, a decoding unit 62, a texture DB 63, a basis synthesis unit 64, a separation unit 65 and a synthesis unit 66.

The reception unit 61 receives (accepts) the encoded data and the identification information transmitted from the transmission unit 57, and supplies the encoded data to the decoding unit 62 and supplies the identification information to the basis synthesis unit 64.

The decoding unit 62 decodes the encoded data from the reception unit 61 by a method corresponding to the encoding method of the encoding unit 56 and supplies a decoded image obtained as a result of the decoding to the separation unit 65 and the synthesis unit 66.

Here, the decoded image obtained by the decoding unit 62 corresponds to the encoding target image, namely, a low frequency component of the input image.

In the texture DB 63, various kinds of texture components, namely, a plurality of texture components, are registered. For example, in the texture DB 63, at least a plural number of texture components equal to the number of texture components registered in the texture DB 51 of the encoding apparatus 50 are registered.

It is to be noted that, in the texture DB 63, texture components are converted into bases and are each registered in the form of a basis similarly as in the texture DB 51.

To the basis synthesis unit 64, not only identification information is supplied from the reception unit 61 but also a low frequency component of a decoded image is supplied from the separation unit 65.

The basis synthesis unit 64 acquires, for each block of the decoded image corresponding to a block of the input image, a basis of a texture component as a match component identified by the identification information from the reception unit 61 from among the bases of the texture components registered in the texture DB 63.

Furthermore, the basis synthesis unit 64 performs, for each block of the decoded image, basis synthesis using the low frequency component of the decoded image supplied from the separation unit 65 and the bases acquired from the texture DB 63 similarly to the basis synthesis unit 53. The basis synthesis unit 64 generates, for each block of the decoded image, a texture component as a restored component restored from the match component as a texture component of the input image by basis synthesis and supplies the generated texture component to the synthesis unit 66.

The separation unit 65 filters the decoded image from the decoding unit 62 to separate a low frequency component of the decoded image from the decoded image and supplies the low frequency component to the basis synthesis unit 64.

Here, the pass bands of the filtering performed by the separation units 52 and 65 are, for example, same as each other.

Then, since, in FIG. 6, the decoded image is (an image corresponding to) a low frequency component of the input image, by the separation unit 65, an image substantially similar to the decoded image is obtained as a low frequency component of the decoded image by a degree that distortion occurring with the decoded image is removed.

Accordingly, in FIG. 6, the separation unit 65 is not essentially required, and the decoding apparatus 60 can be configured without the separation unit 65.

The synthesis unit 66 generates a restoration image that restores the input image (original image) by synthesizing a low frequency component of the input image as the decoded image from the decoding unit 62 and the texture component as a match component from the basis synthesis unit 64 and outputs the restoration image as an output image.

In the codec of FIG. 6, a plurality of texture components are registered (retained) in advance in the texture DBs 51 and 63 in the encoding apparatus 50 and the decoding apparatus 60, and identification information for identifying the texture component as a match component that matches with the input image from among the plurality of texture components is transmitted from the encoding apparatus 50 to the decoding apparatus 60.

Accordingly, the decoding apparatus 60 can obtain an output image that restores the texture of the image signal, namely, can improve the picture quality of the output image, using a texture component as a match component identified by the identification information.

Furthermore, in the codec of FIG. 6, a plurality of texture components are registered in advance in the texture DBs 51 and 63 in the encoding apparatus 50 and the decoding apparatus 60, and not a texture component itself as a match component that matches with the input image but identification information for identifying the texture component is transmitted from the encoding apparatus 50 to the decoding apparatus 60. Therefore, the transmission efficiency (compression efficiency) can be improved in comparison with the codec of FIG. 1 in which the texture component itself is transmitted. Further, in the codec of FIG. 6, since an image obtained by removing a texture component from an input image is determined as an encoding target image and the encoding target image is encoded by the encoding unit 56, the compression efficiency can be improved in comparison with that in the case where the input image itself is encoded by the encoding unit 56, and as a result, the transmission efficiency can be improved.

In this manner, with the codec of FIG. 6, the picture quality of an output image can be improved and the transmission efficiency can be improved similarly to the codec of FIG. 2.

Furthermore, in the codec of FIG. 6, texture components are registered each in the form of a basis in the texture DBs 51 and 63. Accordingly, the capacities necessary for the texture DBs 51 and 63 can be reduced in comparison with those in an alternative case in which texture components are registered as they are in the form of an image.

Further, by registering the texture components each in the form of a basis, texture components of various patterns can be generated in regard to each kind of texture.

In particular, textures can be classified, for example, depending upon bodies (objects) that have the texture such as, for example, a forest, a rock, water (water surface), a cloth and so forth.

Further, as a texture of each kind such as a forest or the like, textures of various patterns are available.

In the case where texture components of various patterns are prepared for a texture of each kind and they are registered as they are (in the form of an image) into the texture DBs 51 and 63, a great capacity is required for the texture DBs 51 and 63.

In contrast, by registering texture components of each kind in the form of bases into the texture DBs 51 and 63, the capacity necessary for the texture DBs 51 and 63 can be reduced significantly.

Further, by performing basis synthesis using a basis of a texture component, texture components of various patterns can be generated for a texture of each kind.

<Basis Learning and Basis Synthesis>

Figure 7:
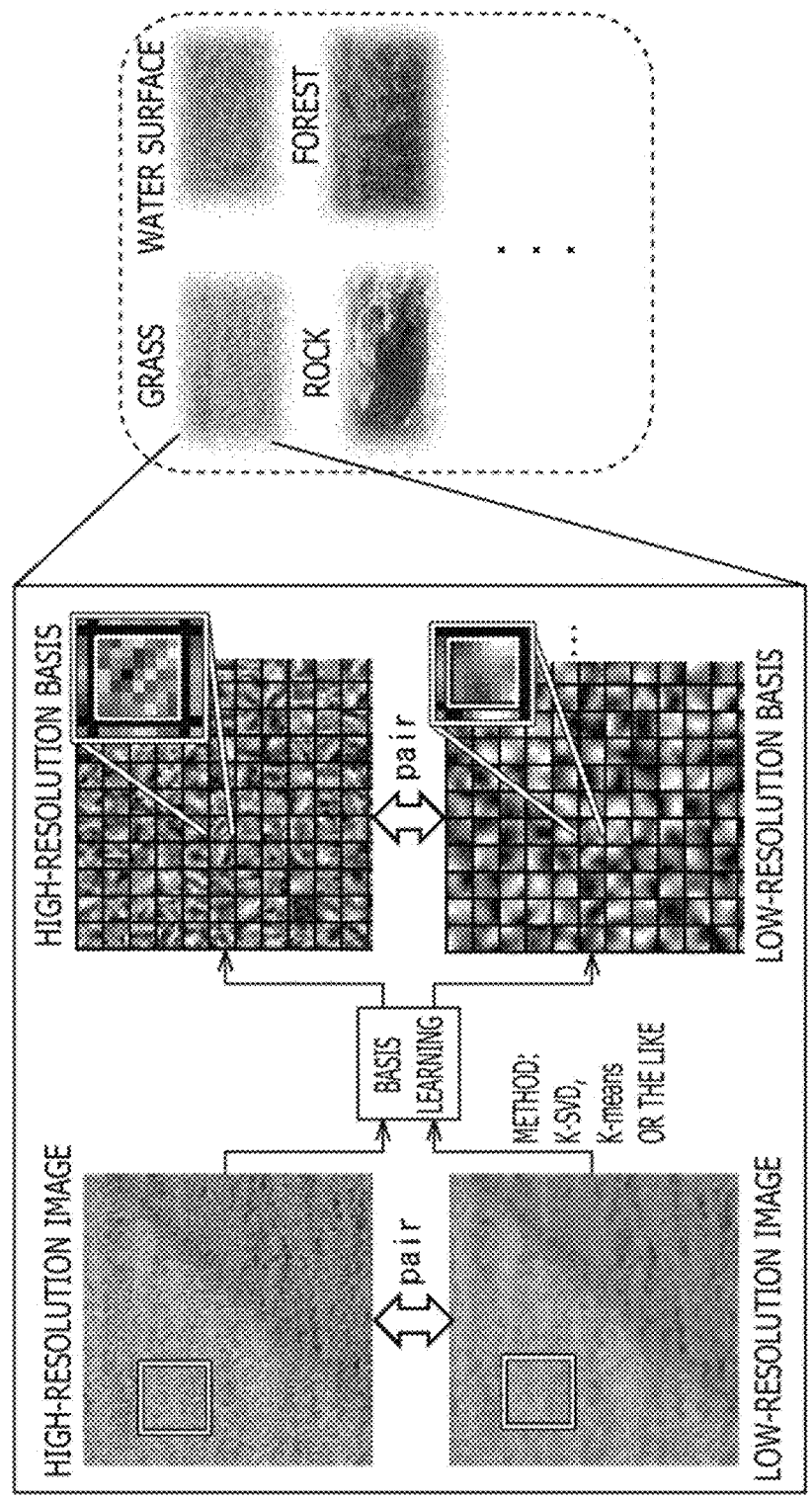
FIG. 7 is a view illustrating an overview of basis learning for converting texture components into a basis.

FIG. 7 is a view illustrating an overview of basis learning for converting a texture component into a basis.

In the basis learning, for each kind of a texture such as a forest, a rock, water, a cloth or the like, an image as a texture component is prepared as a learning image for learning, and the learning image is used to determine a basis of the texture component for each kind.

In particular, by setting the learning image to a high resolution image of a high resolution and performing filtering of the high resolution image (for example, filtering similar to that by the separation unit 52 or 65 of FIG. 6), a low resolution image of a low resolution, which is a low frequency component of the high resolution image, is determined.

Furthermore, basis learning is performed for a pair of images including the high resolution image as the learning image and the low resolution image determined from the high resolution image to determine a pair of bases including a high resolution basis of a high resolution and a low resolution basis of a low resolution. Each basis as a high resolution basis and each basis as a low resolution basis correspond to each other. In other words, among high resolution bases, a basis corresponding to (paired with) each basis as a low resolution basis exists.

As a method for basis learning, for example, the k-SVD method, the K-means method and so forth can be adopted.

Figure 8:
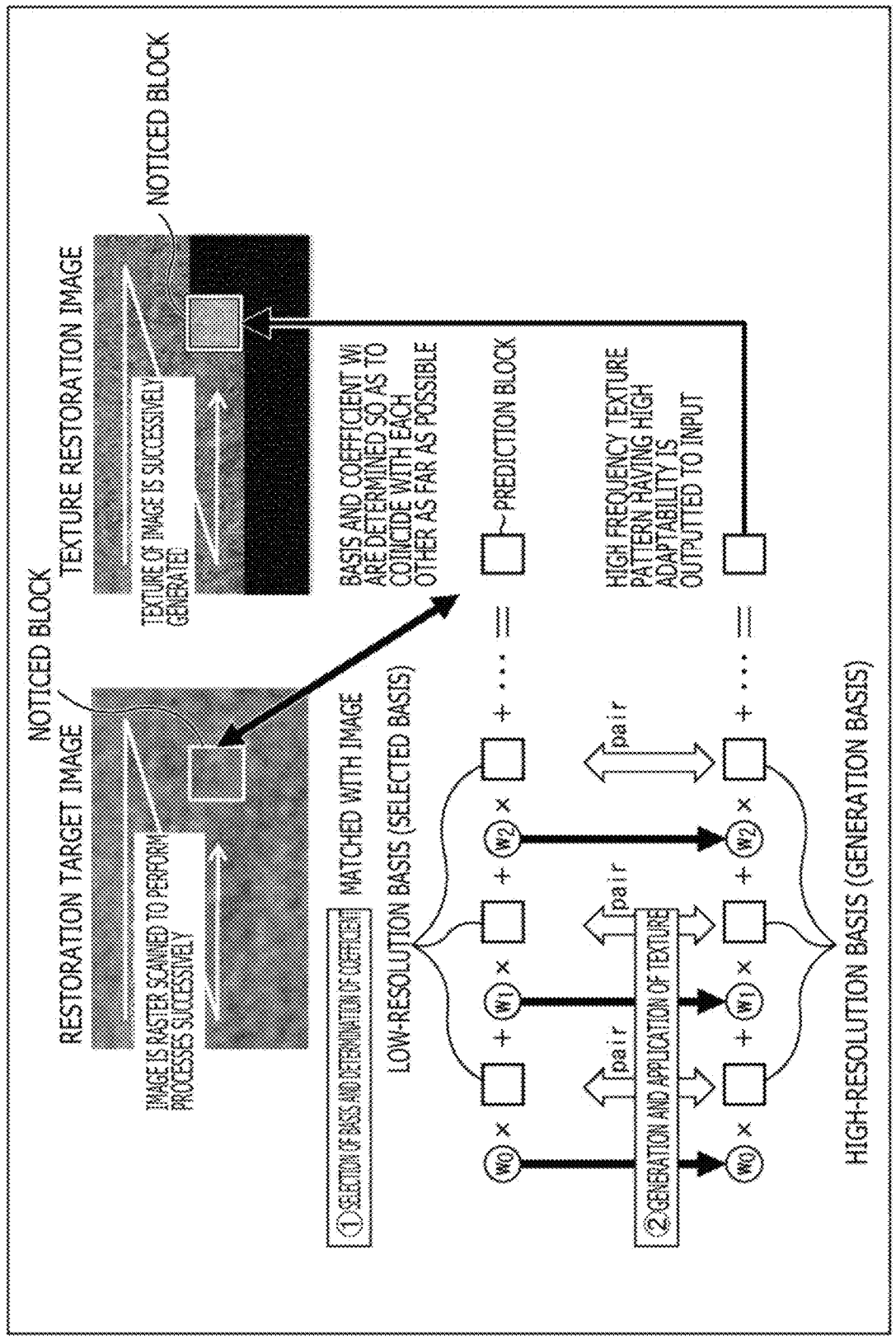
FIG. 8 is a view illustrating an overview of basis synthesis for generating texture components using a basis.

FIG. 8 is a view illustrating an overview of basis synthesis for generating a texture component using a basis.

The basis synthesis can be performed, for example, by the method of Matching Pursuits.

Now, it is assumed that a certain image is made a noticed image and a low frequency component of the noticed image formed by removing part or all of a texture component from the noticed image is made a restoration target image of a target for restoration of a texture.

In the basis synthesis, a block whose texture is to be restored is successively selected as a noticed block, for example, in a raster scan order from within a restoration target image.

Furthermore, from among bases as low resolution bases of a certain kind of texture, a plurality of bases are selected as selection bases, and a prediction block that predicts (an image of) the noticed block is generated by linear coupling of the selection bases.

In the basis synthesis, bases of a combination that can be selected from among low resolution bases are successively selected as selection bases, and coefficients $w_0, w_1, \ldots$ to be used for linear coupling of the selection bases are determined such that a prediction block determined by the linear coupling of the selection bases becomes coincident with the noticed block as far as possible, namely, for example, such that the error between the prediction block and the noticed block becomes minimized statistically.

It is to be noted that the number of coefficients $w_i$ coincides with the number of selection bases. Further, in the case where the coefficient $w_i$ is to be determined for all combinations of selection bases that can be selected from among the low resolution bases, since the arithmetic operation cost required for the determinations of the coefficients $w_i$ may become very great, the maximum number of bases to be selected as the selection basis can be restricted to a predetermined value such that the coefficient $w_i$ is determined only for combinations of selection bases within the range of the restriction.

After the coefficients $w_i$ are determined for the combinations of selection bases selected from the low resolution bases, the coefficient $w_i$ whose error of the prediction block from the noticed block is smallest is determined as a generation coefficient $w_i$ for texture component generation.

Furthermore, the high resolution basis paired with the low resolution basis as the selection basis when the prediction block whose error is smallest is obtained is determined as a generation basis for texture component generation.

Then, a texture component of the noticed block of the texture restoration image that restores the texture (accurately, a block of the texture restoration image at a position same as the position of the noticed block of the restoration target image) is determined by linear coupling of the generation basis and the generation coefficient $w_i$, namely, by product sum operation between the generation basis and the generation coefficient $w_i$.

It is to be noted that the basis synthesis can be performed not only by the method of Matching Pursuits but also, for example, by Iterative Reweighted Least Square or the like. Further, basis learning and basis synthesis are described, for example, in Jianchao Yang J., Huang T. S., Yi MaWright. (2010). Image Super-Resolution via Sparse Representation. Image processing, IEEE Transaction, Vol. 19, Issue 11, pp. 2861-2873.

Figure 9:
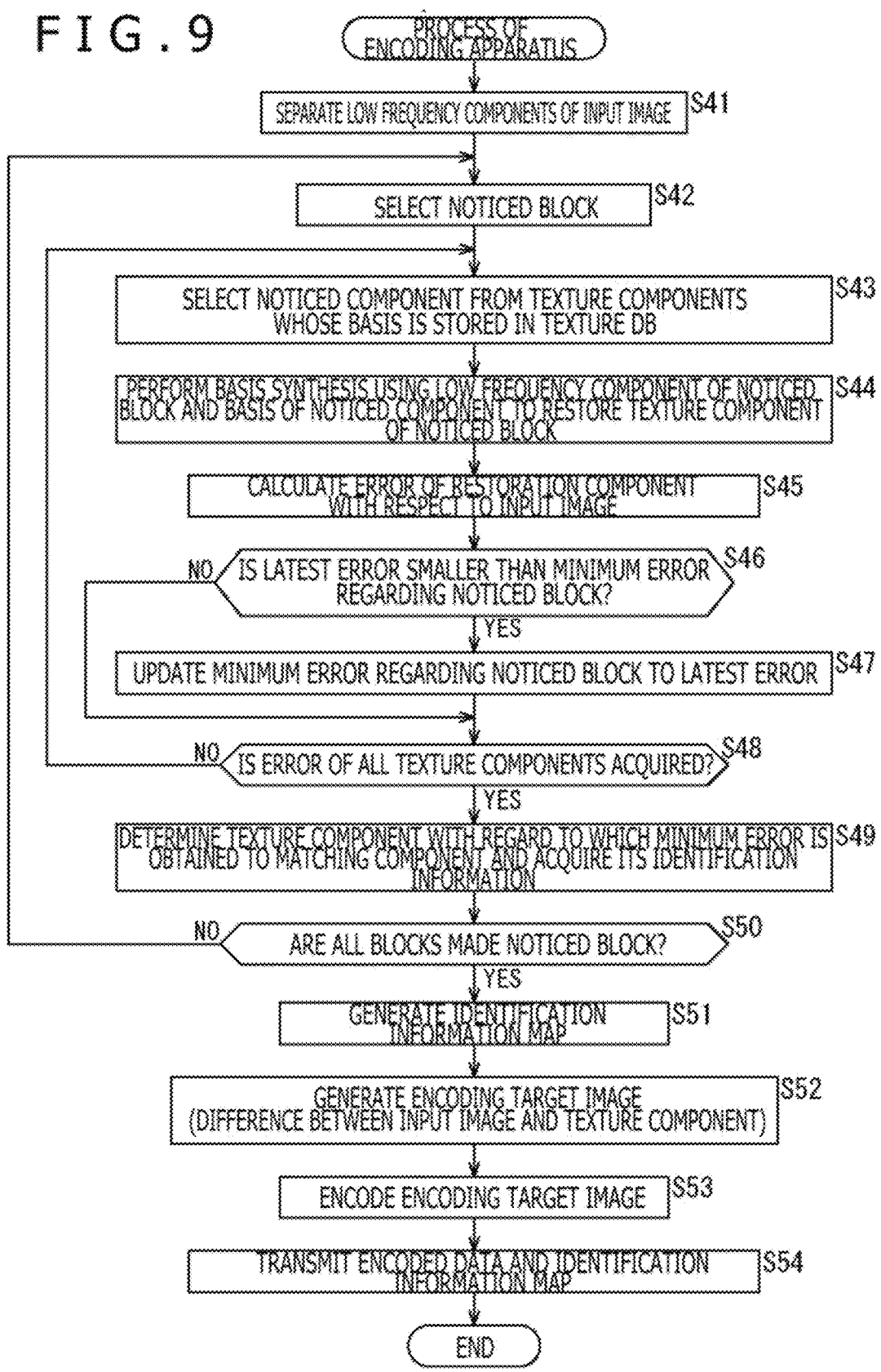
FIG. 9 is a flow chart illustrating an example of an encoding process of an encoding apparatus 50.

FIG. 9 is a flow chart illustrating an example of an encoding process of the encoding apparatus 50 of FIG. 6.

The encoding apparatus 50 successively determines frames of an input image supplied to the encoding apparatus

50 as a noticed frame and performs an encoding process in accordance with the flow chart of FIG. 9 for the noticed frame.

In particular, at step S41, the separation unit 52 separates a low frequency component from the noticed frame of the input image and supplies the low frequency component to the basis synthesis unit 53.

The basis synthesis unit 53 divides the noticed frame of the input image into blocks for determination of a match component. Then, the processing advances from step S41 to step S42, at which the basis synthesis unit 53 selects one block that has not been selected as a noticed block as yet from among the blocks of the noticed frame of the input image as a noticed block. Then, the processing advances to step S43.

At step S43, the basis synthesis unit 53 selects one texture component that has not been selected as a noticed component from among the plurality of (kinds of) texture components whose basis is registered (stored) in the texture DB 51 as a noticed component, and the processing advances to step S44.

At step S44, the basis synthesis unit 53 performs basis synthesis using the low frequency component of the noticed block among the low frequency components of the input image from the separation unit 52 and the basis of the noticed component to determine a restoration component that restores the texture component of the noticed block.

The basis synthesis unit 53 supplies the restoration component of the noticed block to the match component determination unit 54, and the processing advances from step S44 to step S45.

At step S45, the match component determination unit 54 calculates an error of the restoration component of the noticed block with respect to the noticed block of the input image, and the processing advances to step S46.

At step S46, the match component determination unit 54 decides whether or not the error of the restoration component of the noticed block is smaller than a minimum error regarding the noticed block.

Here, the minimum error regarding the noticed block is a minimum value among errors of the restoration components of the noticed blocks determined in regard to the texture components that have been selected as a texture component up to now from among the texture components whose basis is registered in the texture DB 51, and as an initial value of the minimum error regarding the noticed block, a predetermined high value is adopted.

In the case where it is decided at step S46 that the error of the restoration component of the noticed block is not smaller than the minimum error regarding the noticed block, the processing skips step S47 and advances to step S48.

On the other hand, in the case where it is decided at step S46 that the error of the restoration component of the noticed block is smaller than the minimum error regarding the noticed block, the processing advances to step S47.

At step S47, the match component determination unit 54 updates the minimum error regarding the noticed block to the error of the restoration component of the noticed block, namely, to the latest error, and the processing advances to step S48.

At step S48, the match component determination unit 54 decides whether or not the error of the restoration component of the noticed block has been acquired in regard to all texture components whose basis is registered in the texture DB 51.

In the case where it is decided at step S48 that the error of the restoration component of the noticed block has not yet been acquired in regard to all texture components whose basis is registered in the texture DB 51, the processing returns to step S43.

In particular, in the case where a texture component that has not yet been selected as a noticed component exists in the texture components whose basis is registered in the texture DB 51, the processing returns from step S48 to step S43, and thereafter, the processes described above are repeated.

On the other hand, in the case where it is decided at step S48 that the error of the restoration component of the noticed block has been acquired in regard to all texture components whose basis is registered in the texture DB 51, the processing advances to step S49.

In particular, in the case where an error of a restoration component of a noticed block has been determined in regard to all texture components whose basis is registered in the texture DB 51 and a minimum error among the errors is determined as a minimum value regarding the noticed block, the processing advances from step S48 to step S49.

At step S49, the match component determination unit 54 determines the texture component from which the minimum error is obtained in regard to the noticed block among the texture components whose basis is registered in the texture DB 51 as a match component. Further, the match component determination unit 54 acquires and supplies identification information of the match component to the transmission unit 57, and the processing advances from step S49 to step S50.

At step S50, the basis synthesis unit 53 decides whether or not all blocks of the noticed frame of the input image have been selected as a noticed block.

In the case where it is decided at step S50 that all blocks of the noticed frame of the input image have not yet been selected as a noticed block, the processing returns to step S42, and thereafter, similar processes are repeated.

On the other hand, in the case where it is decided at step S50 that all blocks of the noticed frame of the input image have been selected as a noticed block, the processing advances to step S51.

At step S51, the transmission unit 57 generates an identification information map that associates the blocks of the noticed frame of the input image and the identification information of the match components of the blocks (identification information from the match component determination unit 54) with each other, and the processing advances to step S52.

At step S52, the removal unit 55 generates a low frequency component (of the noticed frame) of the input image obtained by removing a match component of each block from the basis synthesis unit 53 from each block of the noticed frame of the input image, namely, a difference between the input image and a texture component as a match component as an encoding target image and supplies the encoding target image to the encoding unit 56, and the processing advances to step S53.

At step S53, the encoding unit 56 encodes the encoding target image from the removal unit 55 by the non-reversible encoding method and supplies encoded data obtained as a result of the encoding to the transmission unit 57, and the processing advances to step S54.

At step S54, the transmission unit 57 transmits the identification information map and the encoded data from the encoding unit 56, and the encoding apparatus 50 ends the processing for the notice frame of the input image.

Figure 10:
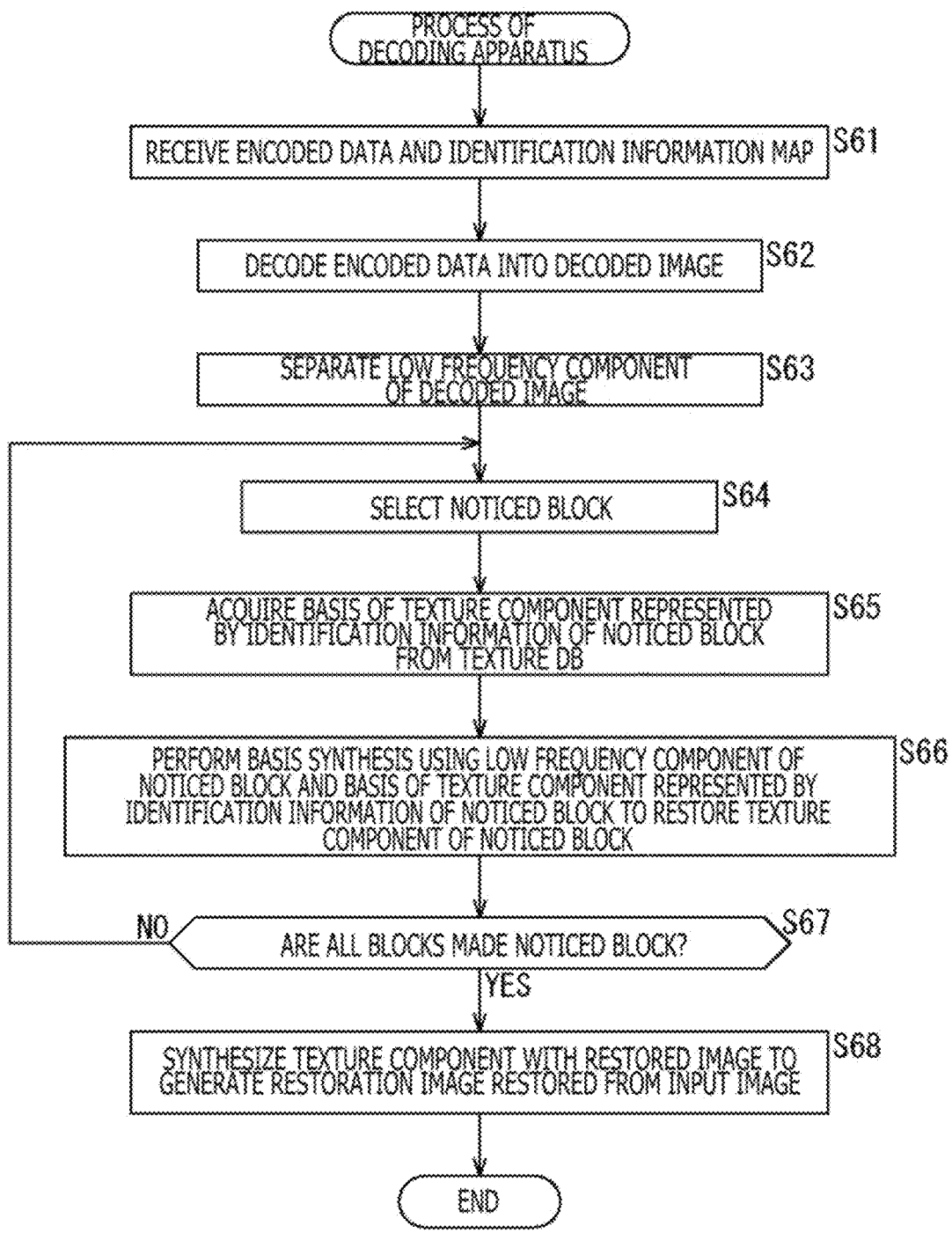
FIG. 10 is a flow chart illustrating an example of a decoding process of a decoding apparatus 60.

FIG. 10 is a flow chart depicting an example of a decoding process of the decoding apparatus 60 of FIG. 6.

At step S61, the reception unit 61 receives (accepts) encoded data for one frame and the identification information map transmitted from the encoding apparatus 50. Further, the reception unit 61 supplies the encoded data to the decoding unit 62 and supplies the identification information map to the basis synthesis unit 64, and the processing advances from step S61 to step S62.

At step S62, the decoding unit 62 decodes the encoded data from the reception unit 61 and supplies (a frame of) a decoded image obtained as a result of the decoding to the separation unit 65 and the synthesis unit 66, and the processing advances to step S63.

At step S63, the separation unit 65 separates a low frequency component of the decoded image from the decoded image from the decoding unit 62 and supplies the separated low frequency component to the basis synthesis unit 64, and the processing advances to step S64.

At step S64, the basis synthesis unit 64 selects one block that has not been selected as a noticed block as yet among the blocks of the identification information map from the reception unit 61 as a noticed block, and the processing advances to step S65.

At step S65, the basis synthesis unit 64 acquires the basis of a texture component identified by the identification information (represented by the identification information) of the noticed block from among the bases of the texture components of the texture DB 63 as a basis of a noticed component, and the processing advances to step S66.

At step S66, the basis synthesis unit 64 performs basis synthesis similar to that by the basis synthesis unit 53 using the low frequency component of the noticed block among the low frequency components of the decoded image from the separation unit 65 and the basis of the noticed component to restore a texture component as a match component of the noticed block.

Then, the basis synthesis unit 64 supplies the match component of the noticed block to the synthesis unit 66, and the processing advances from step S66 to step S67.

At step S67, the basis synthesis unit 64 decides whether or not all blocks of the identification information map have been selected as a noticed block.

In the case where it is decided at step S67 that all blocks of the identification information map have not yet been selected as a noticed block, the processing returns to step S64, and thereafter, similar processes are repeated.

On the other hand, in the case where it is decided at step S67 that all blocks of the identification information map have been selected as a noticed block, the processing advances to step S68.

At step S68, the synthesis unit 66 synthesizes the texture component as a match component for each block from the basis synthesis unit 64 at a corresponding position of the block of (the frame of) the decoded image from the decoding unit 62 to generate (a frame of) a restoration image that restores the input image (original image), and outputs the restoration image as an output image, thereby ending the processing for the encoded data for one frame and the identification information map.

<Fifth Example of Configuration of Codec>

Figure 11:
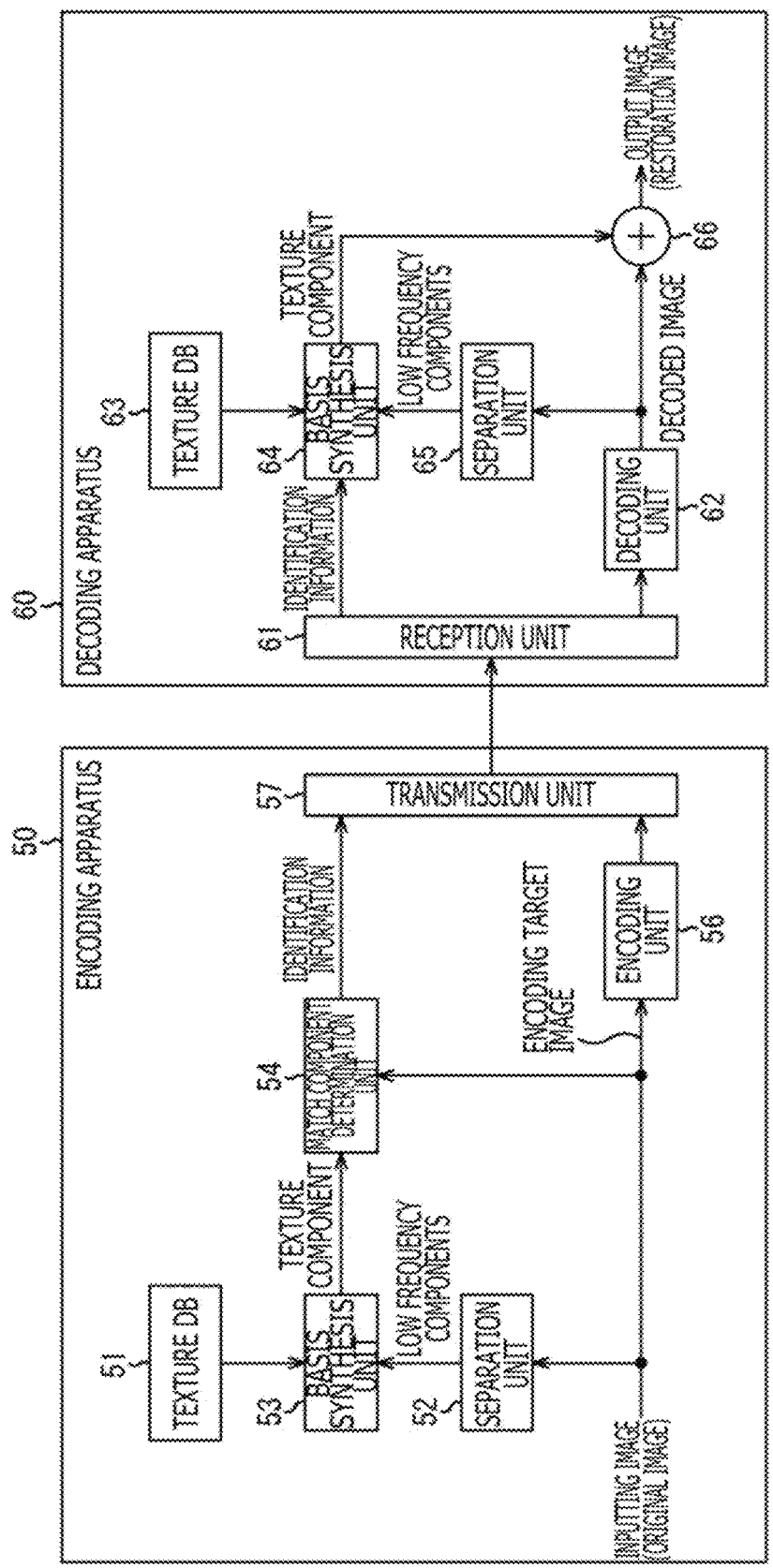
FIG. 11 is a block diagram depicting a fifth example of a configuration of a codec that restores a texture lost upon encoding.

FIG. 11 is a block diagram depicting a fifth example of a configuration of a codec that restores a texture lost by encoding.

It is to be noted that, in FIG. 11, elements corresponding to those of the case of FIG. 6 are denoted by same reference numerals, and description of them is hereinafter omitted suitably.

In FIG. 11, the codec is common to that of the case of FIG. 6 in that it includes an encoding apparatus 50 and a decoding apparatus 60.

Furthermore, referring to FIG. 11, the encoding apparatus 50 is common to that in the case of FIG. 6 in that it includes the elements from the texture DB 51 to the match component determination unit 54, the encoding unit 56 and the transmission unit 57, and the decoding apparatus 60 is common to that in the case of FIG. 6 in that it includes the elements from the reception unit 61 to the synthesis unit 66.

However, in FIG. 11, the encoding apparatus 50 is different from that in the case of FIG. 6 in that it does not include the removal unit 55.

Referring to FIG. 11, since the encoding apparatus 50 does not include the removal unit 55, to the encoding unit 56, not an input image from which a texture component is removed, namely, not a low frequency component of the input image, but the input image itself is supplied as an encoding target image.

Accordingly, in FIG. 11, the encoding unit 56 encodes an input image itself as an encoding target image.

By the encoding unit 56, an encoding target image is encoded by a non-reversible encoding method such as, for example, MPEG, AVC, HEVC or some other method as described hereinabove with reference to FIG. 6.

With the encoding by the non-reversible encoding method of the encoding unit 56, at least part of a texture component of an input image itself as the encoding target image is lost.

However, in the decoding apparatus 60, the synthesis unit 66 synthesizes a decoded image from the decoding unit 62, namely, an input image from which (at least part of) a texture component is lost, and a texture component as a match component from the basis synthesis unit 64.

Consequently, in the synthesis unit 66, a restoration image that restores the texture component lost by the encoding of the encoding unit 56 is generated as an output image.

As described above, in the codec of FIG. 11, processing similar to that by the codec of FIG. 6 is performed except that, in the encoding unit 56 of the encoding apparatus 50, encoding by a non-reversible encoding method is performed using not a low frequency component of an input image but the input image itself as an encoding target image.

Accordingly, with the codec of FIG. 11, the picture quality of the output image is improved and the transmission efficiency can be improved similarly as in the case of FIG. 6.

Here, in the codec of FIG. 11, since a decoded image and a texture component as a match component are synthesized by the decoding apparatus 60, a restoration image that restores the texture lost in the decoding of the encoding unit 56 is generated as an output image. In other words, even if such high compression encoding as may remove many texture components is performed by the encoding unit 56, the decoding apparatus 60 can restore the removed texture components.

<Sixth Example of Configuration of Codec>

Figure 12:
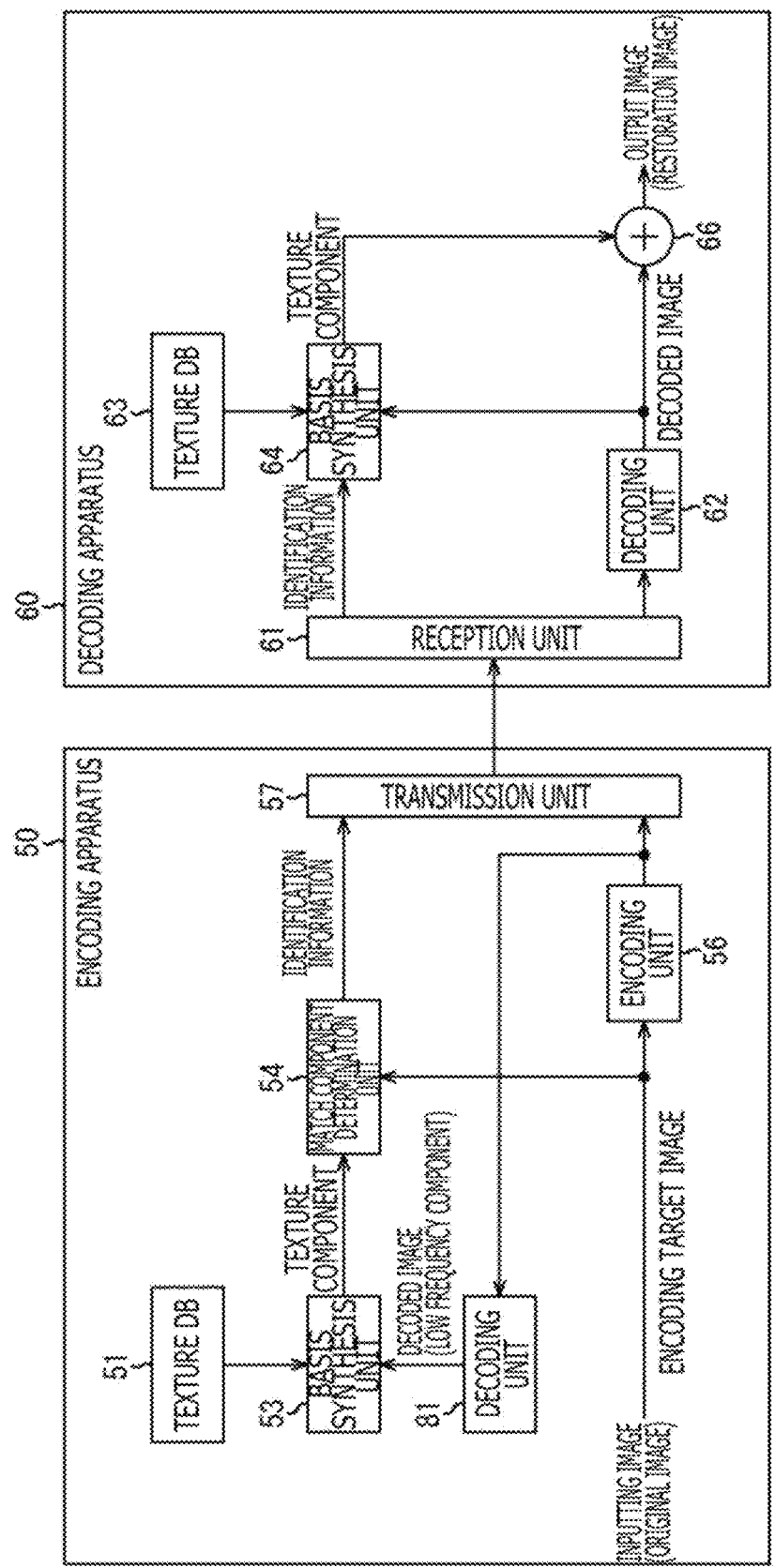
FIG. 12 is a block diagram depicting a sixth example of a configuration of a codec that restores a texture lost upon encoding.

FIG. 12 is a block diagram depicting a sixth example of a configuration of a codec that restores a texture lost by encoding.

It is to be noted that, in FIG. 12, elements corresponding to those of the case of FIG. 6 are denoted by same reference numerals, and description of them is hereinafter omitted suitably.

In FIG. 12, the codec is common to that of the case of FIG. 6 in that it includes an encoding apparatus 50 and a decoding apparatus 60.

Further, referring to FIG. 12, the encoding apparatus 50 is common to that in the case of FIG. 6 in that it includes the texture DB 51, basis synthesis unit 53, match component determination unit 54, encoding unit 56 and transmission unit 57, and the decoding apparatus 60 is common to that in the case of FIG. 6 in that it includes the elements from the reception unit 61 to the basis synthesis unit 64 and the synthesis unit 66.

However, in FIG. 12, the encoding apparatus 50 is different from that in the case of FIG. 6 in that it does not include the separation unit 52 nor the removal unit 55. Further, in FIG. 12, the encoding apparatus 50 is different from that in the case of FIG. 6 in that it newly includes a decoding unit 81.

Further, in FIG. 12, the decoding apparatus 60 is different from that in the case of FIG. 6 in that it does not include the separation unit 65.

As described above, in FIG. 12, since the encoding apparatus 50 does not include the removal unit 55, in the encoding apparatus 50, not the input image from which a texture component is removed in the encoding unit 56, namely, not a low frequency component of the input image, but the input image itself is encoded as an encoding target image similarly as in the case of FIG. 11.

Further, in the encoding apparatus 50 of FIG. 12, to the decoding unit 81, encoded data obtained by encoding an input image itself as an encoding target image by the encoding unit 56 is supplied.

The decoding unit 81 decodes the encoded data from the encoding unit 56 similarly to the decoding unit 62 and supplies a decoded image obtained as a result of the decoding to the basis synthesis unit 53.

Here, as described with reference to FIG. 11, with the encoding by the non-reversible encoding method of the encoding unit 56, at least part of a texture component of the input image itself as the encoding target image is lost.

Accordingly, the decoded image obtained by the decoding unit 81 is an image from which the texture component of the input image is lost, namely, an image corresponding to the low frequency component of the input image.

In FIG. 12, the basis synthesis unit 53 performs basis synthesis using a decoded image corresponding to the low frequency component of the input image in place of the low frequency component itself of the input image.

As described above, in FIG. 12, in accordance with the basis synthesis performed by the basis synthesis unit 53 in the encoding apparatus 50 using a decoded image corresponding to a low frequency component of an input image, also in the decoding apparatus 60, the basis synthesis unit 64 performs basis synthesis using a decoded image obtained by the decoding unit 62.

Therefore, in FIG. 12, the decoding apparatus 60 is configured such that it does not include the separation unit 65 of FIG. 6 (and FIG. 11).

Figure 13:
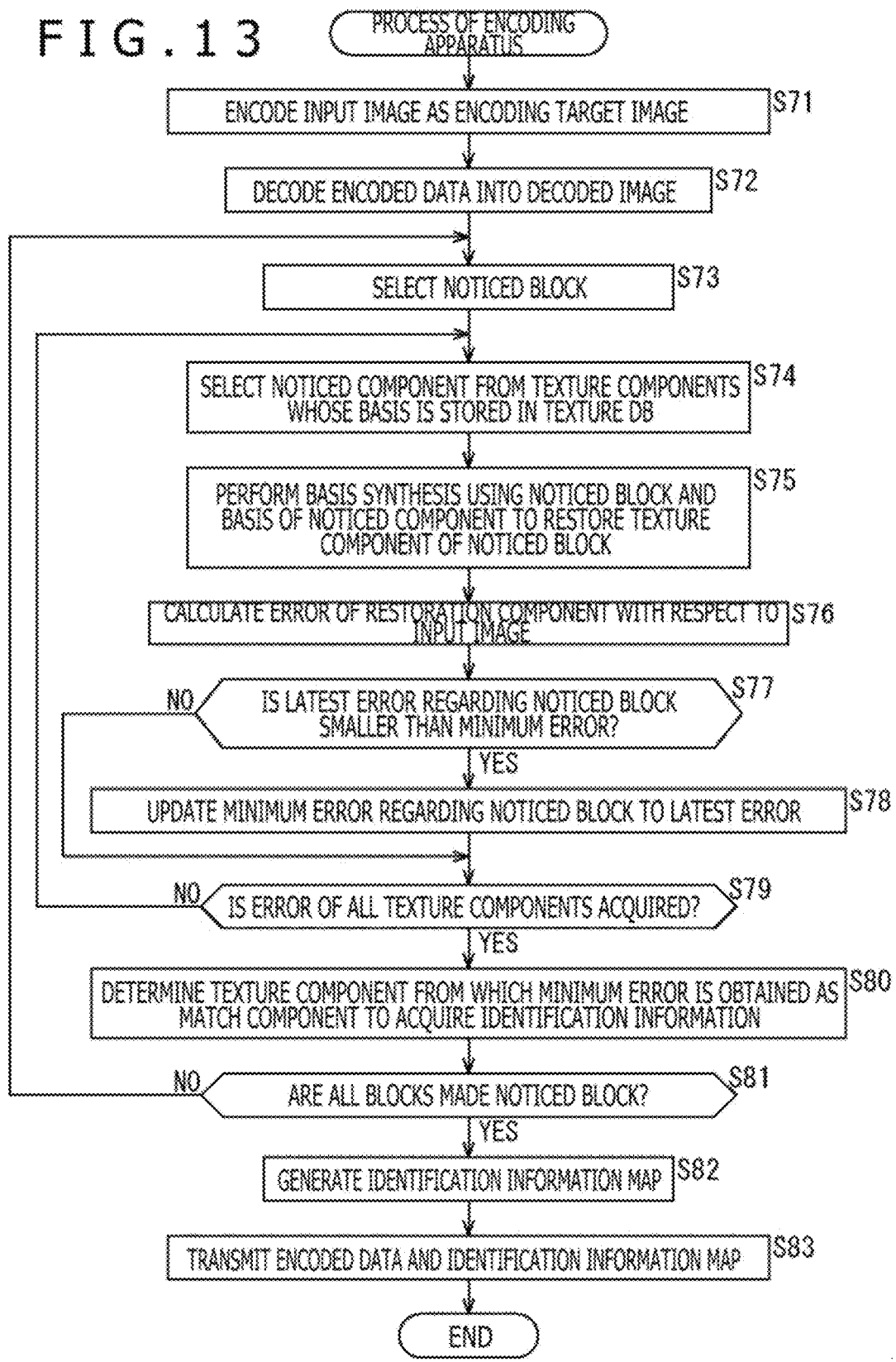
FIG. 13 is a flow chart illustrating an example of an encoding process of the encoding apparatus 50.

FIG. 13 is a flow chart illustrating an example of an encoding process of the encoding apparatus 50 of FIG. 12.

The encoding apparatus 50 successively determines frames of an input image supplied to the encoding apparatus 50 as a noticed frame and performs an encoding process in accordance with the flow chart of FIG. 13 for the noticed frame.

In particular, at step S71, the encoding unit 56 encodes a noticed frame of an input image as an encoded target image by a non-reversible encoding method and supplies encoded data obtained as a result of the encoding to the transmission unit 57 and the decoding unit 81, and the processing advances to step S72.

At step S72, the decoding unit 81 decodes the encoded data of the noticed frame and supplies a decoded image obtained as a result of the decoding and corresponding to a low frequency component of the noticed frame of the input image to the basis synthesis unit 53.

The basis synthesis unit 53 divides the decoded image of the noticed frame into blocks for determination of match components. Then, the processing advances from step S72 to step S73, at which the basis synthesis unit 53 selects one block that has not been selected as a noticed block as yet from among the blocks of the decoded image of the noticed frame as a noticed block, and the processing advances to step S74.

At step S74, the basis synthesis unit 53 selects one texture component that has not been selected as a noticed component as yet from among a plurality of (kinds of) texture components whose basis is registered in the texture DB 51 as a noticed component, and the processing advances to step S75.

At step S75, the basis synthesis unit 53 performs basis synthesis using the noticed block in the encoded image from the decoding unit 81 and the basis of the noticed component to determine a restoration component that restores the texture component of the input image (accurately, the block of the input image at a position same as that of the noticed block of the decoded image).

The basis synthesis unit 53 supplies the restoration component of the noticed block of the input image to the match component determination unit 54, and the processing advances from step S75 to step S76.

At step S76, the match component determination unit 54 calculates an error of the restoration component of the noticed block of the input image with respect to the noticed block of the input image, and the processing advances to step S77.

At step S77, the match component determination unit 54 decides whether or not the error of the restoration component of the noticed block of the input image is smaller than a minimum error regarding the noticed block.

Here, the minimum error regarding the noticed block is a minimum value among errors of the restoration component of the noticed block of the input image determined with regard to texture components selected as a noticed component up to now from among the texture components whose basis is registered in the texture DB 51 similarly as in the case described hereinabove with reference to FIG. 9, and a predetermined high value is adopted as an initial value of the minimum error for a noticed block is adopted.

In the case where it is decided at step S77 that the error of the restoration component of the noticed block of the input image is not smaller than a minimum error regarding the noticed block, the processing skips step S78 and advances to step S79.

On the other hand, in the case where it is decided at step S77 that the error of the restoration component of the noticed block of the input image is smaller than a minimum error regarding the noticed block, the processing advances to step S78.

At step S78, the match component determination unit 54 updates the minimum error regarding the noticed block to the error of the restoration component of the noticed block of the input image, namely, to the latest error, and the processing advances to step S79.

At step S79, the match component determination unit 54 decides whether or not the error of the restoration component of the noticed block of the input image has been acquired in regard to all texture components whose basis is registered in the texture DB 51.

In the case where it is decided at step S79 that the error of the restoration component of the noticed block of the input image has not yet been acquired in regard to all texture components whose basis is registered in the texture DB 51, the processing returns to step S74.

In particular, in the case where a texture component that has not been selected as a noticed component exists among the texture components whose basis is registered in the texture DB 51, the processing returns from step S79 to step S74, and thereafter, the processes described hereinabove are repeated.

On the other hand, in the case where it is decided at step S79 that the error of the restoration component of the noticed block of the input image has been acquired in regard to all texture components whose basis is registered in the texture DB 51, the processing advances to step S80.

In particular, in the case where an error of a restoration component of a noticed block of the input image has been determined in regard to all texture components whose basis is registered in the texture DB 51 and a minimum error among the errors is determined as a minimum error regarding the noticed block, the processing advances from step S79 to step S80.

At step S80, the match component determination unit 54 determines, from among the texture components as restoration components of the noticed block of the input image, a texture component from which a minimum value regarding a noticed block is obtained as a match component. Furthermore, the match component determination unit 54 acquires and supplies identification information of the match component to the transmission unit 57, and the processing advances from step S80 to step S81.

At step S81, the basis synthesis unit 53 decides whether or not all blocks of the decoded image of the noticed frame have been selected as a noticed block.

In the case where it is decided at step S81 that all blocks of the decoded image of the noticed frame have not yet been selected as a noticed block, the processing returns to step S73, and thereafter, similar processes are repeated.

On the other hand, in the case where it is decided at step S81 that all blocks of the decoded image of the noticed frame have been selected as a noticed block, the processing advances to step S82.

At step S82, the transmission unit 57 generates an identification information map that associates the blocks of the noticed frame of the input image and the identification information of the match components of the blocks (identification information from the transmission unit 57) with each other, and the processing advances to step S83.

At step S83, the transmission unit 57 transmits the identification information map and the encoded data from the encoding unit 56, and the encoding apparatus 50 ends the processing for the noticed image of the input image.

Figure 14:
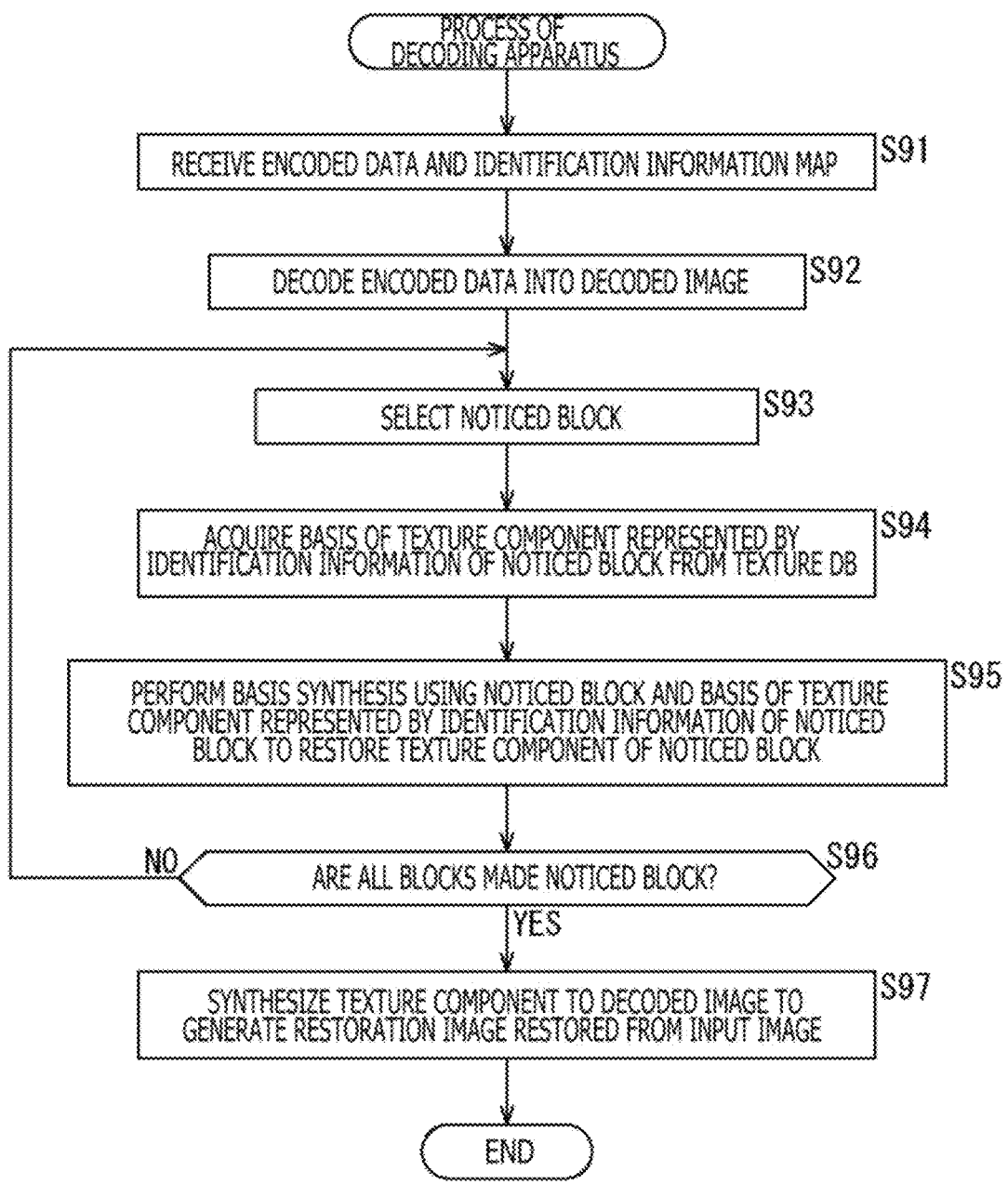
FIG. 14 is a flow chart illustrating an example of a decoding process of the decoding apparatus 60.

FIG. 14 is a flow chart illustrating an example of a decoding process of the decoding apparatus 60 of FIG. 12.

At step S91, the reception unit 61 receives (accepts) encoded data for one frame and an identification information map transmitted from the encoding apparatus 50. Further, the reception unit 61 supplies the encoded data to the decoding unit 62 and supplies the identification information map to the basis synthesis unit 64, and the processing advances from step S91 to step S92.

At step S92, the decoding unit 62 decodes the encoded data from the reception unit 61 and supplies (a frame of) a decoded image obtained as a result of the decoding to the basis synthesis unit 64 and the synthesis unit 66, and the processing advances to step S93.

At step S93, the basis synthesis unit 64 selects one block that has not been selected as a noticed block as yet among the blocks of the identification information map from the reception unit 61 as a noticed block, and the processing advances to step S94.

At step S94, the basis synthesis unit 64 acquires a basis of a texture component identified by the identification information of the noticed block (represented by the identification information) from among the bases of the texture components of the texture DB 63 as a basis of the noticed component, and the processing advances to step S95.

At step S95, the basis synthesis unit 64 performs basis synthesis similar to that by the basis synthesis unit 53 using the noticed block in the decoded image from the separation unit 65 (accurately a block of the decoded image at a position similar to that of the noticed block from among the blocks of the identification information map) to restore a texture component as a match component of the noticed block.

Then, the basis synthesis unit 64 supplies the match component of the noticed block to the synthesis unit 66, and the processing advances from step S95 to step S96.

At step S96, the basis synthesis unit 64 decides whether or not all blocks of the identification information map have been selected as a noticed block.

In the case where it is decided at step S96 that all blocks of the identification information map have not been selected as a noticed block as yet, the processing returns to step S93, and thereafter, similar processes are repeated.

On the other hand, in the case where it is decided at step S96 that all blocks of the identification information map have been selected as a noticed block, the processing advances to step S97.

At step S97, the synthesis unit 66 synthesizes the texture component as a match component for each block from the basis synthesis unit 64 at a corresponding position of the block (of the frame) of the decoded image from the decoding unit 62 to generate (a frame of) a restoration image that restores the input image (original image) and outputs the generated restoration image as an output image, thereby ending the processing for the encoded data for one frame and the identification information map.

<Seventh Example of Configuration of Codec>

Figure 15:
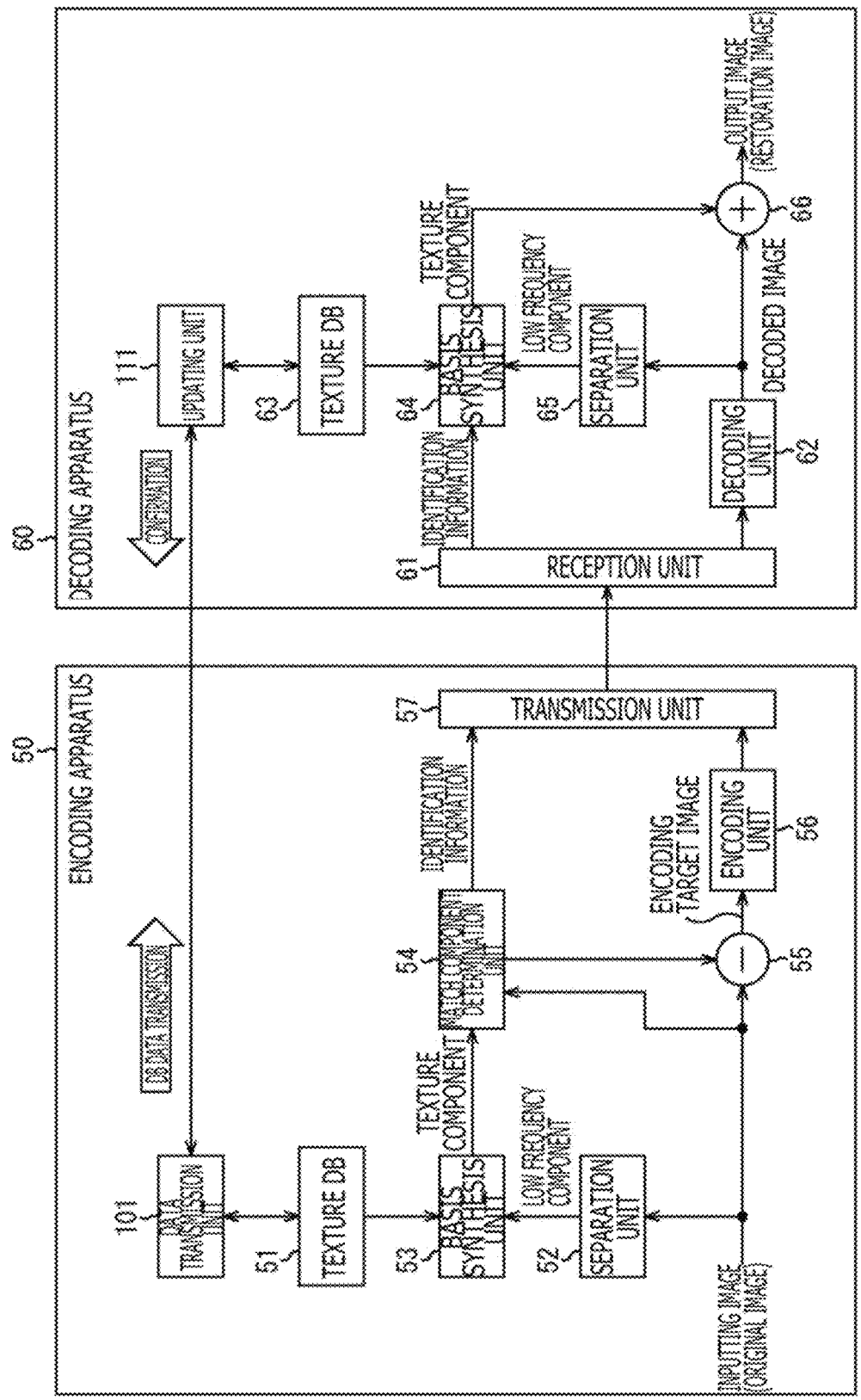
FIG. 15 is a block diagram depicting a seventh example of a configuration of a codec that restores a texture lost upon encoding.

FIG. 15 is a block diagram depicting a seventh example of a configuration of a codec that restores a texture lost by encoding.

Here, in the codec, (a basis of) a texture component of the texture DB 51 or 63 can be updated as occasion demands.

In the following, an example of a configuration of the codec in which the texture components in the texture DBs 51 and 63 can be updated is described taking an example in which a function for updating a texture component is added to the codec of the fourth example of a configuration of FIG. 6 as an example.

It is to be noted that the function for updating a texture component can be added to the codecs of the examples of a configuration other than the fourth example of a configuration of FIG. 6 (for example, to the second configuration example of FIG. 2, third configuration example of FIG. 6, fifth configuration example of FIG. 11, sixth configuration example of FIG. 12 and so forth)

FIG. 15 depicts an example of a configuration of a codec in which updating of a basis of a texture component of the texture DB 63 can be performed.

It is to be noted that, in FIG. 15, elements corresponding to those of the case of FIG. 6 are denoted by same reference numerals, and description of them is hereinafter omitted suitably.

Referring to FIG. 15, the codec is common to that in the case of FIG. 6 in that it includes an encoding apparatus 50 and a decoding apparatus 60.

Further, in FIG. 15, the encoding apparatus 50 is common to that in the case of FIG. 6 in that it includes the elements from the texture DB 51 to the transmission unit 57, and the decoding apparatus 60 is common to that in the case of FIG. 6 in that it includes the elements from the reception unit 61 to the synthesis unit 66.

However, in FIG. 15, the encoding apparatus 50 is different from that in the case of FIG. 6 in that it newly includes a data transmission unit 101. Further, in FIG. 15, the decoding apparatus 60 is different from that in the case of FIG. 6 in that it newly includes an updating unit 111.

The data transmission unit 101 transmits a basis (and identification information) of a texture component as DB data registered in the texture DB 51 in response to a request from the updating unit 111 of the decoding apparatus 60.

The updating unit 111 refers to the bases of texture components as DB data registered in the texture DB 51 through the data transmission unit 101 of the encoding apparatus 50 to confirm whether or not a basis of a texture component that is not yet registered in the texture DB 63 of the decoding apparatus 60 (hereinafter referred to as unregistered component) exists in the bases of texture components registered in the texture DB 51.

Then, in the case where a basis of an unregistered component exists, the updating unit 111 requests the data transmission unit 101 of the encoding apparatus 50 and acquires the basis of the unregistered component, and registers the basis of the unregistered component into the texture DB 63 to update the DB data as the registration substance of the texture DB 63.

It is to be noted that the basis of the unregistered component includes not only a basis of a texture component of a different kind but also a new basis of a texture component that is obtained by new basis learning (a so-to-speak basis of a new version) even if the kind of the texture component is same.

Figure 16:
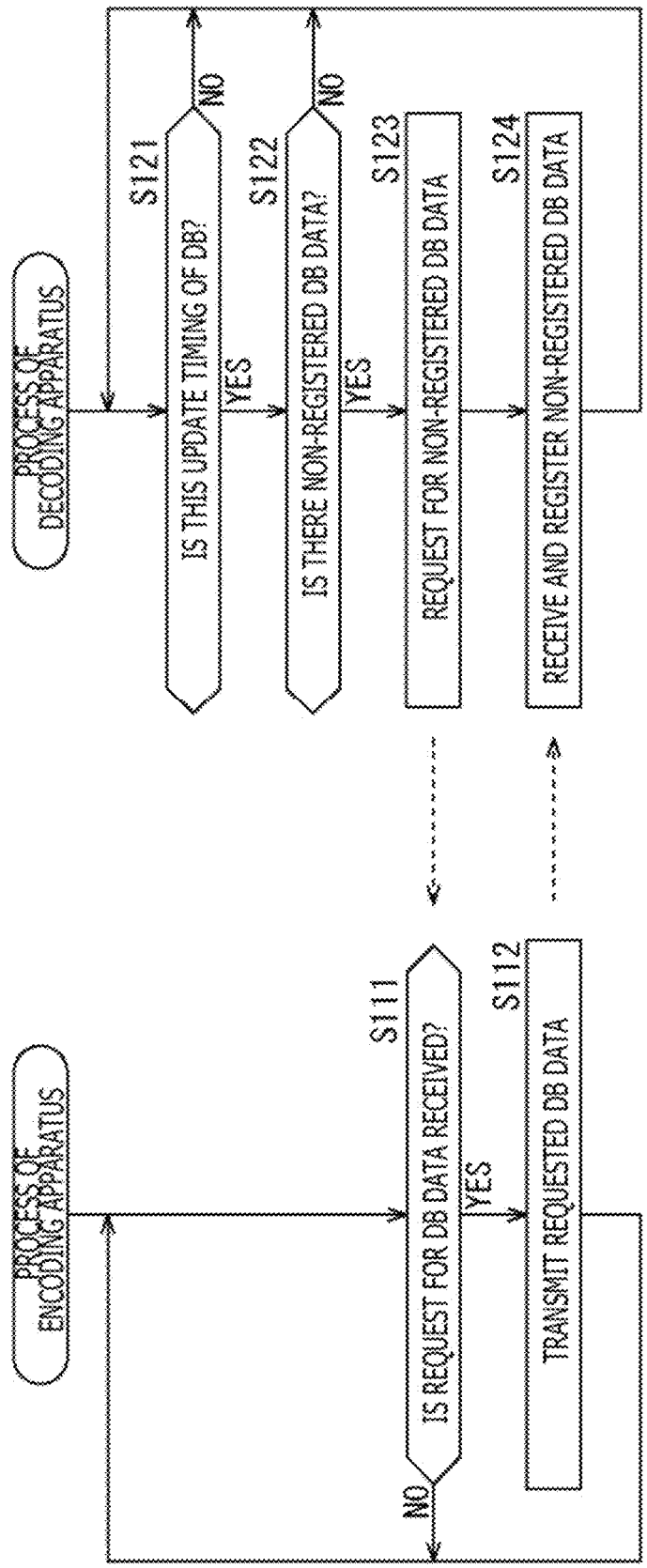
FIG. 16 is a flow chart illustrating an example of a process performed by the encoding apparatus 50 and the decoding apparatus 60 when DB data of a texture DB 63 is updated.

FIG. 16 is a flow chart illustrating an example of processing performed by the encoding apparatus 50 and the decoding apparatus 60 in order to update the DB data of the texture DB 63.

In the encoding apparatus 50, at step S111, the data transmission unit 101 decides whether or not a request for DB data is received from the updating unit 111 of the decoding apparatus 60.

In the case where it is decided at step S111 that a request for DB data is no received, the processing returns to step S111.

On the other hand, in the case where it is decided at step S111 that a request for DB data is received, the processing advances to step S112. At step S112, the data transmission unit 101 acquires the basis (and the identification) of the texture component as DB data for which the request is received from the updating unit 111 from the texture DB 51 and transmits the acquired basis (and identification) to the updating unit 111. Then, the processing returns from step S112 to step S111, and thereafter, similar processes are repeated.

On the other hand, in the decoding apparatus 60, it is decided at step S121 whether or not the updating unit 111 is at an update timing of the texture DB 63.

Here, as the update timing of the texture DB 63, for example, a timing immediately before the decoding unit 62 starts decoding of a certain content, a timing immediately before the decoding unit 62 starts processing of a block after decoding is started, a timing immediately before the decoding unit 62 starts processing of a frame, a periodical or non-periodical timing or some other arbitrary timing can be adopted.

In the case where it is decided at step S121 that the updating unit 111 is not at an update timing of the texture DB 63, the processing returns to step S121.

On the other hand, in the case where it is decided at step S121 that the updating unit 111 is at an update timing of the texture DB 63, the processing advances to step S122.

At step S122, the updating unit 111 decides whether or not unregistered DB data, namely, a basis of an unregistered component that is not registered in the texture DB 63, exists in the bases of texture components registered in the texture DB 51.

In the case where it is decided at step S122 that a basis of an unregistered component does not exist, the processing returns to step S121.

On the other hand, in the case where it is decided at step S122 that a basis of an unregistered component exists, the processing advances to step S123.

At step S123, the updating unit 111 requests the data transmission unit 101 of the encoding apparatus 50 for the unregistered DB data, namely, for the basis of the unregistered component, and the processing advances to step S124.

At step S124, the updating unit 111 waits that the basis of the unregistered component is transmitted from the data transmission unit 101 and receives the basis of the unregistered component. Furthermore, the updating unit 111 registers the basis of the unregistered component from the data transmission unit 101 into the texture DB 63 to update the DB data of the texture DB 63, and the processing returns from step S124 to step S121.

In this manner, in the case where a basis of an unregistered component that is registered in the texture DB 51 of the encoding apparatus 50 but is not registered in the texture DB 63 of the decoding apparatus 60 exists, the decoding apparatus 60 acquires the basis of the unregistered component from the encoding apparatus 50 and registers the basis of the unregistered component into the texture DB 63 such that the DB data of the texture DB 51 of the encoding apparatus 50 are included in the DB data of the texture DB 63 of the decoding apparatus 60.

<Eighth Example of Configuration of Codec>

Figure 17:
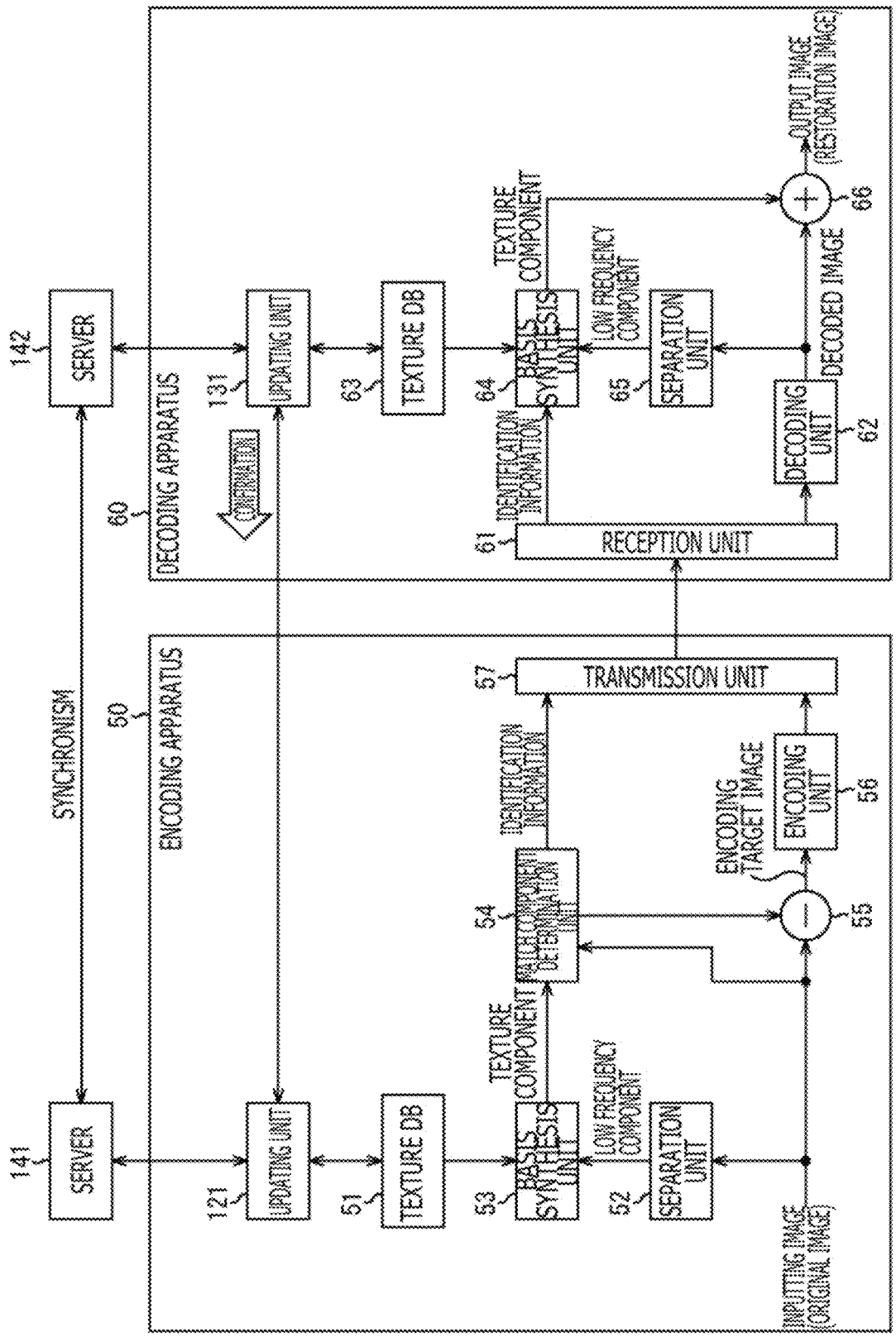
FIG. 17 is a block diagram depicting an eighth example of a configuration of a codec that restores a texture lost upon encoding.

FIG. 17 is a block diagram depicting an eighth example of a configuration of a codec that restores a texture lost by encoding.

In particular, an example of a configuration of the codec in which the bases of the texture components in the texture DBs 51 and 63 can be updated.

It is to be noted that, in FIG. 17, elements corresponding to those of the case of FIG. 6 are denoted by same reference numerals, and description of them is hereinafter omitted suitably.

In FIG. 17, the codec is common to that of the case of FIG. 6 in that it includes an encoding apparatus 50 and a decoding apparatus 60.

Further, referring to FIG. 17, the encoding apparatus 50 is common to that in the case of FIG. 6 in that it includes the elements from the texture DB 51 to the transmission unit 57, and the decoding apparatus 60 is common to that in the case of FIG. 6 in that it includes the elements from the reception unit 61 to the synthesis unit 66.

However, in FIG. 17, the encoding apparatus 50 is different from that in the case of FIG. 6 in that it newly includes an updating unit 121. Further, in FIG. 17, the decoding apparatus 60 is different from that in the case of FIG. 6 in that it newly includes an updating unit 131.

The updating unit 121 accesses an external server 141 such as a server on the Internet or the like as occasion demands and acquires bases of texture components (and identification information) from the server 141.

In particular, in the server 141, bases of various kinds of texture components are suitably uploaded, and the updating unit 121 downloads a basis of a predetermined texture component from the server 141 as occasion demands to acquire the basis of the predetermined texture component.

Furthermore, the updating unit 121 registers the basis of the texture component acquired from the server 141 into the texture DB 51 to update the DB data of the texture DB 51.

Here, the updating unit 121 can determine a basis of a texture to be acquired from the server 141 as occasion demands.

In particular, the updating unit 121 can acquire a basis of a texture component with which the quality of an original image as an input image to be encoded by the encoding apparatus 50 can be maintained (which is appropriate to maintain the quality) in response to the quality of the original image as the input image, particularly, for example, in response to the S/N of the image, the resolution (whether the image is a SD (Standard Definition) image or a HD (High Definition) image or the like), the frequency band or the like.

Further, for example, in the case where a basis of a new texture component such as a basis that is new in version although it is a basis of a texture of an existing kind (for example, a basis of a texture component having a higher representation effect), a basis of a texture component of a new kind or the like is uploaded to the server 141, the updating unit 121 can acquire the basis of the new texture component.

It is to be noted that the updating unit 121 not only can download (acquire) a basis of a texture component from the server 141 but also can upload a basis of a texture component registered in the texture DB 51 to the server 141 as occasion demands.

The updating unit 131 refers to the bases of texture components as the DB data registered in the texture DB 51 through the updating unit 121 of the encoding apparatus 50 to determine whether or not a basis of an unregistered component that is not registered in the texture DB 63 of the decoding apparatus 60 exists in the bases of the texture components registered in the texture DB 51.

In the case where a basis of an unregistered component exists, the updating unit 131 accesses an external server 142 such as a server on the Internet or the like. Then, the updating unit 131 requests the server 142 and acquires the basis of an unregistered component and then registers the basis of the unregistered component into the texture DB 63 to update such that the DB data of the texture DB 51 are included into the DB data of the texture DB 63.

Here, the servers 141 and 142 are in a synchronized state with each other and accordingly have same bases of texture components.

Further, while, in FIG. 17, the updating unit 121 accesses the server 141 and the updating unit 131 accesses the server 142, the updating unit 121 can access any one of the servers 141 and 142. This similarly applies also to the updating unit 131.

Further, while, in FIG. 17, the server 141 to be accessed by the updating unit 121 and the server 142 to be accessed by the updating unit 131 are prepared separately from each other, as the server 141 to be accessed by the updating unit 121 and the server 142 to be accessed by the updating unit 131, for example, a same server such as a server on the cloud or the like can be adopted.

It is to be noted that updating of DB data of the texture DB 51 by the updating unit 121 of the encoding apparatus 50 is not essentially required. However, in the case where updating of DB data of the texture DB 51 is to be performed, for example, by performing, for each stream of an original image as an input image, updating of switching the basis of a texture component to be registered into the texture DB 51, even in the case where the capacity of the texture DB 51 is restricted to some degree, an input image can be processed using a basis of a texture component suitable for the input image.

Further, updating of DB data of the texture DB 51 by the updating unit 121 of the encoding apparatus 50 or updating of DB data of the texture DB 63 by the updating unit 131 of the decoding apparatus 60 can be performed at an arbitrary timing, for example, similarly as in the case of the updating unit 111 of FIG. 15.

<Ninth Example of Configuration of Codec>

Figure 18:
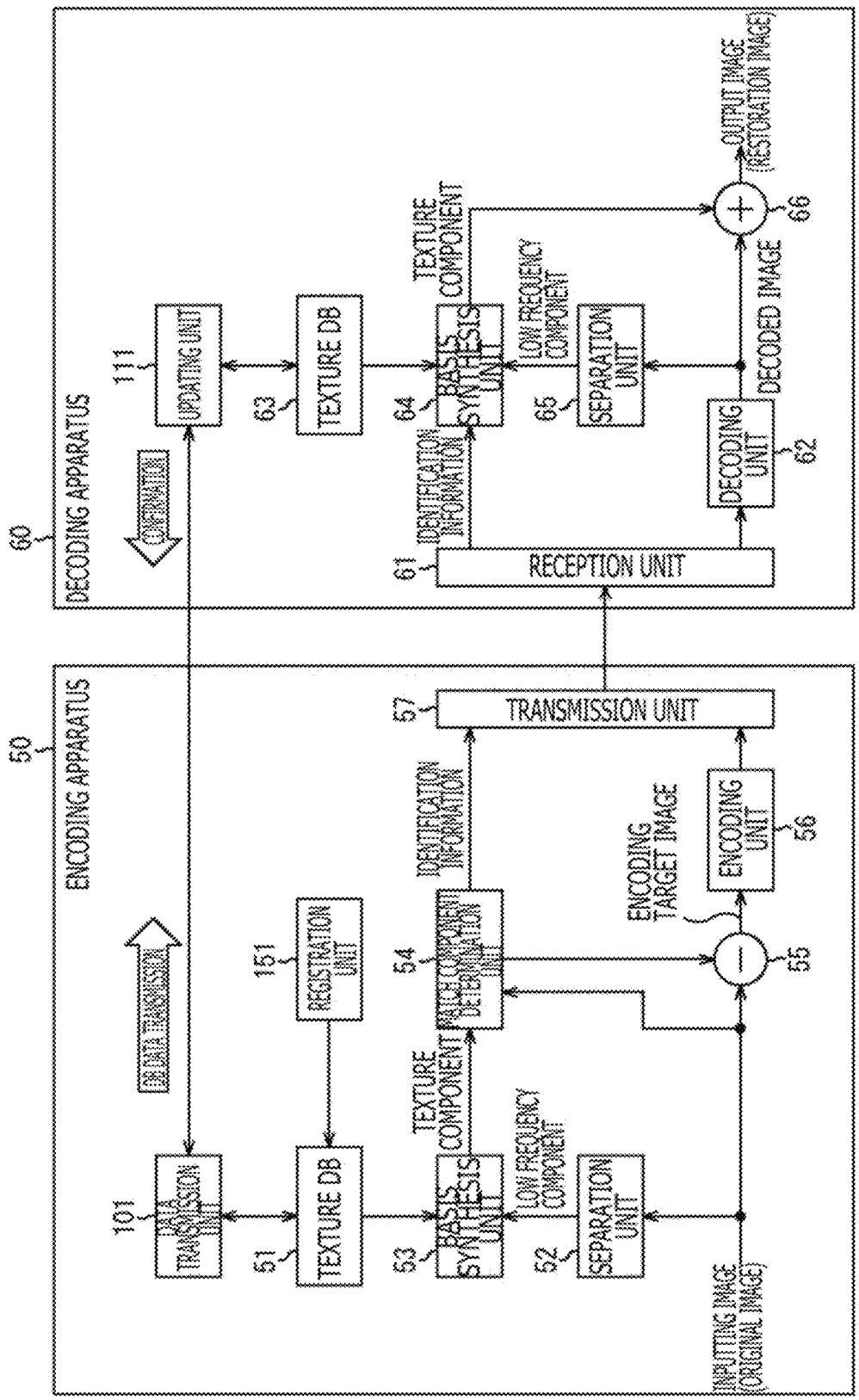
FIG. 18 is a block diagram depicting a ninth example of a configuration of a codec that restores a texture lost upon encoding.

FIG. 18 is a block diagram depicting a ninth example of a configuration of a codec that restores a texture lost upon encoding.

In particular, FIG. 18 depicts an example of a configuration of a codec in which the basis of a texture component in the texture DBs 51 and 63 is possible.

It is to be noted that, in FIG. 18, elements corresponding to those of the case of FIG. 15 are denoted by same reference numerals, and description of them is hereinafter omitted suitably.

Referring to FIG. 18, the codec is common to that in the case of FIG. 15 in that it includes an encoding apparatus 50 and a decoding apparatus 60.

Further, in FIG. 18, the encoding apparatus 50 is common to that in the case of FIG. 15 in that it includes elements from a texture DB 51 to a transmission unit 57 and a data transmission unit 101, and the decoding apparatus 60 is common to that in the case of FIG. 15 in that it includes elements from a reception unit 61 to a synthesis unit 66 and an updating unit 111.

However, in FIG. 18, the encoding apparatus 50 is different from that of FIG. 15 in that it newly includes a registration unit 151.

The registration unit 151 registers a basis of a texture component appropriate for encoding an input image into the texture DB 51. It is to be noted that, although necessary information is supplied from other blocks to the registration unit 151, connection lines for supplying information to the registration unit 151 are omitted in order to prevent the illustrating from being complicated.

<Tenth Example of Configuration of Codec>

Figure 19:
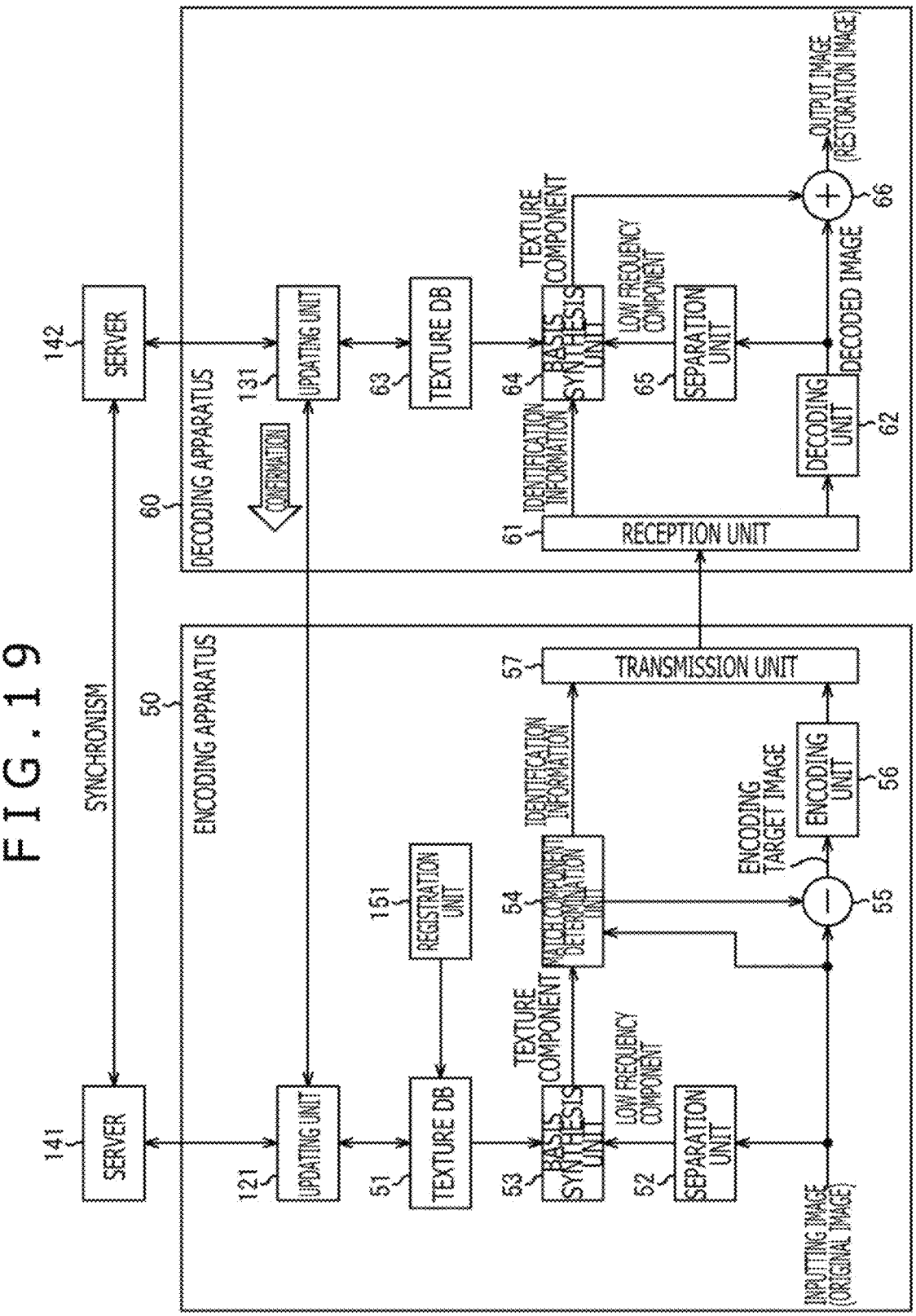
FIG. 19 is a block diagram depicting a tenth example of a configuration of a codec that restores a texture lost upon encoding.

FIG. 19 is a block diagram depicting a tenth example of a configuration of a codec that restores a texture lost upon encoding.

In particular, FIG. 19 depicts an example of a configuration of a codec in which updating of the basis of a texture component in the texture DBs 51 and 63 is possible.

It is to be noted that, in FIG. 19, elements corresponding to those in the case of FIG. 17 or 18 are denoted by same reference numerals, and description of them is hereinafter omitted suitably.

Referring to FIG. 19, the codec is common to that of FIG. 17 in that it includes an encoding apparatus 50 and a decoding apparatus 60.

Further, in FIG. 19, the encoding apparatus 50 is common to that in the case of FIG. 17 in that it includes elements from a texture DB 51 to a transmission unit 57 and an updating unit 121, and the decoding apparatus 60 is common to that of FIG. 17 in that it includes elements from a reception unit 61 to a synthesis unit 66 and an updating unit 131.

However, in FIG. 19, the encoding apparatus 50 is different from that of FIG. 17 in that it newly includes the registration unit 151 of FIG. 18.

<Example of Configuration of Registration Unit 151>

Figure 20:
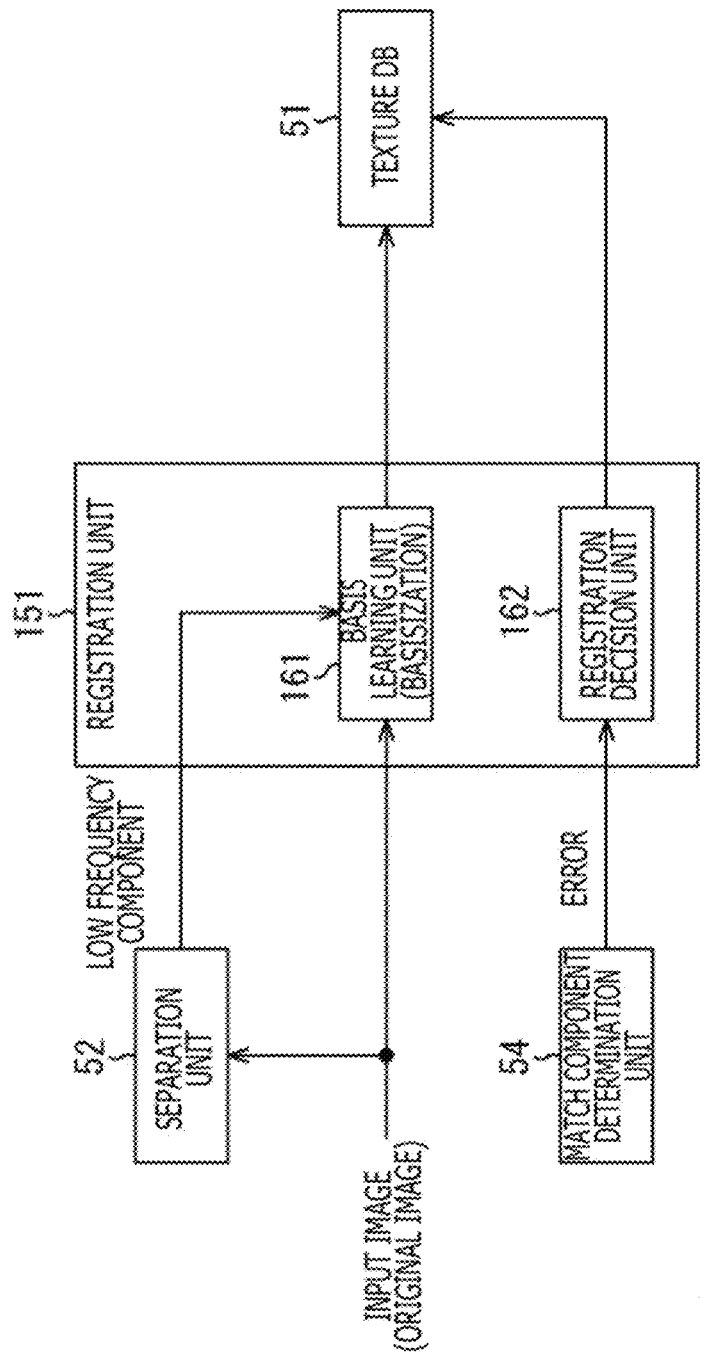
FIG. 20 is a block diagram depicting an example of a configuration of a registration unit 151.

FIG. 20 is a block diagram depicting an example of a configuration of the registration unit 151 of FIGS. 18 and 19.

Referring to FIG. 20, the registration unit 151 includes a basis learning unit 161 and a registration decision unit 162.

To the basis learning unit 161, an input image is supplied and a low frequency component of the input image is supplied from the separation unit 52.

The basis learning unit 161 uses, for example, an input image and a low frequency component of the input image as a pair of a high resolution image and a lower resolution image described hereinabove with reference to FIG. 7 to perform basis learning to generate, in regard to a texture included in the input image, a basis of a texture component (for example, a pair of a high resolution basis and a low resolution basis described hereinabove with reference to FIG. 7).

Then, the basis learning unit 161 temporarily registers the basis of the texture component generated by the basis learning as a basis of a new texture component into the texture DB 51 together with identification information for identifying the new texture components.

It is to be noted that the basis learning by the basis learning unit 161 and temporary registration of the basis (and identification information) of the new texture component obtained by the basis learning into the texture DB 51 can be performed at arbitrary timings.

In particular, the basis learning by the basis learning unit 161 and the temporary registration of the basis of the new texture component can be performed, for example, every time a frame of an input image is supplied to the encoding apparatus 50, for each frame.

Further, the basis learning by the basis learning unit 161 and the temporary registration of the basis of the new texture component can be performed when the error of a match component in the case where, for example, the basis of the new texture component is not registered in the texture DB 51 from the input image is equal to or greater than a threshold value.

The error of the match component from the input image can be calculated, for example, in a unit of a frame. Furthermore, as the error of the match component from the input image, a difference between pixel values of the match component and the input image, a difference between predetermined feature amounts such as activity or the like between the match component and the input image or the like can be adopted.

To the registration decision unit 162, an error of a restoration component when, in regard to each texture component whose basis is registered in the texture DB 51, a texture of (a noticed block of) the input image generated from the basis of the texture component from the input image is supplied from the match component determination unit 54.

The registration decision unit 162 performs registration decision regarding whether or not the basis of the new texture component is to be definitively registered using the error of the restoration component or the like from the match component determination unit 54.

Then, in the case where the registration decision unit 162 decides that the basis of the new texture component is to be definitively registered, it definitively registers the basis of the new texture component temporarily registered in the texture DB 51 into the texture DB 51.

In particular, the registration decision unit 162 uses the error of the restoration component from the match component determination unit 54 to recognize whether or not the error of the restoration component generated from the basis of the new texture component is a minimum error among errors of the restoration components generated from the bases of the new texture components registered in the texture DB 51.

Then, in the case where the error of the restoration component generated from the basis of the new texture component is a minimum error, namely, in the case where the new texture component is a match component, the registration decision unit 162 decides whether or not a definitive registration condition as a predetermined condition determined in advance to perform definitive registration is satisfied. Then, in the case where the definitive registration condition is satisfied, the registration decision unit 162 decides that the basis of the new texture component is to be definitively registered and definitively registers the basis of the new texture component.

As the definitive registration condition, for example, that the S/N ratio of the match component (new texture component) in the case where the basis of the new texture component is registered in the texture DB 51 to the input image is superior by a fixed value or more to the S/N of the match component in the case where the basis of the new texture component is not registered in the texture DB 51 to the input image or the like can be adopted.

Further, as the definitive registration condition, for example, that an RD (Rate-Distortion) curve in the case where the basis of the new texture component is registered in the texture DB 51 is superior by a fixed value or more to an RD curve in the case where the basis of the new texture component is not registered in the texture DB 51 or the like can be adopted.

It is to be noted that the registration decision unit 162 can definitively register the basis of the new texture component, for example, in the case where, irrespective of the definitive registration condition, the error of the restoration component generated from the basis of the new texture component is a minimum error among errors of restoration components generated from the bases of the texture components registered in the texture DB 51.

Furthermore, in the case where the definitive registration condition is satisfied, the registration decision unit 162 can definitively register the basis of the new texture component even if the error of the registration condition generated from the basis of the new texture component is not a minimum error among the errors of the restoration components generated from the bases of the texture components registered in the texture DB 51.

Here, as a method for definitive registration of the basis of the new texture component, for example, a method of adding and a method of overwriting (changing) the basis of the new texture component to (on) the texture DB 51 are available.

In the addition of the basis of the new texture component, the basis of the new texture component is registered in such a form that it is added to the bases of the texture components registered in the texture DB 51.

In the overwriting of the basis of the new texture component, the basis of the new texture component is registered in such a form that it is overwritten on the basis of some texture component registered in the texture DB 51. In the overwriting of the basis of the new texture component, the basis of the new texture component can be overwritten, for example, on the basis of a texture component that has not been determined as a match component, the basis of a texture component whose timing at which it is determined as a match component is in the most past or a like basis from among the bases of the texture components registered in the texture DB 51.

With the overwriting of the basis of the new texture component, the capacity of the texture DB 51 can be saved.

It is to be noted that the case of addition and the case of overwriting of the basis of the new texture component are different in data amount of the bases of the texture components registered in the texture DB 51. Further, if the data amount differs, then the RD curve differs. Therefore, in the case where it is adopted as the definitive registration condition that the RD curve in the case where the basis of the new texture component is registered in the texture DB 51 is superior by a fixed value or more to the RD curve in the case where the basis of the new texture component is not registered in the texture DB 51, if RD curves in the case of addition and in the case of overwriting of the basis of the new texture component are determined, then it can be determined in response to the RD curves whether the basis of the new texture component is to be added or to be overwritten.

Figure 21:
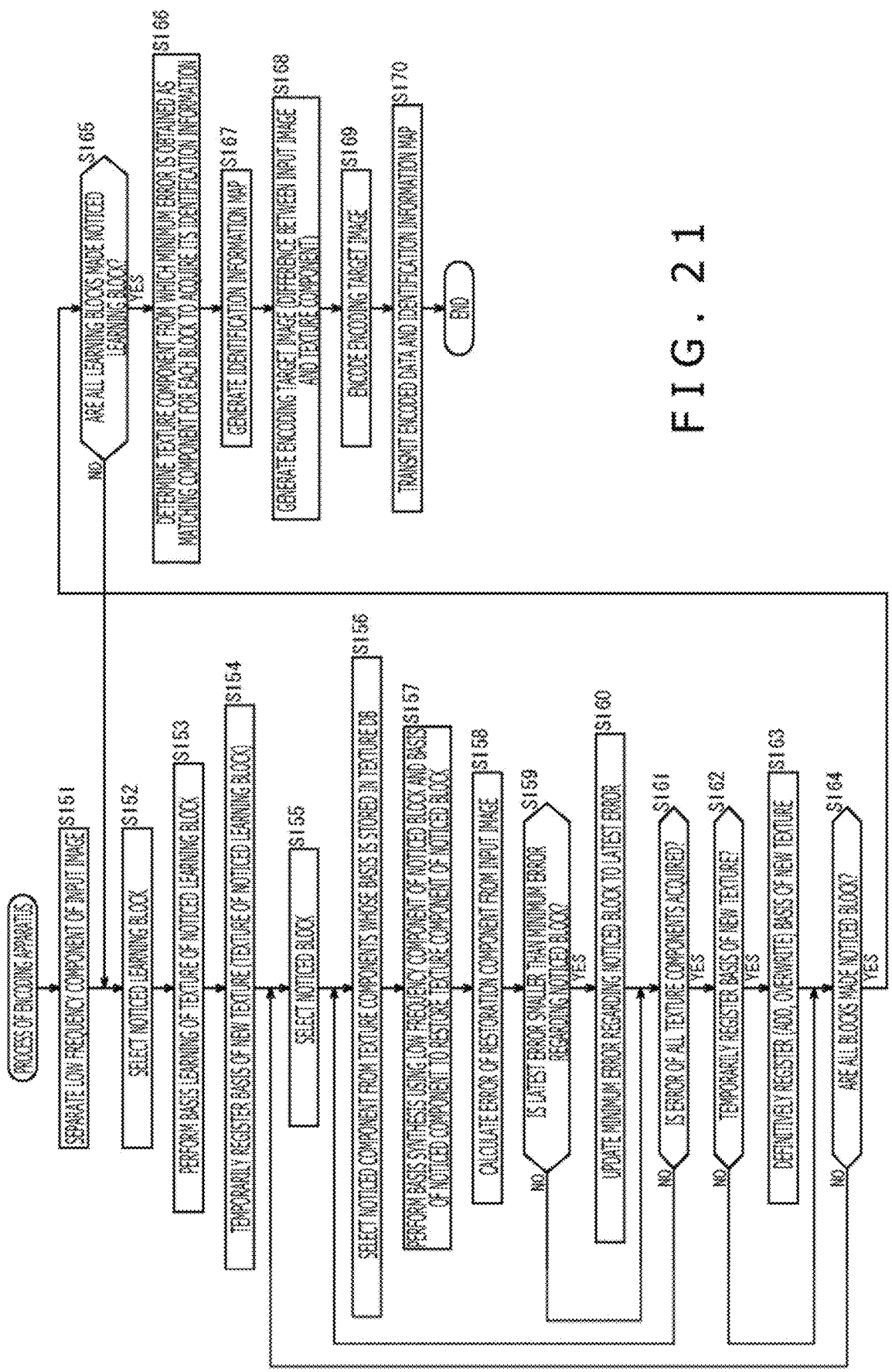
FIG. 21 is a flow chart illustrating an example of an encoding process of the encoding apparatus 50.

FIG. 21 is a flow chart illustrating an example of an encoding process of the encoding apparatus 50 of FIGS. 18 and 19.

It is to be noted that, in FIG. 21, basis learning by the basis learning unit 161 and temporary registration of a basis of a new texture component are performed for each frame every time a frame of an input image is supplied to the encoding apparatus 50.

The encoding apparatus 50 performs an encoding process in accordance with the flow chart of FIG. 21 successively taking each of frames of an input image supplied to the encoding apparatus 50 as a noticed frame.

In particular, at step S151, the separation unit 52 separates a low frequency component from a noticed frame of an input image and supplies the low frequency component to the basis synthesis unit 53 and the registration unit 151.

The basis learning unit 161 of the registration unit 151 (FIG. 20) divides the noticed frame of the input image into learning blocks as units for which basis learning is performed, and the processing advances from step S151 to step S152.

At step S152, the basis learning unit 161 selects one learning block that has not been selected as noticed learning block as yet as a noticed learning block from among the learning blocks of the noticed frame of the input image, and the processing advances to step S153.

At step S153, the basis learning unit 161 performs basis learning for converting a texture of the noticed learning block into a basis texture, and the processing advances to step S154.

In particular, the basis learning unit 161 uses a pair of the noticed learning block and a block at a same position as that of the noticed learning block within the low frequency component of the input image from the separation unit 52 as the pair of a high resolution image and a low resolution image described hereinabove with reference to FIG. 7 to perform basis learning to generate of bases of a texture component of the noticed learning block (for example, a pair of a high resolution basis and a low resolution basis described hereinabove with reference to FIG. 7).

At step S154, the basis learning unit 161 determines the basis of the texture component of the noticed learning block obtained by the basis learning as the basis of the new texture component and registers the basis (and identification information) of the new texture component into the texture DB 51.

Thereafter, the basis synthesis unit 53 divides the noticed frame of the input image into blocks for defining a match component. Then, the processing advances from step S154 to step S155, at which the basis synthesis unit 53 selects, from among the blocks of the noticed frame of the input image, one block that has not been selected as the noticed block as yet as a noticed block, and the processing advances to step S156.

At step S156, the basis synthesis unit 53 selects, from a plurality (of kinds) of texture components whose basis is registered (including temporary registration) in the texture DB 51, one texture component that has not been selected as a noticed component as yet as a noticed component, and the processing advances to step S157.

At step S157, the basis synthesis unit 53 performs, for example, basis synthesis described hereinabove with reference to FIG. 8 using the low frequency component of the noticed block from among the low frequency components of the input image from the separation unit 52 and the basis of the noticed component to determine a restoration component that restores the texture component of the noticed block.

The basis synthesis unit 53 supplies the restoration component of the noticed block to the match component determination unit 54, and the processing advances from step S157 to step S158.

At step S158, the match component determination unit 54 calculates an error of the restriction component of the noticed block with respect to the noticed block of the input image, and the processing advances to step S159.

At step S159, the match component determination unit 54 decides whether or not the error of the restoration component of the noticed block is smaller than a minimum error regarding the noticed block.

Here, the minimum error regarding the noticed block is a minimum value among errors of the restoration component of the noticed block determined with regard to texture components selected as a noticed component up to now from among the texture components whose basis is registered in the texture DB 51 similarly as in the case described hereinabove with reference to FIG. 9, and a predetermined high value is adopted as an initial value of the minimum error for a noticed block is adopted.

In the case where it is decided at step S159 that the error of the restoration component of the noticed block is not smaller than the minimum error regarding the noticed block, the processing skips step S160 and advances to step S161.

On the other hand, in the case where it is decided at step S159 that the error of the restoration component of the noticed block is smaller than the minimum error regarding the noticed block, the processing advances to step S160.

At step S160, the match component determination unit 54 updates the minimum error regarding the noticed block to the error of the restoration component of the noticed block, namely, to the latest error, and the processing advances to step S161.

At step S161, the match component determination unit 54 decides whether or not the error of the restoration component of the noticed block has been acquired in regard to all texture components whose basis is registered in the texture DB 51.

In the case where it is decided at step S161 that the error of the restoration component of a noticed block has not yet been acquired in regard to all texture components whose basis is registered in the texture DB 51, the processing advances to step S156.

In other words, in the case where a texture component that has not been selected as a noticed component as yet exists among the texture components whose basis is registered in the texture DB 51, the processing returns from step S161 to step S156, whereafter the processes described above are repeated.

On the other hand, in the case where it is decided at step S161 that the error of the restoration component of the noticed block has been acquired in regard to all texture components whose basis is registered in the texture DB 51, the processing advances to step S162.

In other words, in the case where the error of the restoration component of the noticed block has been determined in regard to all of the texture components whose basis is registered in the texture DB 51, the processing advances from step S161 to step S162.

At step S162, the registration decision unit 162 of the registration unit 151 (FIG. 20) performs registration decision regarding whether or not the basis of the new texture component is to be definitively registered.

In the case where it is decided at step S162 that the basis of the new texture component is not to be definitively registered, the processing skips step S163 and advances to step S164.

In particular, for example, in the case where, in regard to the texture components whose basis is registered in the texture DB 51, the error of the restoration component obtained from the basis of the new texture component among errors of the restoration component of the noticed block obtained by the match component determination unit 54 is not a minimum error or, even if the error is a minimum error, a definitive registration condition is not satisfied, it is decided that the basis of the new texture component is not to be definitively registered, and definitive registration of the basis of the new texture component is not performed.

On the other hand, in the case where it is decided at step S162 that the basis of the new texture component is to be definitively registered, the processing advances to step S163. At step S163, the registration decision unit 162 definitively registers the basis of the new texture component temporarily registered in the texture DB 51 into the texture DB 51, and the processing advances to step S164.

In particular, in the case where, in regard to the texture components whose basis is registered in the texture DB 51, the error of the restoration component obtained from the basis of the new texture component among the errors of the restoration component of the noticed block obtained by the match component determination unit 54 is a minimum error and besides the definitive registration condition is satisfied, it is decided that the basis of the new texture component is to be registered, and definitive registration of the basis of the new texture component is performed.

At step S164, the basis synthesis unit 53 decides whether or not all blocks of the noticed frame of the input image have been selected as a noticed block.

In the case where it is decided at step S164 that all blocks of the noticed frame of the input image have not yet been selected as a noticed block, the processing returns to step S155, and thereafter, similar processes are repeated.

On the other hand, in the case where it is decided at step S164 that all blocks of the noticed frame of the input image have been selected as a noticed block, the processing advances to step S165.

At step S165, the basis learning unit 161 of the registration unit 151 (FIG. 20) decides whether or not all learning blocks of the noticed frame of the input image have been selected as a noticed learning block.

In the case where it is decided at step S165 that all learning blocks of the noticed frame of the input image have not yet been selected as a noticed learning block, the processing returns to step S152, and thereafter, similar processes are repeated.

On the other hand, in the case where it is decided at step S165 that all learning blocks of the noticed frame of the input image have been selected as a noticed learning block, the processing advances to step S166.

At step S166, the match component determination unit 54 determines, in regard to each block of the noticed frame of the input image, a texture component in regard to which a minimum error is obtained among texture components as restoration components of the block as a match component. Furthermore, the match component determination unit 54 acquires identification information of the match component in regard to each block of the noticed frame of the input image, and the processing advances from step S66 to step S167.

At step S167, the transmission unit 57 generates an identification information map that associates the blocks of the noticed frame of the input image and the identification information of match components of the blocks (identification information from the match component determination unit 54) with each other, and the processing advances to step S168.

It is to be noted that the registration decision unit 162 of the registration unit 151 (FIG. 20) deletes the basis (and the identification) of the temporarily registered texture component, which is not registered definitively in the texture DB 51 and but is temporarily registered at this point of time, from the texture DB 51.

At step S168, the removal unit 55 generates a low frequency component (of the noticed frame) of the input image obtained by removing the match component of the blocks from the basis synthesis unit 53 from the blocks of the noticed frame of the input image, namely, the difference between the input image and the texture component as the match component as an encoding target image and supplies the generated encoding target image to the encoding unit 56, and the processing advances to step S169.

At step S169, the encoding unit 56 encodes the encoding target image from the removal unit 55 by a non-reversible encoding method and supplies encoded obtained as a result of the encoding to the transmission unit 57, and the processing advances to step S170.

At step S170, the transmission unit 57 transmits the identification information map and the encoded data from the encoding unit 56, and the encoding apparatus 50 ends the processing for the noticed frame of the input image.

It is to be noted that, since the decoding process of the decoding apparatus 60 of FIGS. 18 and 19 is similar to the decoding process described with reference to FIG. 10, description of the same is omitted.

In the codec described above, the information amount of identification information to be transmitted from the encoding apparatus 50 (or 30) to the decoding apparatus 60 (or 40) not only can be controlled to a fixed value but also can be controlled to a variable value. Not only in the case where the information amount of identification information is controlled to a fixed value but also in the case where the information amount of identification information is controlled to a variable value, as the information amount of identification information increases, the transmission efficiency degrades by an amount corresponding to the increasing information amount. However, it is possible to improve the picture quality of a decoded image (output image) as much.

Here, a block of a target whose match component is to be determined in an input image or a block of a target whose match component is to be synthesized in a decoded image is referred to as target block. Further, a block (region) of a texture component to be generated by basis synthesis is referred to as texture block.

Further, as the information amount of identification information, for example, a data amount of identification information to be transmitted with respect to an input image of one frame (picture) is adopted. In this case, the information amount of identification information is represented by the bit number of one piece of identification information×number of target blocks that configure the input image of one frame.

It is to be noted that, although all of the target blocks that configure the input image of one frame need not have an equal size, in order to simplify the description, it is assumed here that all of the target blocks that configure the input image of one frame have an equal size.

For example, in the case where one frame of the input image is a HD (High Definition) image of 1920×1080 pixels and a block of 192×108 pixels obtained by dividing the image into 10 in both of the horizontal and vertical directions is a target block, one frame is configured from 100 target blocks. In this case, the number of pieces of identification information of one frame is 100 equal to the number of target blocks. Further, for example, in the case where one frame is configured from 1000 target blocks, the number of pieces of identification information of one frame is 1000 equal to the number of target blocks.

It is to be noted that, as the number of target blocks that configure one frame increases, the size of the target blocks decreases. Although, in the present embodiment, though not depicted, it is presupposed that the size of a target block and the size of a texture block generated by basis synthesis are equal to each other, the sizes of a target block and a texture block may not be equal to each other. In other words, as a target block, a block of a size equal to or smaller than that of a texture block can be adopted. In the case where a target block is smaller than a texture block, for example, the texture at a portion such as a central portion or the like of a texture block can be adopted as a texture of a target block.

As the size of a target block decreases, the picture quality of a restoration image (output image) obtained by synthesis of a decoded image and a texture component as a match component generally improves.

It is to be noted that the size of a target block is restricted to a size equal to or smaller than the size of a texture block. Accordingly, the input image cannot be divided into target blocks of a size exceeding the size of a texture block, and the number of target blocks when an input image is divided into target blocks is restricted by the size of a texture block.

In the case where the information amount of identification information is controlled to a fixed value in the codec, the bit number of one piece of identification information and the number of target blocks of one frame are individually controlled to fixed values. Alternatively, the bit number of one piece of identification information and the number of target blocks of one frame are individually controlled to variable values such that the information amount of identification information=bit number of one piece of identification information×number of target blocks of one frame becomes a fixed value.

It is to be noted that, in the case where (bases of) 2N texture components are stored in the texture DB 51 (similarly also with regard to the texture DBs 31, 43 and 63), the 2N texture components can be identified by identification information of N bits. In this case, for example, by associating the 2N texture components stored in the texture DB 51 with the 2N pieces of identification information represented by N bits and by associating the $2N^{-1}$ texture components from among the 2N texture components stored in the texture DB 51 with the $2N^{-1}$ pieces of identification information represented, for example, by N−1 bits smaller than N bits, the number of bits of identification information can be controlled to N bits or N−1 bits.

Further, the number of target blocks of one frame can be controlled within a range within which a target block becomes a block of a size equal to or smaller than the size of a texture block.

In the case where the information amount of identification information is controlled to a variable value in the codec, one or both of the bit number of one piece of identification information and the number of target blocks of one frame are adaptively controlled to a variable value.

Here, in the case where the information amount of identification information is controlled to a variable value, it is possible to adaptively control the information amount of identification information in response to the picture quality (bitrate) of an input mage, the size (pixel number) of one frame, the genre (for example, sports, animation, movie and so forth) and so forth.

Further, in the codec, in addition to identification information, additional information that can be used for generation of a texture component that contributes to improvement of the picture quality of a decoded image can be generated by the encoding apparatus 50 (or 30) and transmitted to the decoding apparatus 60 (or 40).

As (the type of) the additional information, for example, gain information that determines the amplitude of a texture component as a match component, a parameter that can be used for generation of a texture component, an image feature amount of an input image and so forth are available.

The gain information as the additional information is used for control of the gain of a texture component obtained by basis synthesis. In particular, in the basis synthesis, a texture component whose amplitude is normalized is determined as occasion demands. The gain information can be used for determination of an amplitude of a texture component whose amplitude is normalized.

As the parameter as the additional information, for example, band information of a texture of an input image (a result of FFT (Fast Fourier Transform) of a texture of an input image or the like) and so forth are available.

For example, in the case where the degree to which a texture component as a match component that best matches with (a target block of) an input image among texture components stored in the texture DB 51 (and the texture DBs 31, 43 and 63) matches with the input image is equal to or lower than a threshold value, the encoding apparatus 50 (or 30) can transmit the band information as the additional information to the decoding apparatus 60 (or 40).

In this case, the decoding apparatus 60 can improve the picture quality of a decoded image by filtering a texture component as a match component such that it has a band similar to the band represented by the band information as the additional information and synthesizing the texture component after the filtering with the decoded image.

Further, as the image feature amount as the additional information, a DR (dynamic range) of pixel values in a predetermined region such as one frame, a target block or the like of the input image, the variance of the DR, an adjacent pixel difference of the input image, luminance information of the input image and so forth are available.

For example, in the case where the degree to which the texture component as a match component that best matches with the input image among the texture components stored in the texture DB 51 matches with the input image is equal to or lower than the threshold value, the encoding apparatus 50 can transmit the image feature amount as the additional information to the decoding apparatus 60.

In this case, the decoding apparatus 60 can improve the picture quality of a decoded image by processing the texture component as the match component such that it becomes a texture component of the image feature amount similar to the image feature amount as the additional information and synthesizing the texture component after the processing with the decoded image.

In the codec, the number of pieces of additional information to be transmitted from the encoding apparatus 50 to the decoding apparatus 60 can be increased or decreased, for example, depending upon such conditions as a processing performance of the codec (or an incorporating apparatus in which the codec is incorporated), the operation cost (power consumption, heat generation and so forth) and so forth.

For example, in the case where the processing performance of the codec is high, namely, in the case where it is permitted that the number of times of arithmetic operations necessary for processing per one pixel is great (number of times of arithmetic operation per unit time period is great), in the case where the power versus operating cost is superior or in a like case, it is possible to additionally transmit, in addition to the identification information, a parameter or an image feature amount as the additional information to improve the picture quality of a decoded image.

Further, for example, in the case where the processing performance of the codec is low, it is possible to transmit gain information as the additional information in a unit of one pixel from the encoding apparatus 50 to the decoding apparatus 60. In this case, in the decoding apparatus 60, the gain information in a unit of one pixel can be used as it is for control of the amplitude of the texture component.

Furthermore, in the case where the processing performance of the codec is high, it is possible to reduce the transmission amount of the additional information by transmitting gain information as the additional information in a unit of a plurality of pixels from the encoding apparatus 50 to the decoding apparatus 60. In this case, in the decoding apparatus 60, the gain information of a unit of a plurality of pixels can be used for control of the amplitude of a texture component by performing interpolation such that the gain information becomes gain information of a unit of one pixel.

It is to be noted that, in a conventional non-reversible encoding method such as HEVC or the like, a texture of an image is subjected to DCT (Discrete Cosine Transform) and is quantized further, whereafter it is transmitted. In this case, in order to improve the picture quality of the texture, it is necessary to increase the transmission rate and perform quantization with a fine quantization step.

On the other hand, in the encoding apparatus 50 (or 30), a texture is transmitted by identification information. In this manner, the encoding apparatus 50 is different from that of a conventional non-reversible encoding method in that a texture is transmitted by identification information in the encoding apparatus 50.

Here, the applicant of the present application has proposed a classification adaptive process previously.

In the classification adaptive process, for example, a first image is converted into a second image. In such a classification adaptive process, a pixel that becomes a prediction tap to be used for prediction arithmetic operation for determining a pixel value of a corresponding pixel of the second image corresponding to a noticed pixel noticed in the first image is selected from within the first image, and the noticed pixel is classified into one of a plurality of classes in accordance with a fixed rule. Then, in the classification adaptive process, from tap coefficients to be used for prediction arithmetic operation for a plurality of classes determined by learning that minimizes the sum total of square errors as statistical errors between a result of prediction arithmetic operation in which a child image corresponding to the first image is used and a teacher image corresponding to the second image, the tap coefficient of the class of the noticed pixel is acquired, and a pixel value of a corresponding pixel is determined by performing prediction arithmetic operation in which the tap coefficient of the class of the noticed pixel and the prediction tap of the noticed pixel are used.

In the classification adaptive process, in learning of a tap coefficient, a tap coefficient is determined using it as a norm for determination of a tap coefficient that the sum total of square errors of a result of prediction arithmetic operation in which a child image corresponding to the first image is used and a teacher image corresponding to the second image is minimized.

Also in the encoding apparatus 50 (or 30), as a match component determination norm for determining a match component that matches with an input image among texture components stored in the texture DB 51 (or 31), it can be adopted that the sum total of square errors between an input image and a texture component is minimized (hereinafter referred to as square error minimum norm) similarly as in the classification adaptive process.

Furthermore, the encoding apparatus 50 can control the picture quality or the subjective performance (mainly of a texture) of a decoded image by adopting a norm other than the square error minimum norm as a match component determination norm.

As the match component determination norm other than the square error minimum norm, for example, SSIM (Structural Similarity) that is an index proximate to qualitative or the like can be used.

The present technology is different from the classification adaptive process that adopts the square error minimum norm in that it is possible to adopt a norm other than the square error minimum norm as the match component determination norm and control the picture quality or the subjective performance of a decoded image in such a manner as described above.

Here, the subjective performance signifies a performance that an image characteristic such as, for example, refinement, sharpness, a sense of resolution, a sense of contrast and so forth acts on qualitative recognition or impression of an evaluator who evaluates the picture equality.

A match component determination norm by which, from an input image of a certain particular subjective performance or picture quality, a decoded image of a desired subjective performance or picture quality (for example, a decoded image from which more refinement or sharpness can be sensed or the like) is obtained can be created (designed) by repeating, for an input image of a particular subjective performance or picture quality, a qualitative evaluation examination performed by an adjuster, a user or the like of the codec.

Upon creation of such a match component determination norm by which a decoded image of a desired subjective performance or picture quality is obtained as described above, it is necessary that (a subjective performance or picture quality of) an input image to be used for such creation is known.

<Application to Multi-View Image Encoding and Decoding System>

Figure 22:
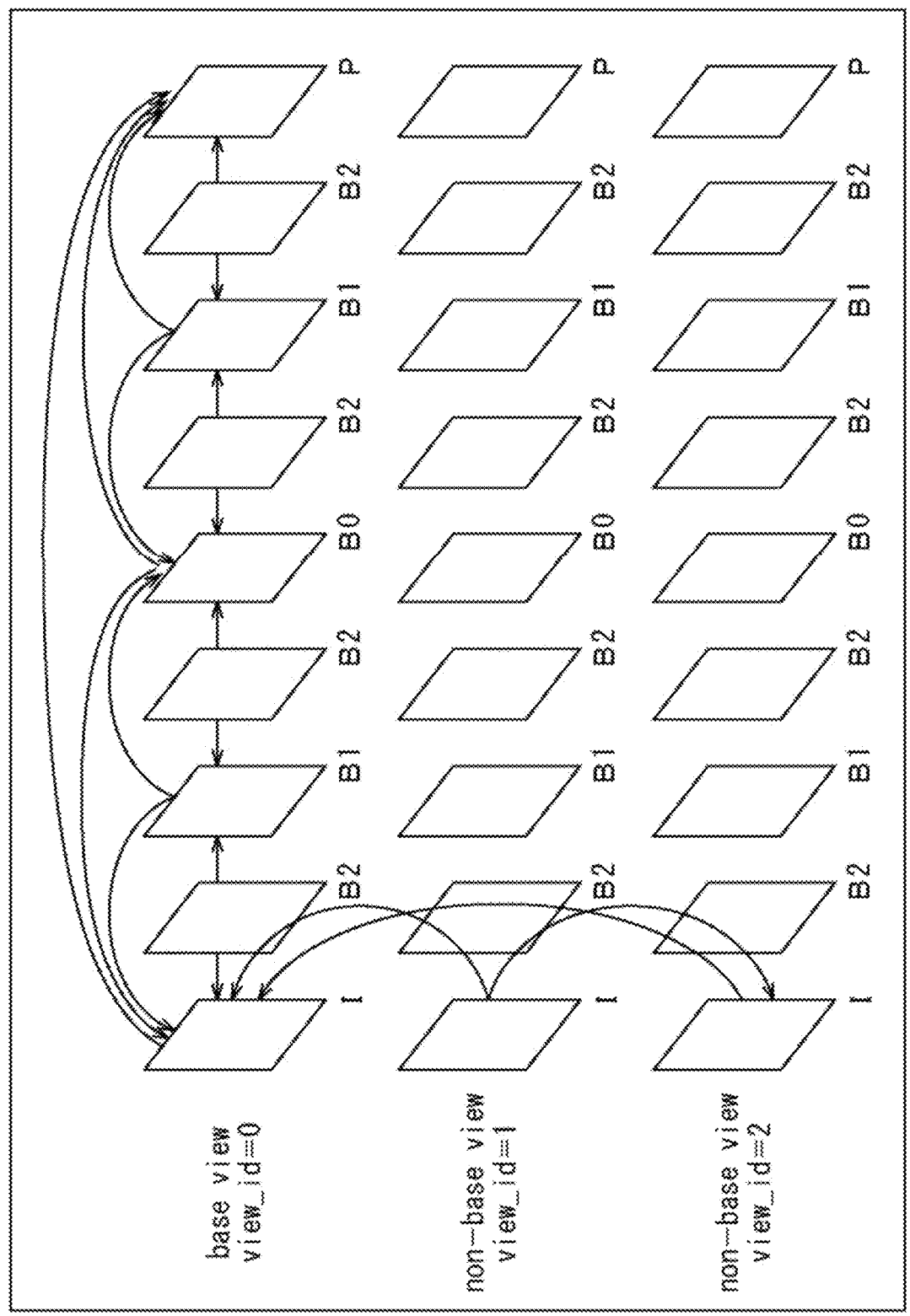
FIG. 22 is a view depicting an example of a multi-view image encoding method.

FIG. 22 is a view depicting an example of a multi-view image encoding method.

As depicted in FIG. 22, a multi-view image includes images of a plurality of viewpoints (views (view)). A plurality of views of multi-view images include a base view whose encoding and decoding are performed using only an image of the own view without using information of any other view and a non-base view whose encoding and decoding are performed using information of some other view. Encoding and decoding of a non-base view may be performed using information of a base view or may be performed using information of a different non-base view.

In the case where a multi-view image as in the example of FIG. 22 is to be encoded and decoded, the multi-view image is encoded for each viewpoint. Then, in the case where encoded data obtained in this manner are to be decoded, encoded data of each viewpoint are individually decoded (namely, for each viewpoint). To such encoding and decoding of each viewpoint, the method described hereinabove in the foregoing description of the embodiment may be applied. By such application, the transmission efficiency and the picture quality can be improved. In short, also in the case of a multi-view image, the transmission efficiency and the picture quality can be improved.

<Multi-View Image Encoding and Decoding System>

Figure 23:
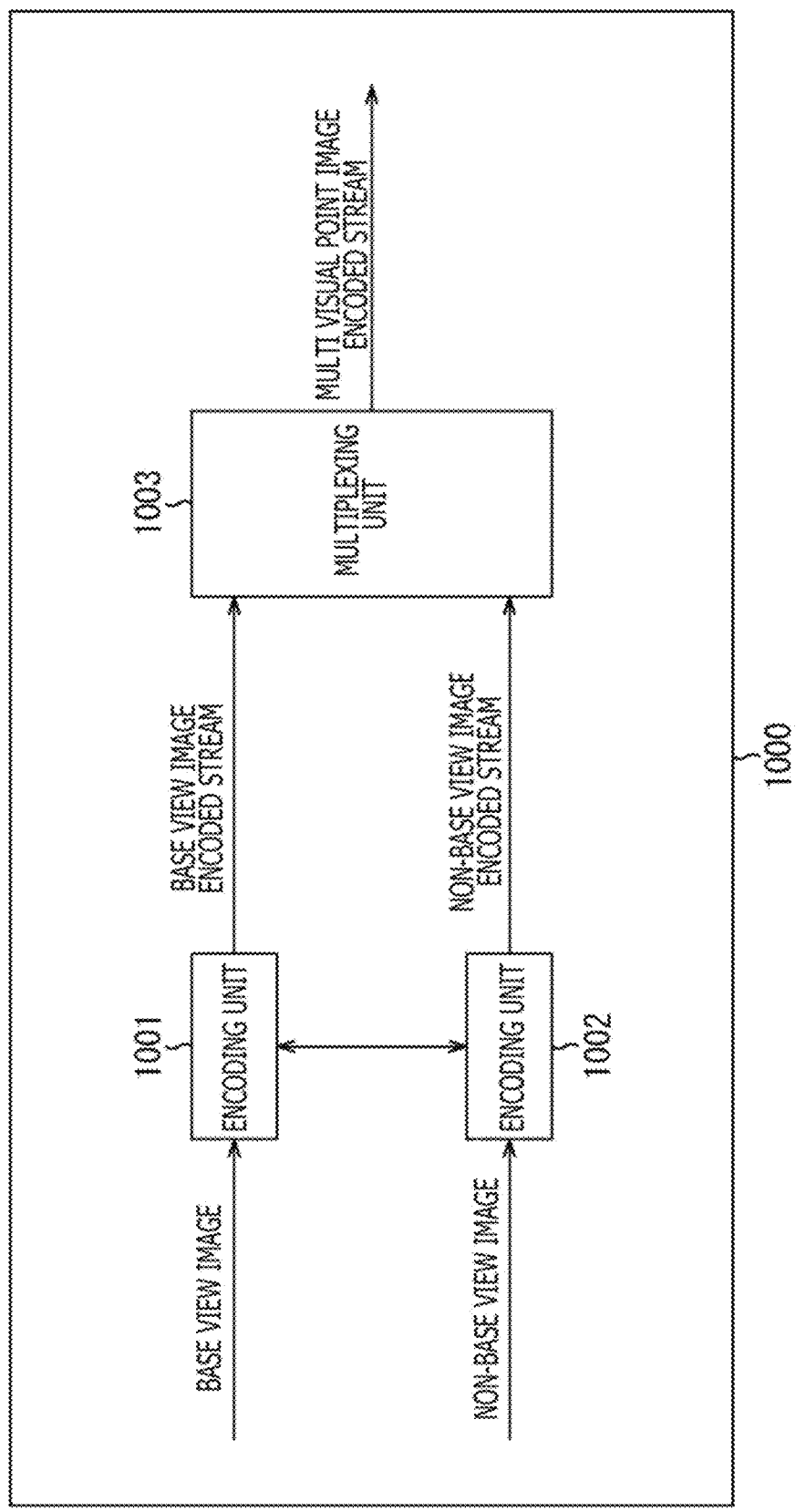
FIG. 23 is a view depicting an example of a principal configuration of a multi-view image encoding apparatus to which the present technology is applied.

FIG. 23 is a view depicting a multi-view image encoding apparatus of a multi-view image encoding and decoding system that performs multi-view image encoding and decoding described hereinabove.

As depicted in FIG. 23, the multi-view image encoding apparatus 1000 includes an encoding unit 1001, another encoding unit 1002 and a multiplexing unit 1003.

The encoding unit 1001 encodes a base view image to generate a base view image encoded stream. The encoding unit 1002 encodes a non-base view image to generate a non-base view image encoded stream. The multiplexing unit 1003 multiplexes the base view image encoded stream generated by the encoding unit 1001 and the non-base view image encoded stream generated by the encoding unit 1002 to generate a multi-view image encoded stream.

Figure 24:
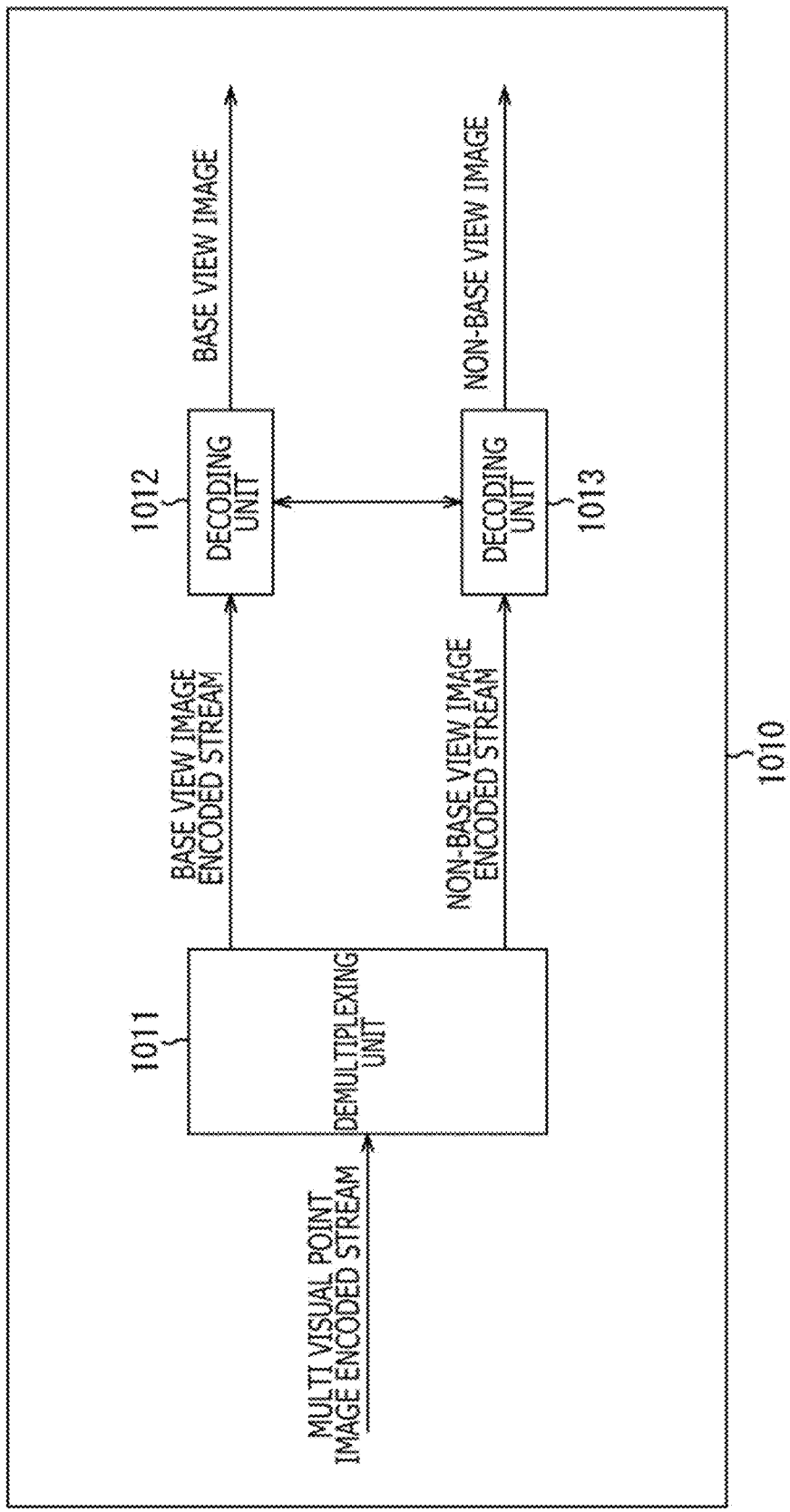
FIG. 24 is a view depicting an example of a principal configuration of the multi-view image decoding apparatus to which the present technology is applied.

FIG. 24 is a view depicting a multi-view image decoding apparatus that performs multi-view image decoding described hereinabove.

As depicted in FIG. 24, the multi-view image decoding apparatus 1010 includes a demultiplexing unit 1011, a decoding unit 1012 and another decoding unit 1013.

The demultiplexing unit 1011 demultiplexes a multi-view image encoded stream in which a base view image encoded stream and a non-base view image encoded stream are multiplexed to extract the base view image encoded stream and the non-base view image encoded stream. The decoding unit 1012 decodes the base view image encoded stream extracted by the demultiplexing unit 1011 to obtain a base view image. The decoding unit 1013 decodes the non-base view image encoded stream extracted by the demultiplexing unit 1011 to obtain a non-base view image.

For example, in such a multi-view image encoding and decoding system as described above, the encoding apparatus 10 described hereinabove in the foregoing description of the embodiment may be applied as the encoding unit 1001 and the encoding unit 1002 of the multi-view image encoding apparatus 1000. By this application, also in encoding of a multi-view image, the method described in the foregoing description of the embodiment can be applied. In other words, it is possible to improve the transmission efficiency and the picture quality. Further, for example, as the decoding unit 1012 and the decoding unit 1013 of the multi-view image decoding apparatus 1010, the decoding apparatus 20 described in the foregoing description of the embodiment may be applied. By this application, also in decoding of encoded data of a multi-view image, the method described in the foregoing description of the embodiment can be applied. In other words, it is possible to improve the transmission efficiency and the picture quality.

<Application to Hierarchical Image Encoding and Decoding System>

Further, the series of processes described above can be applied to a hierarchical image encoding (scalable encoding) and decoding system.

Figure 25:
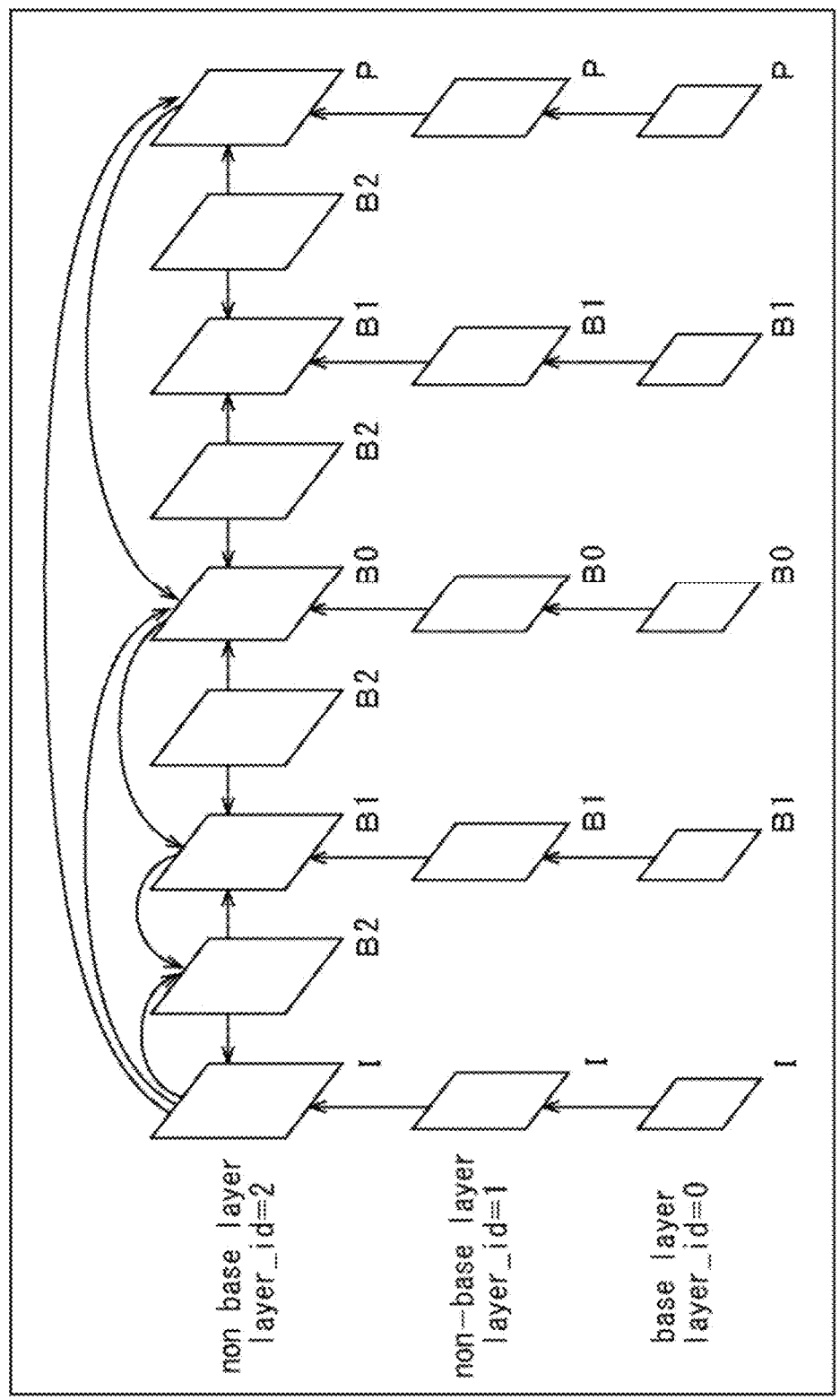
FIG. 25 is a view depicting an example of a hierarchical image encoding method.

FIG. 25 is a view depicting an example of a hierarchical image encoding method.

Hierarchical image encoding (scalable encoding) converts image data into a plurality of layers (hierarchies) of images so as to have a scalability (scalability) function in regard to a predetermined parameter and encodes the image data for each layer. Hierarchical image decoding (scalable decoding) is decoding corresponding to the hierarchical image encoding.

As depicted in FIG. 25, in hierarchization of an image, one image is divided into a plurality of images (layers) with reference to a predetermined parameter having a scalability function. In short, a hierarchized image (hierarchical image) includes a plurality of images of different hierarchies (layers) among which the value of the predetermined parameter is different. The plurality of layers of the hierarchical image include a base layer that allows encoding and decoding using only an image of its own layer without utilizing an image of any other layer and a non-base layer (referred to also as enhancement layer) that allows encoding and decoding using an image of a different layer. The non-base layer may utilize an image of the base layer or may utilize a different image of the non-base layer.

Generally, a non-base layer is configured from data of a difference image (difference data) between an own image of the non-base layer and an image of a different layer such that the redundancy may be reduced. For example, in the case where one image is hierarchized into two layers of a base layer and a non-base layer (also called enhancement layer), an image of lower quality than that of the original image is obtained from only data of the base layer, and by synthesizing data of the base layer and data of the non-base layer, the original image (namely, the image of high quality) is obtained.

By hierarchizing an image in this manner, images of various qualities can be obtained readily according to the situation. For example, to a terminal having a low processing capacity like a portable telephone set, image compression information only of the base layer (base layer) is transmitted, and a moving image that has a low space time resolution or is not high in picture quality is reproduced. However, to a terminal having a high processing capacity like a television set or a personal computer, image compression information of the enhancement layer (enhancement layer) is transmitted in addition to the base layer (base layer), and a moving image that has a high space time resolution or is high in picture quality is reproduced. In this manner, image compression information according to the capacity of a terminal or network can be transmitted from a server without performing a transcode process.

In the case where such a hierarchical image as in the example of FIG. 25 is encoded and decoded, the hierarchical image is encoded for each layer. Then, when the encoded data obtained in this manner are to be decoded, the encoded data of each other is individually decoded (namely, for each layer). To such encoding and decoding of each layer, the method described in the above-described embodiment may be applied. By such application, the transmission efficiency and the picture quality can be improved. In short, also in the case of a hierarchical image, the transmission efficiency and the picture quality can be improved.

<Scalable Parameter>

In such hierarchical image encoding and hierarchical image decoding (scalable encoding and scalable decoding), a parameter having the scalability (scalability) function is arbitrary. For example, a space resolution may be made the parameter (spatial scalability). In the case of this spatial scalability (spatial scalability), the resolution of an image differs for each layer.

Further, as a parameter that has such a scalability property as described above, for example, a time resolution may be applied (temporal scalability). In the case of this temporal scalability (temporal scalability), the frame rate differs for each layer.

Further, as a parameter that has such a scalability property as described above, for example, a signal to noise ratio (SNR (Signal to Noise ratio)) may be applied (SNR scalability). In the case of this SNR scalability (SNR scalability), the SN ratio differs for each layer.

The parameter that has such a scalability property may naturally be other than the examples described above. For example, bit depth scalability (bit-depth scalability) is available in which the base layer (base layer) is configured from an 8-bit (bit) image and a 10-bit (bit) image is obtained by adding an enhancement layer (enhancement layer) to the 8-bit (bit) image.

Further, chroma scalability (chroma scalability) is available in which the base layer is configured from a component image of the 4:2:0 format and a component image of the 4:2:2 format is obtained by adding an enhancement layer (enhancement layer) to the component image.

<Hierarchical Image Encoding and Decoding System>

Figure 26:
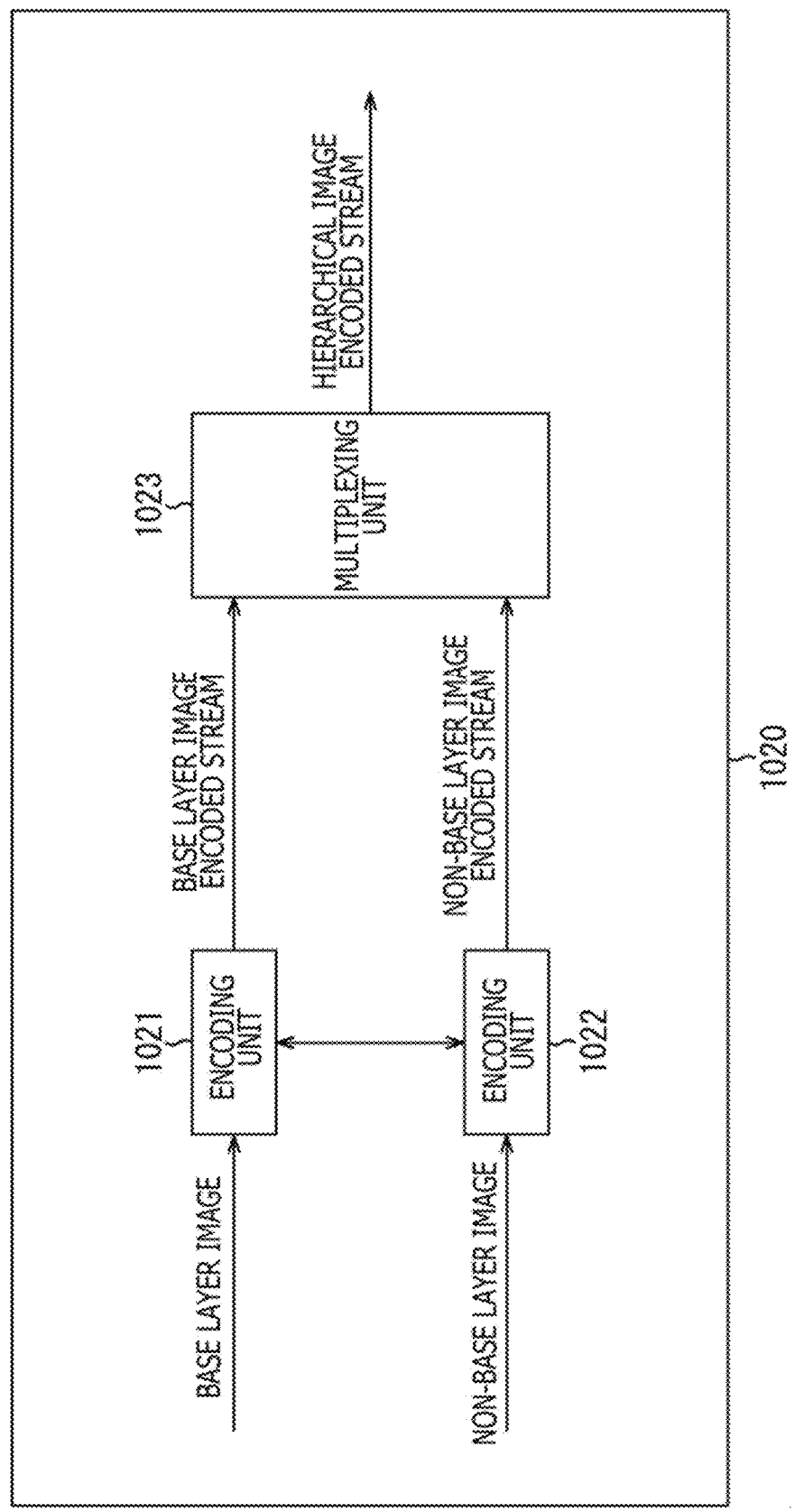
FIG. 26 is a view depicting an example of a principal configuration of a hierarchical image encoding apparatus to which the present technology is applied.

FIG. 26 is a view depicting a hierarchical image encoding apparatus of a hierarchical image encoding and decoding system that performs the hierarchical image encoding and decoding described above.

As depicted in FIG. 23, the hierarchical image encoding apparatus 1020 includes an encoding unit 1021, another encoding unit 1022 and a multiplexing unit 1023.

The encoding unit 1021 encodes a base layer image to generate a base layer image encoded stream. The encoding unit 1022 encodes a non-base image to generate a non-base layer image encoded stream. The multiplexing unit 1023 multiplexes the base layer image encoded stream generated by the encoding unit 1021 and the non-base layer image encoded stream generated by the encoding unit 1022 to generate a hierarchical image encoded stream.

Figure 27:
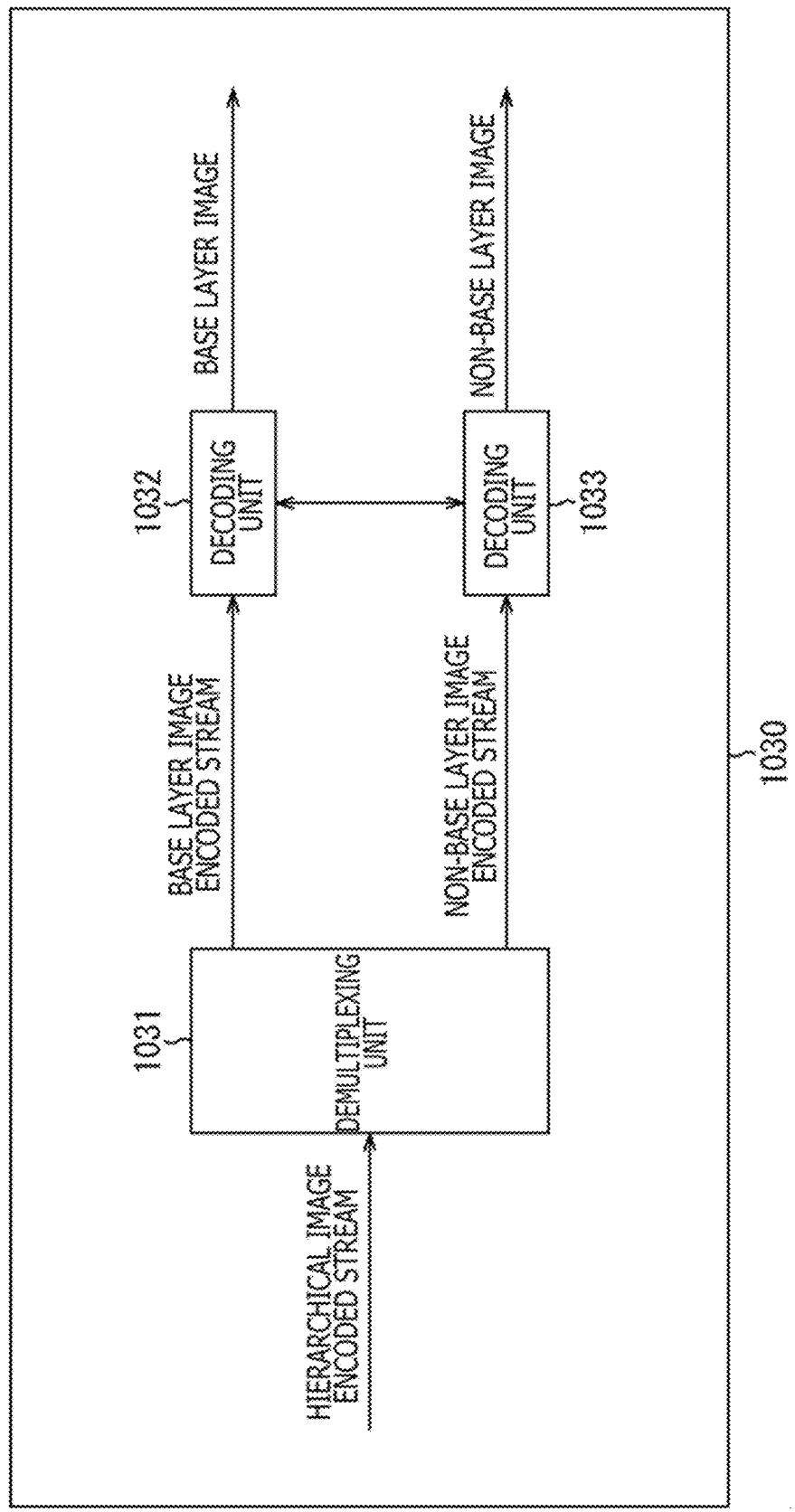
FIG. 27 is a view depicting an example of a principal configuration of a hierarchical image decoding apparatus to which the present technology is applied.

FIG. 27 is a view depicting a hierarchical image decoding apparatus that performs hierarchical image decoding described hereinabove.

As depicted in FIG. 27, the hierarchical image decoding apparatus 1030 includes a demultiplexing unit 1031, a demultiplexing unit 1032 and another decoding unit 1033.

The demultiplexing unit 1031 demultiplexes a hierarchical image encoded stream in which a base layer image encoded stream and a non-base layer image encoded stream are multiplexed to extract the base layer image encoded stream and the non-base layer image encoded stream. The demultiplexing unit 1032 decodes the base layer image encoded stream extracted by the demultiplexing unit 1031 to obtain a base layer image. The decoding unit 1033 decodes the non-base layer image encoded stream extracted by the demultiplexing unit 1031 to obtain a non-base layer image.

For example, in such a hierarchical image encoding and decoding system as described above, the encoding apparatus 10 described hereinabove in the foregoing description of the embodiment may be applied as the encoding unit 1021 and the encoding unit 1022 of the hierarchical image encoding apparatus 1020. By this application, also in encoding of a hierarchical image, the method described in the foregoing description of the embodiment can be applied. In other words, it is possible to improve the transmission efficiency and the picture quality. Further, for example, as the demultiplexing unit 1032 and the decoding unit 1033 of the hierarchical image decoding apparatus 1030, the decoding apparatus 20 described in the foregoing description of the embodiment may be applied. By this application, also in decoding of encoded data of a hierarchical image, the method described in the foregoing description of the embodiment can be applied. In other words, it is possible to improve the transmission efficiency and the picture quality.

<Computer>

It is to be noted that, while the series of processes described above can be executed by hardware, it may otherwise be executed by software. Where the series of processes is executed by software, a program that constructs the software is installed into a computer. Here, the computer includes a computer incorporated in hardware for exclusive use, a personal computer, for example, for universal use that can execute various functions by installing various programs, and so forth.

Figure 28:
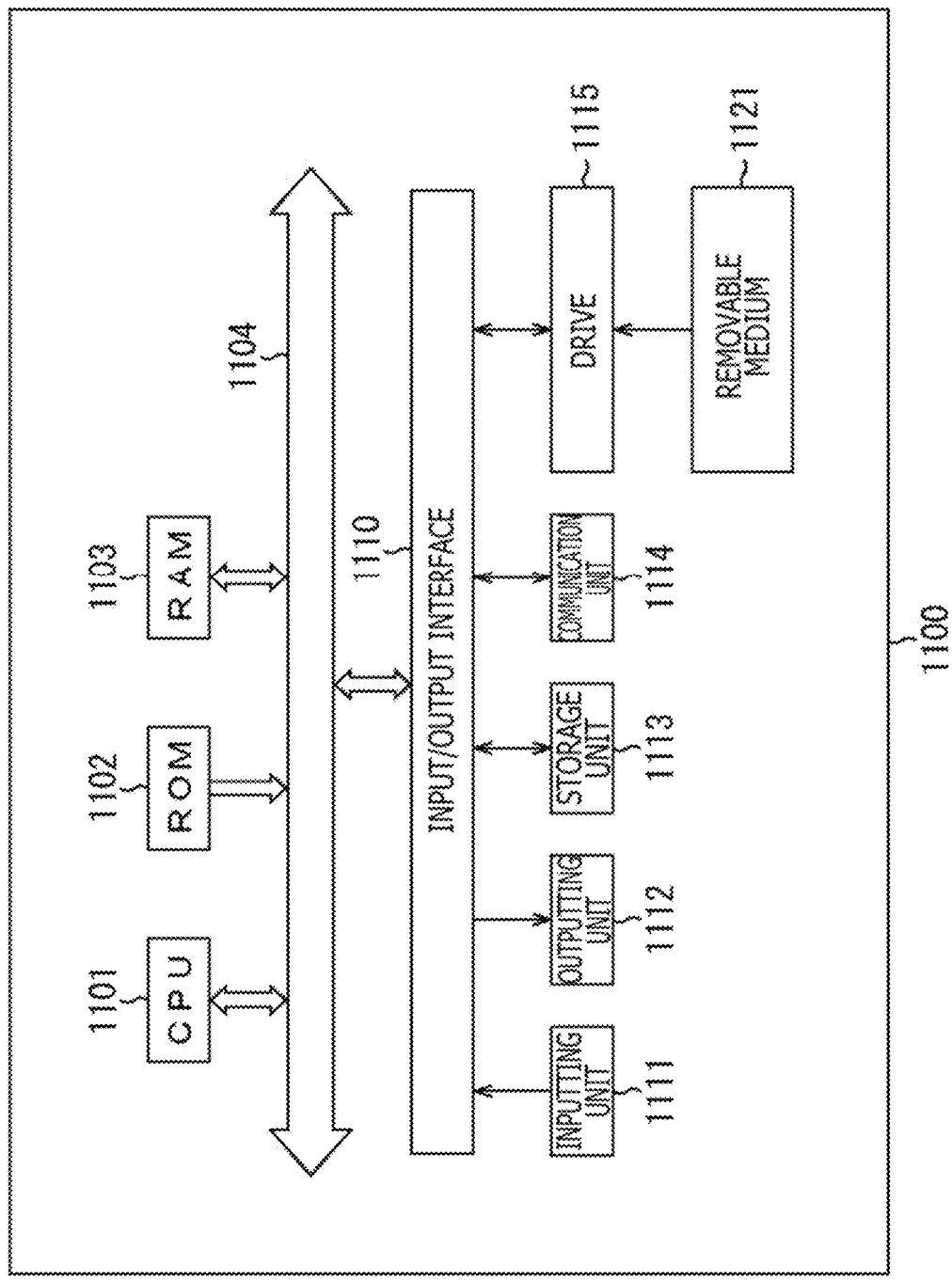
FIG. 28 is a block diagram depicting an example of a principal configuration of a computer.

FIG. 28 is a block diagram depicting an example of a configuration of hardware of a computer that executes the series of processes described above in accordance with a program.

In the computer 1100 depicted in FIG. 28, a CPU (Central Processing Unit) 1101, a ROM (Read Only Memory) 1102 and a RAM (Random Access Memory) 1103 are connected to each other by a bus 1104.

To the bus 1104, also an input/output interface 1110 is connected. To the input/output interface 1110, an inputting unit 1111, an outputting unit 1112, a storage unit 1113, a communication unit 1114 and a drive 1115 are connected.

The inputting unit 1111 is configured, for example, from a keyboard, a mouse, a microphone, a touch panel, an input terminal and so forth. The outputting unit 1112 is configured from a display, a speaker, an output terminal and so forth. The storage unit 1113 is configured, for example, from a hard disk, a RAM disk, a nonvolatile memory and so forth. The communication unit 1114 is configured, for example, from a network interface. The drive 1115 drives a removable medium 821 such as a magnetic disk, an optical disk, a magneto-optical disk, a semiconductor memory or the like.

In the computer configured in such a manner as described above, the CPU 1101 loads a program stored, for example, in the storage unit 1113 into the RAM 1103 through the input/output interface 1110 and the bus 1104 and executes the program to perform the series of processes described above. Into the RAM 1103, also data and so forth necessary upon execution of various processes by the CPU 1101 are suitably stored.

The program executed by the computer (CPU 1101) can be recorded, for example, into the removable medium 821 as a package medium or the like and applied. In this case, the program can be installed into the storage unit 1113 through the input/output interface 1110 by mounting the removable medium 821 on the drive 1115.

Further, this program can be provided through a wired or wireless transmission medium such as a local area network, the Internet or a digital satellite broadcast. In this case, the program can be received by the communication unit 1114 and installed into the storage unit 1113.

Also it is possible to install this program in advance into the ROM 1102 or the storage unit 1113.

<Application of Present Technology>

The encoding apparatus 10 or the decoding apparatus 20 according to the embodiment described hereinabove can be applied to various electronic apparatus such as transmitters or receivers, for example, for distribution by a satellite broadcast, a wired broadcast such as a cable TV or the Internet, distribution to a terminal by cellular communication and so forth, or recording apparatus that record an image on a medium such as an optical disk, a magnetic disk, a flash memory and so forth, reproduction apparatus for reproducing an image from such storage media as described above and so forth. In the following, four examples of application are described.

First Application Example: Television Receiver

Figure 29:
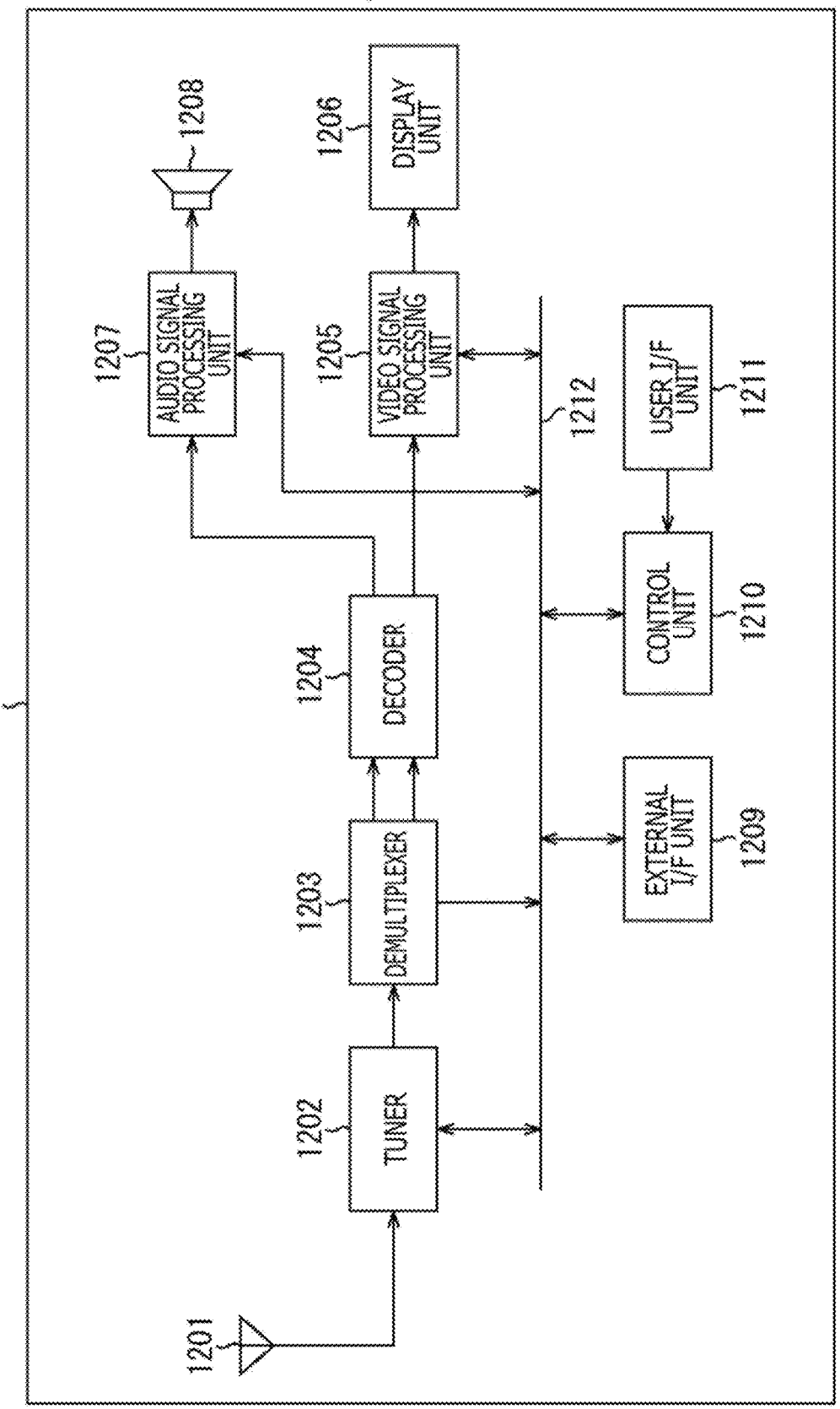
FIG. 29 is a block diagram depicting an example of a schematic configuration of a television apparatus.

FIG. 29 is a view depicting an example of a schematic configuration of a television apparatus to which the embodiment described hereinabove is applied.

The television apparatus 1200 includes an antenna 1201, a tuner 1202, a demultiplexer 1203, a decoder 1204, a video signal processing unit 1205, a display unit 1206, an audio signal processing unit 1207, a speaker 1208, an external interface (I/F) unit 1209, a control unit 1210, a user interface (I/F) unit 1211, and a bus 1212.

The tuner 1202 extracts a signal of a desired channel from broadcasting signals received through the antenna 1201 and demodulates the extracted signal. Then, the tuner 1202 outputs an encoded bit stream obtained by the demodulation to the demultiplexer 1203. In particular, the tuner 1202 has a role as a transmission unit in the television apparatus 1200, which receives an encoded stream in which an image is encoded.

The demultiplexer 1203 demultiplexes a video stream and an audio stream of a broadcasting program of a viewing target from an encoded bit stream and outputs the demultiplexed streams to the decoder 1204. Further, the demultiplexer 1203 extracts auxiliary data such as an EPG (Electronic Program Guide) or the like from the encoded bit stream and supplies the extracted data to the control unit 1210. It is to be noted that the demultiplexer 1203 may perform descramble in the case where the encoded bit stream is in a scrambled state.

The decoder 1204 decodes the video stream and the audio stream inputted from the demultiplexer 1203. Then, the decoder 1204 outputs video data generated by the decoding process to the video signal processing unit 1205. Further, the decoder 1204 outputs audio data generated by the decoding process to the audio signal processing unit 1207.

The video signal processing unit 1205 reproduces video data inputted from the decoder 1204 and causes the display unit 1206 to display a video. Further, the video signal processing unit 1205 may cause the display unit 1206 to display an application screen image supplied through the network. Further, the video signal processing unit 1205 may perform additional processes such as, for example, noise removal and so forth for video data in accordance with a setting. Furthermore, the video signal processing unit 1205 may generate an image of a GUI (Graphical User Interface) such as, for example, a menu, a button, a cursor or the like and cause the generated image to be superimposed on an output image.

The display unit 1206 is driven by a drive signal supplied from the video signal processing unit 1205 and displays a video or an image on a video face of a display device (for example, a liquid crystal display, a plasma display, an OELD (Organic Electro Luminescence Display) (organic EL display) or the like).

The audio signal processing unit 1207 performs a reproduction process such as D/A conversion, amplification and so forth for audio data inputted from the decoder 1204 and causes sound to be outputted from the speaker 1208. Further, the audio signal processing unit 1207 may perform additional processes such as noise removal or the like for the audio data.

The external interface unit 1209 is an interface for connecting the television apparatus 1200 and an external apparatus or a network to each other. For example, a video stream or an audio stream received through the external interface unit 1209 may be decoded by the decoder 1204. In particular, also the external interface unit 1209 has a role as a transmission unit in the television apparatus 1200, which receives an encoded stream in which images are encoded.

The control unit 1210 includes a processor such as a CPU, and a memory such as a RAM, a ROM and so forth. The memory stores a program to be executed by the CPU, program data, EPG data, data acquired through a network and so forth. The program stored in the memory is read into and executed by the CPU, for example, upon activation of the television apparatus 1200. The CPU executes the program to control operation of the television apparatus 1200 in response to an operation signal inputted, for example, from the user interface unit 1211.

The user interface unit 1211 is connected to the control unit 1210. The user interface unit 1211 includes a button and a switch for allowing, for example, a user to operate the television apparatus 1200, a reception unit for a remote controlling signal and so forth. The user interface unit 1211 detects an operation by the user through the components mentioned and generates an operation signal, and outputs the generated operation signal to the control unit 1210.

The bus 1212 connects the tuner 1202, demultiplexer 1203, decoder 1204, video signal processing unit 1205, audio signal processing unit 1207, external interface unit 1209 and control unit 1210 to each other.

In the television apparatus 1200 configured in such a manner as described above, the decoder 1204 may have a function of the decoding apparatus 20 described hereinabove. In particular, the decoder 1204 may decode encoded data by a method described hereinabove in connection with the embodiment. By such decoding, the television apparatus 1200 can improve the transmission efficiency and the picture quality.

Further, in the television apparatus 1200 configured in such a manner as described above, the video signal processing unit 1205 may be configured, for example, so as to encode image data supplied from the decoder 1204 and output the obtained encoded data to the outside of the television apparatus 1200 through the external interface unit 1209. Further, the video signal processing unit 1205 may have the function of the encoding apparatus 10 described hereinabove. In short, the video signal processing unit 1205 may encode image data supplied from the decoder 1204 by the method described hereinabove in connection with the embodiment. By such encoding, the television apparatus 1200 can improve the transmission efficiency and the picture quality.

Second Application Example: Portable Telephone Set

Figure 30:
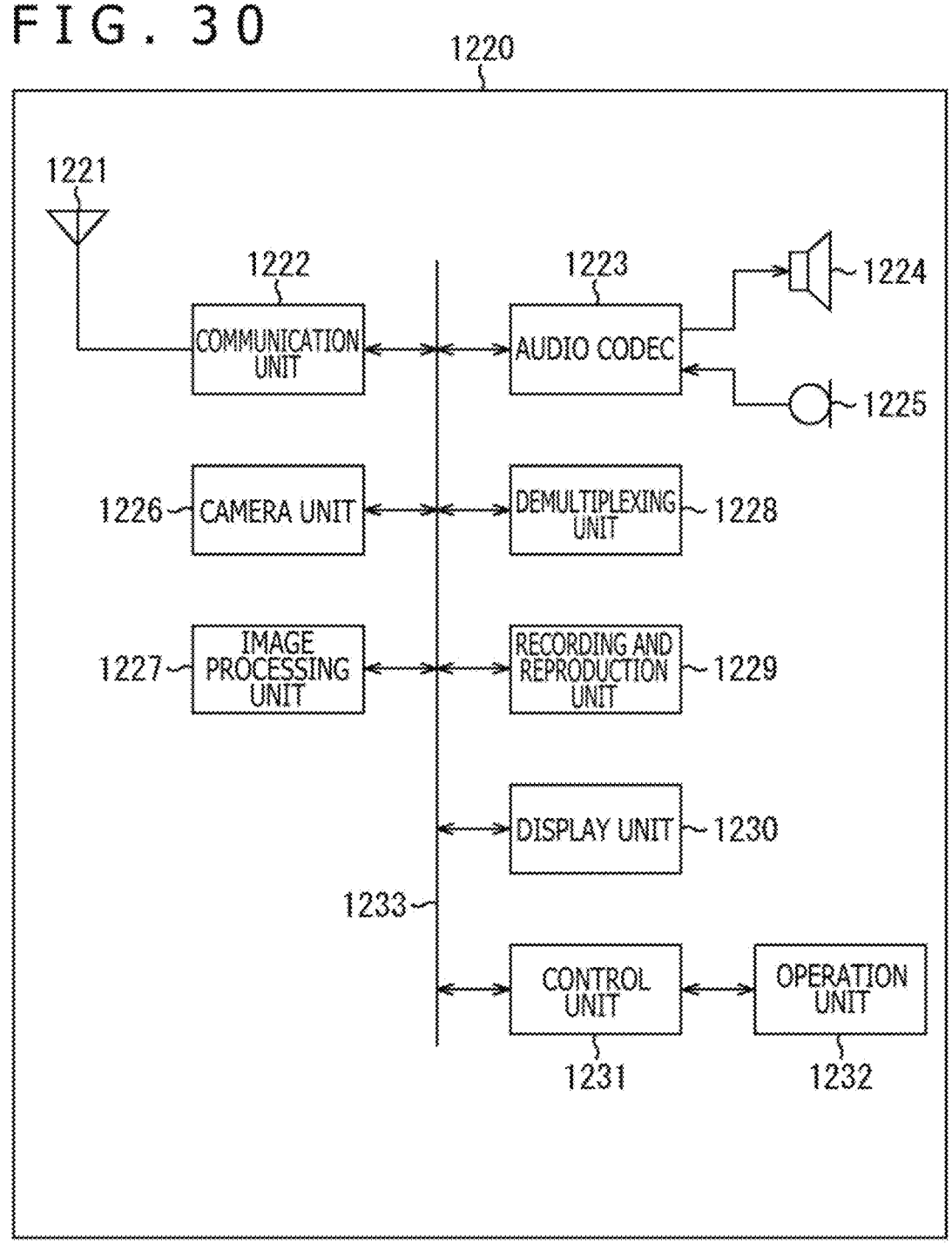
FIG. 30 is a block diagram depicting an example of a schematic configuration of a portable telephone set.

FIG. 30 is a view depicting an example of a schematic configuration of a portable telephone set to which the embodiment described hereinabove is applied.

The portable telephone set 1220 includes an antenna 1221, a communication unit 1222, an audio codec 1223, a speaker 1224, a microphone 1225, a camera unit 1226, an image processing unit 1227, a demultiplexing unit 1228, a recording and reproduction unit 1229, a display unit 1230, a control unit 1231, an operation unit 1232 and a bus 1233.

The antenna 1221 is connected to the communication unit 1222. The speaker 1224 and the microphone 1225 are connected to the audio codec 1223. The operation unit 1232 is connected to the control unit 1231. The bus 1233 connects the communication unit 1222, audio codec 1223, camera unit 1226, image processing unit 1227, demultiplexing unit 1228, recording and reproduction unit 1229, display unit 1230 and control unit 1231 to each other.

The portable telephone set 1220 performs such operations as transmission and reception of a voice signal, transmission and reception of an electronic mail or image data, pickup of an image, recording of data and so forth in various operation modes including a voice speech mode, a data communication mode, an image pickup mode and a videophone mode.

In the voice speech mode, an analog speech signal generated by the microphone 1225 is supplied to the audio codec 1223. The audio codec 1223 converts the analog speech signal into speech data and A/D converts and compresses the speech data after the conversion. Then, the audio codec 1223 outputs the speech data after the compression to the communication unit 1222. Then, the communication unit 1222 encodes and modulates the speech data to generate a transmission signal. Then, the communication unit 1222 transmits the generated transmission signal to a base station (not depicted) through the antenna 1221. On the other hand, the communication unit 1222 amplifies and frequency converts a wireless signal received through the antenna 1221 to acquire a reception signal. Then, the communication unit 1222 demodulates and decodes the reception signal to generate speech data and outputs the generated speech data to the audio codec 1223. The audio codec 1223 decompresses and D/A converts the speech data to generate an analog speech signal. Then, the audio codec 1223 supplies the generated speech signal to the speaker 1224 such that speech is outputted from the speaker 1224.

On the other hand, in the data communication mode, for example, the control unit 1231 generates character data that configure an electronic mail in response to operations by the user through the operation unit 1232. Further, the control unit 1231 controls the display unit 1230 to display characters. Further, the control unit 1231 generates electronic mail data in response to a transmission instruction from the user through the operation unit 1232 and outputs the generated electronic mail data to the communication unit 1222. The communication unit 1222 encodes and modulates the generated electronic mail data to generate a transmission signal. Then, the communication unit 1222 transmits the generated transmission signal to the base station (not depicted) through the antenna 1221. On the other hand, the communication unit 1222 amplifies and frequency converts a wireless signal received through the antenna 1221 to acquire a reception signal. Then, the communication unit 1222 demodulates and decodes the reception signal to restore the electronic mail data and outputs the restored electronic mail data to the control unit 1231. The control unit 1231 controls the display unit 1230 to display the substance of the electronic mail and supplies the electronic data to the recording and reproduction unit 1229 such that the electronic data is written into its recording medium.

The recording and reproduction unit 1229 has an arbitrary storage medium that is readable and writable. For example, the storage medium may be a built-in type storage medium such as a RAM, a flash memory or the like or an externally mountable storage medium such as a hard disk, a magnetic disk, a magneto-optical disk, an optical disk, a USB (Universal Serial Bus) memory, a memory card or the like.

Further, in the image pickup mode, for example, the camera unit 1226 picks up an image of an image pickup object to generate image data and outputs the generated image data to the image processing unit 1227. The image processing unit 1227 encodes the image data inputted from the camera unit 1226 and supplies the encoded stream to the recording and reproduction unit 1229 so as to be written into the storage medium of the same.

Further, in the image display mode, the recording and reproduction unit 1229 reads out an encoded stream recorded on the storage medium and outputs the encoded stream to the image processing unit 1227. The image processing unit 1227 decodes the encoded stream inputted from the recording and reproduction unit 1229 and supplies the image data to the display unit 1230 such that the image is displayed.

Further, in the videophone mode, for example, the demultiplexing unit 1228 multiplexes a video stream encoded by the image processing unit 1227 and an audio stream inputted from the audio codec 1223 and outputs the multiplexed stream to the communication unit 1222. The communication unit 1222 encodes and modulates the stream to generate a transmission signal. Then, the communication unit 1222 transmits the generated transmission signal to a base station (not depicted) through the antenna 1221. On the other hand, the communication unit 1222 amplifies and frequency converts a wireless signal received through the antenna 1221 to acquire a reception signal. The transmission signal and the reception signal can include an encoded bit stream. Then, the communication unit 1222 demodulates and decodes the reception signal to restore the stream and outputs the restored stream to the demultiplexing unit 1228. The demultiplexing unit 1228 demultiplexes the video stream and the audio stream from the inputted stream and outputs the video stream to the image processing unit 1227 while it outputs the audio stream to the audio codec 1223. The image processing unit 1227 decodes the video stream to generate video data. The video data is supplied to the display unit 1230, by which a series of images are displayed. The audio codec 1223 decompresses and D/A converts the audio stream to generate an analog audio signal. Then, the audio codec 1223 supplies the generated audio signal to the speaker 1224 such that speech is outputted from the speaker 1224.

In the portable telephone set 1220 configured in this manner, for example, the image processing unit 1227 may have the function of the encoding apparatus 10 described hereinabove. In short, the image processing unit 1227 may encode image data by the method described in the foregoing description of the embodiment. By such encoding, the portable telephone set 1220 can improve the transmission efficiency and the picture quality.

Further, in the portable telephone set 1220 configured in this manner, for example, the image processing unit 1227 may have the function of the decoding apparatus 20 described hereinabove. In short, the image processing unit 1227 may decode encoded data by the method described hereinabove in the description of the embodiment. By such decoding, the portable telephone set 1220 can improve the transmission efficiency and the picture quality.

Third Application Example: Recording and Reproduction Apparatus

Figure 31:
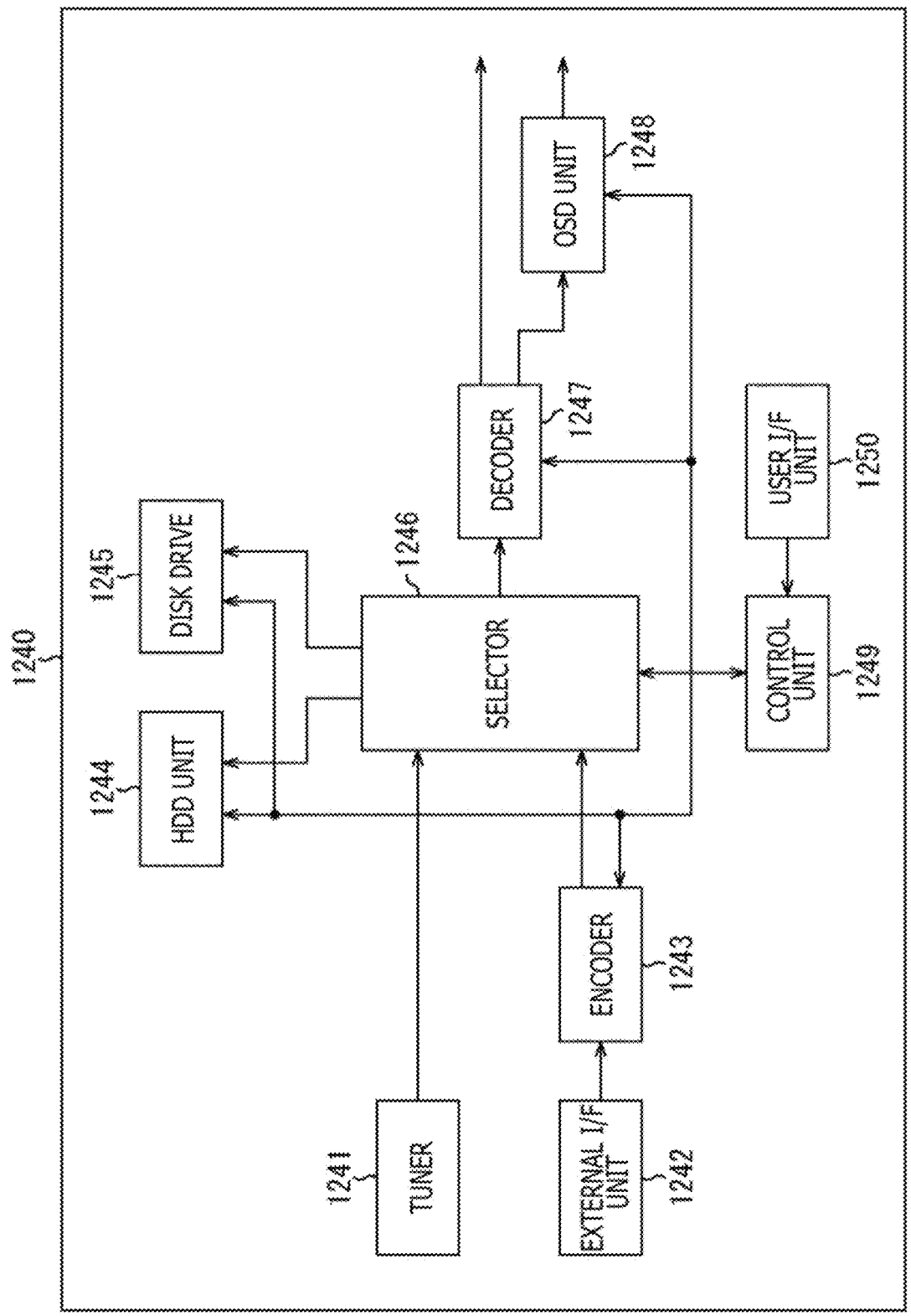
FIG. 31 is a block diagram depicting an example of a schematic configuration of a recording and reproduction apparatus.

FIG. 31 is a view depicting an example of a schematic configuration of a recording and reproduction apparatus to which the embodiment described hereinabove is applied.

The recording and reproduction apparatus 1240 encodes, for example, audio data and video data of a received broadcasting program and records the encoded data on a recording medium. Further, the recording and reproduction apparatus 1240 may encode, for example, audio data and video data acquired from a different apparatus and record the data on a recording medium. Further, the recording and reproduction apparatus 1240 reproduces, for example, data recorded on the recording medium on a monitor and a speaker in response to an instruction of the user. At this time, the recording and reproduction apparatus 1240 decodes audio data and video data.

The recording and reproduction apparatus 1240 includes a tuner 1241, an external interface (I/F) unit 1242, an encoder 1243, an HDD (Hard Disk Drive) unit 1244, a disk drive 1245, a selector 1246, a decoder 1247, an OSD (On-Screen Display) unit 1248, a control unit 1249 and a user interface (I/F) 1250.

The tuner 1241 extracts a signal of a desired channel from broadcasting signals received through an antenna (not depicted) and demodulates the extracted signal. Then, the tuner 1241 outputs an encoded bit stream obtained by demodulation to the selector 1246. In other words, the tuner 1241 has a role as the transmission unit in the recording and reproduction apparatus 1240.

The external interface unit 1242 is an interface for connecting the recording and reproduction apparatus 1240 and an external apparatus or a network to each other. The external interface unit 1242 may be, for example, an IEEE (Institute of Electrical and Electronic Engineers) 1394 interface, a network interface, a USB interface, a flash memory interface or the like. For example, video data and audio data received through the external interface unit 1242 are inputted to the encoder 1243. In other words, the external interface unit 1242 has a role as the transmission unit in the recording and reproduction apparatus 1240.

The encoder 1243 encodes, in the case where video data and audio data inputted from the external interface unit 1242 are not in an encoded state, the video data and the audio data. Then, the encoder 1243 outputs an encoded bit stream to the selector 1246.

The HDD unit 1244 records an encoded bit stream, in which content data of videos and audios are compressed, various programs and other data into an internal hard disk. Further, the HDD unit 1244 reads out, upon reproduction of videos and audios, such data from the hard disk.

The disk drive 1245 performs recording and reading out of data on and from a recording medium mounted thereon. The recording medium to be mounted on the disk drive 1245 may be, for example, a DVD (Digital Versatile Disc) disk (DVD-Video, DVD-RAM (DVD-Random Access Memory), DVD-R (DVD-Readable), DVD-RW (DVD-Rewritable), DVD+R (DVD+Recordable), DVD+RW (DVD+Rewriteable) and so forth) or a Blu-ray (registered trademark) disk or the like.

The selector 1246 selects, upon recording of videos and audios, an encoded bit stream inputted from the tuner 1241 or the encoder 1243 and outputs the selected encoded bit stream to the HDD unit 1244 or the disk drive 1245. On the other hand, upon reproduction of videos and audios, the selector 1246 outputs an encoded bit stream inputted from the HDD unit 1244 or the disk drive 1245 to the decoder 1247.

The decoder 1247 decodes an encoded bit stream to generate video data and audio data. Then, the decoder 1247 outputs the generated video data to the OSD unit 1248. Further, the decoder 1247 outputs the generated audio data to the external speaker.

The OSD unit 1248 reproduces the video data inputted from the decoder 1247 and displays a video. Further, the OSD unit 1248 may superimpose an image of a GUI such as, for example, a menu, a button, a cursor or the like on the displayed video.

The control unit 1249 includes a processor such as a CPU or the like and a memory such as a RAM, a ROM and so forth. The memory stores a program to be executed by the CPU, program data and so forth. The program stored in the memory is read into and executed by the CPU, for example, upon activation of the recording and reproduction apparatus 1240. By executing the program, the CPU controls operation of the recording and reproduction apparatus 1240, for example, in response to an operation signal inputted from the user interface unit 1250.

The user interface unit 1250 is connected to the control unit 1249. The user interface unit 1250 includes, for example, a button and a switch for allowing a user to operate the recording and reproduction apparatus 1240, a reception unit for a remote controlling signal and so forth. The user interface unit 1250 detects an operation by the user through the components to generate an operation signal and outputs the generated operation signal to the control unit 1249.

In the recording and reproduction apparatus 1240 configured in this manner, for example, the encoder 1243 may have the function of the encoding apparatus 10 described above. In short, the encoder 1243 may encode image data by the method described in the foregoing description of the embodiment. By such encoding, the recording and reproduction apparatus 1240 can improve the transmission efficiency and the picture quality.

Further, in the recording and reproduction apparatus 1240 configured in this manner, for example, the decoder 1247 may have the functions of the decoding apparatus 20 described hereinabove. In short, the decoder 1247 may decode encoded data by the method described in the foregoing description of the embodiment. By such decoding the recording and reproduction apparatus 1240 can improve the transmission efficiency and the picture quality.

Fourth Application Example: Image Pickup Apparatus

Figure 32:
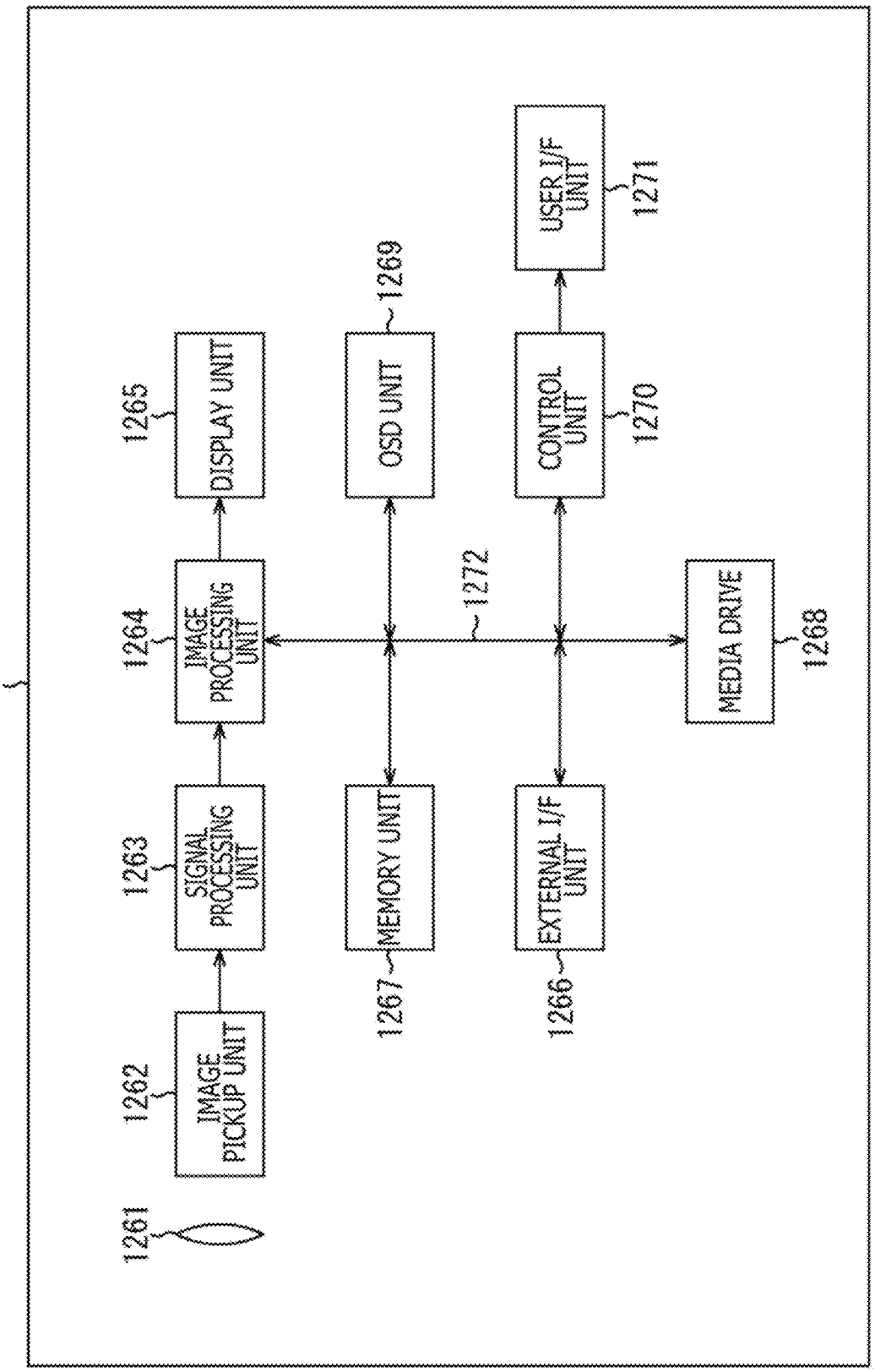
FIG. 32 is a block diagram depicting an example of a schematic configuration of an image pickup apparatus.

FIG. 32 is a view depicting an example of a schematic configuration of an image pickup apparatus to which the embodiment described hereinabove is applied.

The image pickup apparatus 1260 picks up an image of an image pickup object to generate an image and encodes and records image data on a recording medium.

The image pickup apparatus 1260 includes an optical block 1261, an image pickup unit 1262, a signal processing unit 1263, an image processing unit 1264, a display unit 1265, an external interface (I/F) unit 1266, a memory unit 1267, a media drive 1268, an OSD unit 1269, a control unit 1270, a user interface (I/F) unit 1271 and a bus 1272.

The optical block 1261 is connected to the image pickup unit 1262. The image pickup unit 1262 is connected to the signal processing unit 1263. The display unit 1265 is connected to the image processing unit 1264. The user interface unit 1271 is connected to the control unit 1270. The bus 1272 connects the image processing unit 1264, external interface unit 1266, memory unit 1267, media drive 1268, OSD unit 1269 and control unit 1270 to each other.

The optical block 1261 includes a focus lens, a diaphragm mechanism and so forth. The optical block 1261 forms an optical image of an image pickup object on an image pick plane of the image pickup unit 1262. The image pickup unit 1262 includes an image sensor such as a CCD (Charge Coupled Device) image sensor, a CMOS (Complementary Metal Oxide Semiconductor) image sensor or the like and converts an optical image formed on the image pickup plane into an image signal in the form of an electric signal by photoelectric conversion. Then, the image pickup unit 1262 outputs the image signal to the signal processing unit 1263.

The signal processing unit 1263 performs various camera signal processes such as knee correction, gamma correction, color correction and so forth for an image signal inputted from the image pickup unit 1262. The signal processing unit 1263 outputs the image data after the camera signal processes to the image processing unit 1264.

The image processing unit 1264 encodes the image data inputted from the signal processing unit 1263 to generate encoded data. Then, the image processing unit 1264 outputs the generated encoded data to the external interface unit 1266 or the media drive 1268. Further, the image processing unit 1264 decodes encoded data inputted from the external interface section 1266 or the media drive 1268 to generate image data. Then, the image processing unit 1264 outputs the generated image data to the display unit 1265. Further, the image processing unit 1264 may output image data inputted from the signal processing unit 1263 to the display unit 1265 such that an image is displayed. Further, the image processing unit 1264 may superimpose display data acquired from the OSD unit 1269 on the image to be outputted to the display unit 1265.

The OSD unit 1269 generates an image of a GUI such as, for example, a menu, a button, a cursor or the like and outputs the generated image to the image processing unit 1264.

The external interface unit 1266 is configured, for example, as a USB input/output terminal. The external interface unit 1266 connects the image pickup apparatus 1260 and a printer, for example, upon printing of an image. Further, as occasion demands, a drive is connected to the external interface unit 1266. On the drive, a removable medium such as, for example, a magnetic disk, an optical disk or the like is mounted, and a program read out from the removable medium can be installed into the image pickup apparatus 1260. Furthermore, the external interface unit 1266 may be configured as a network interface connected to a network such as a LAN, the internet or the like. In other words, the external interface unit 1266 has a role as a transmission unit of the image pickup apparatus 1260.

The recording medium to be mounted on the media drive 1268 may be a readable and writable arbitrary removable medium such as, for example, a magnetic disk, a magneto-optical disk, an optical disk, a semiconductor memory or the like. Further, a recording medium may be mounted fixedly on the media drive 1268 such that a non-portable storage unit such as, for example, a built-in type hard disk drive or an SSD (Solid State Drive) is configured.

The control unit 1270 includes a processor such as a CPU or the like and a memory such as a RAM, a ROM or the like. The memory stores therein a program to be executed by the CPU, program data and so forth. The program stored in the memory is read into and executed by the CPU, for example, upon activation of the image pickup apparatus 1260. By executing the program, the CPU controls operation of the image pickup apparatus 1260, for example, in response to an operation signal inputted from the user interface unit 1271.

The user interface unit 1271 is connected to the control unit 1270. The user interface unit 1271 includes, for example, a button, a switch and so forth for allowing the user to operate the image pickup apparatus 1260. The user interface unit 1271 detects an operation by the user through the components described to generate an operation signal and outputs the generated operation signal to the control unit 1270.

In the image pickup apparatus 1260 configured in this manner, for example, the image processing unit 1264 may have the functions of the encoding apparatus 10 described hereinabove. In short, the image processing unit 1264 may encode image data by the method described in the foregoing description of the embodiments. By such encoding, the image pickup apparatus 1260 can improve the transmission efficiency and the picture quality.

Further, in the image pickup apparatus 1260 configured in such a manner as described above, for example, the image processing unit 1264 may have the functions of the decoding apparatus 20 described hereinabove. In short, the image processing unit 1264 may decode encoded data by the method described in the foregoing description of the embodiment. By such decoding, the image pickup apparatus 1260 can improve the transmission efficiency and the picture quality.

Other Application Examples

It is to be noted that present technology can be applied to such HTTP streaming as, for example, MPEG DASH or the like in which appropriate data is selected and used in a unit of a segment from among a plurality of encoded data prepared in advance and having resolutions or the like different from each other. In short, also it is possible for such a plurality of encoded data as just described to share information relating to encoding or decoding.

Further, while the foregoing description is directed to examples of an apparatus, a system and so forth to which the present technology is applied, the present technology is not limited to this and can be carried out also as any constitution to be incorporated in such an apparatus as described above or an apparatus that configures such a system as described above, such as, for example, a processor as a system LSI (Large Scale Integration) or the like, a module that uses a plurality of processors or the like, a unit that uses a plurality of modules or the like, a set in which some other function is added to a unit (namely, part of constitutions of an apparatus).

<Video Set>

An example of a case in which the present technology is carried out as a set is described with reference to FIG. 33.

Figure 33:
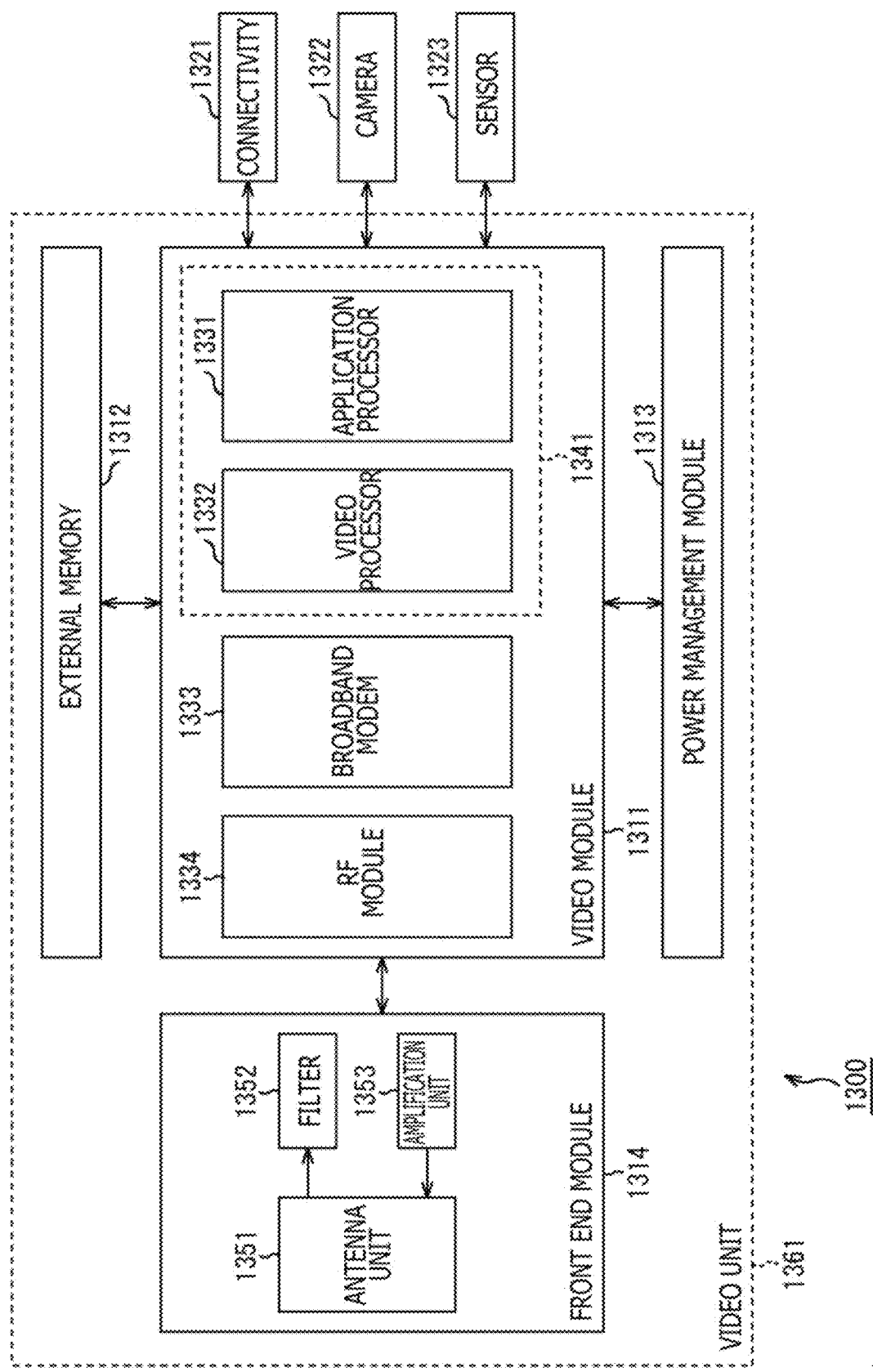
FIG. 33 is a block diagram depicting an example of a schematic configuration of a video set.

FIG. 33 is a view depicting an example of a schematic configuration of a video set to which the present technology is carried out as a set.

In recent years, multifunctionalization of electronic apparatus has been and is proceeding, and in the case where, in development or manufacture, some configuration is carried out as sales, provision or the like, not only a case in which it is carried out as a constitution having one function, but also a case in which a plurality of constitutions having functions associated with each other is combined and carried out as one set having a plurality of functions are found increasingly.

The video set 1300 depicted in FIG. 33 has such a multifunctionalized configuration and is a combination, with a device having a function or functions relating to encoding and/or decoding of an image (one or both of encoding and decoding), a device having some other function relating to the function or functions.

As depicted in FIG. 33, the video set 1300 includes a module group including a video module 1311, an external memory 1312, a power management module 1313, a front end module 1314 and so forth, and a device having relating functions such as a connectivity 1321, a camera 1322, a sensor 1323 and so forth.

A module is a part in which several part functions related to each other are collected such that it has coherent functions. Although a particular physical configuration is arbitrary, for example, a module is conceivable in which electronic circuit elements having individual functions such as a plurality of processors, registers, capacitors and so forth and other devices and so forth are disposed on a wiring board or the like and integrated. Also it is conceivable to combine a module with another module, a process or the like to form a new module.

In the case of the example of FIG. 33, the video module 1311 is a combination of constitutions having functions relating to image processing and includes an application processor 1331, a video processor 1332, a broadband modem 1333 and a RF module 1334.

A processor includes constitutions, which have predetermined functions, integrated on a semiconductor chip by SoC (System On a Chip) and is called, for example, system LSI (Large Scale Integration) or the like. The constitutions having the predetermined functions may be logic circuits (hardware configuration), may be a CPU, a ROM, a RAM and so forth and a program executed using them (software configuration) or may be a combination of both of them. For example, a processor may include a logic circuit and a CPU, a ROM, a RAM and so forth such that part of functions is implemented by the logic circuit (hardware configuration) and other functions are implemented by a program (software configuration) executed by the CPU.

The application processor 1331 of FIG. 33 is a processor that executes an application relating to image processing. The application executed by the application processor 1331 not only can execute, in order to implement predetermined functions, arithmetic operation processing but also can control constitutions inside and outside of the video module 1311 such as, for example, the video processor 1332 and so forth if necessary.

The video processor 1332 is a processor having a function relating to encoding and/or decoding of an image (one or both of encoding and decoding).

The broadband modem 1333 performs digital modulation or the like for data (digital signal) to be transmitted by wired or wireless (or both of wired and wireless) broadband communication performed through a broadband line such as the Internet, a public telephone network or the like to convert the data into an analog signal or converts an analog signal received by such broadband communication to convert the analog signal into data (digital signal). The broadband modem 1333 processes arbitrary information such as, for example, image data to be processed by the video processor 1332, a stream encoded from image data, an application program, setting data or the like.

The RF module 1334 is a module that performs frequency conversion, modulation/demodulation, amplification, filtering and so forth for a RF (Radio Frequency) signal to be transmitted or received through an antenna. For example, the RF module 1334 performs frequency conversion and so forth for a baseband signal generated by the broadband modem 1333 to generate a RF signal. Further, for example, the RF module 1334 performs frequency conversion and so forth for a RF signal received through the front end module 1314 to generate a baseband signal.

It is to be noted that, as indicated by a broken line 1341 in FIG. 33, the application processor 1331 and the video processor 1332 may be integrated so as to be configured as a single processor.

The external memory 1312 is a module provided outside the video module 1311 and having a storage device utilized by the video module 1311. Although the storage device of the external memory 1312 may be implemented by any physical constitution, since generally it is frequently utilized for storage of a large amount of data such as image data of a unit of a frame, it is desirable to implement the storage device by a semiconductor device that is comparatively less expensive and has a large capacity like a DRAM (Dynamic Random Access Memory).

The power management module 1313 manages and controls power supply to the video module 1311 (constitutions in the video module 1311).

The front end module 1314 is a module that provides a front end function (circuit at a transmission/reception end of the antenna side) to the RF module 1334. As depicted in FIG. 33, the front end module 1314 includes, for example, an antenna unit 1351, a filter 1352 and an amplification unit 1353.

The antenna unit 1351 includes an antenna for transmitting and receiving a wireless signal and peripheral constitutions. The antenna unit 1351 transmits a signal supplied from the amplification unit 1353 as a wireless signal and supplies a received wireless signal as an electric signal (RF signal) to the filter 1352. The filter 1352 performs filter processing and so forth for a RF signal received through the antenna unit 1351 and supplies the RF signal after the processing to the RF module 1334. The amplification unit 1353 amplifies the RF signal supplied from the RF module 1334 and supplies the amplified RF signal to the antenna unit 1351.

The connectivity 1321 is a module having functions relating to connection to the outside. The physical configuration of the connectivity 1321 is arbitrary. For example, the connectivity 1321 includes constitutions having a communication function according to a standard other than a communication standard with which the broadband modem 1333 is compatible, external input and output terminals and so forth.

For example, the connectivity 1321 may include a module having a communication function that complies with a wireless communication standard such as Bluetooth (registered trademark), IEEE 802.11 (for example, Wi-Fi (Wireless fidelity, registered trademark)), NFC (Near Field Communication), IrDA (InfraRed Data Association) or the like, an antenna for transmitting and receiving a signal that complies with the standard, and so forth. Further, for example, the connectivity 1321 may include a module having a communication function that complies with a wired communication standard such as USB (Universal Serial Bus), HDMI (registered trademark) (High-Definition Multimedia Interface) or the like, a terminal that complies with the standard and so forth. Furthermore, for example, the connectivity 1321 may include other data (signal) transmission functions such as analog input and output terminals and so forth.

It is to be noted that the connectivity 1321 may include a device of a transmission destination of data (signal). For example, the connectivity 1321 may include a drive for performing reading out and writing of data from and into a recording medium such as a magnetic disk, an optical disk, a magneto-optical disk, a semiconductor memory or the like (including not only a drive for a removable medium but also a hard disk, a SSD (Solid State Drive), a NAS (Network Attached Storage) and so forth). Further, the connectivity 1321 may include an outputting device of an image or sound (a monitor, a speaker or the like).

The camera 1322 is a module having a function for picking up an image of an image pickup object to obtain image data of the image pickup object. Image data obtained by image pickup of the camera 1322 is, for example, supplied to and encoded by the video processor 1332.

The sensor 1323 is a module having an arbitrary sensor function such as, for example, a sound sensor, an ultrasonic sensor, an optical sensor, an illuminance sensor, an infrared sensor, an image sensor, a rotation sensor, an angle sensor, an angular velocity sensor, a speed sensor, an acceleration sensor, an inclination sensor, a magnetic identification sensor, a shock sensor, a temperature sensor and so forth. Data detected by the sensor 1323 is supplied, for example, to the application processor 1331 and is utilized by an application or the like.

The constitution described as a module in the foregoing description may be implemented as a processor, and conversely, the constitution described as a processor may be implemented as a module.

In the video set 1300 having such a configuration as described above, the present technology can be applied to the video processor 1332 as hereinafter described. Accordingly, the video set 1300 can be carried out as a set to which the present technology is applied.

<Example of Configuration of Video Processor>

FIG. 34 is a view depicting an example of a schematic configuration of the video processor 1332 (FIG. 33) to which the present technology is applied.

In the case of the example of FIG. 34, the video processor 1332 has a function for receiving an input of a video signal and an audio signal and encoding them by a predetermined method and a function for decoding encoded video data and audio data and reproducing and outputting a video signal and an audio signal.

As depicted in FIG. 34, the video processor 1332 includes a video input processing unit 1401, a first image scaling unit 1402, a second image scaling unit 1403, a video output processing unit 1404, a frame memory 1405 and a memory controlling unit 1406. The video processor 1332 further includes an encode-decode engine 1407, video ES (Elementary Stream) buffers 1408A and 1408B and audio ES buffers 1409A and 1409B. Furthermore, the video processor 1332 includes an audio encoder 1410, an audio decoder 1411, a multiplexing unit (MUX (Multiplexer)) 1412, a demultiplexing unit (DMUX (Demultiplexer)) 1413 and a stream buffer 1414.

The video input processing unit 1401 acquires a video signal inputted, for example, from the connectivity 1321 (FIG. 33) or the like and converts the video signal into digital image data. The first image scaling unit 1402 performs format conversion, a scaling process of an image and so forth for image data. The second image scaling unit 1403 performs a scaling process of an image in response to a format at an outputting designation through the video output processing unit 1404 and performs format conversion, a scaling process of an image and so forth similar to those by the first image scaling unit 1402 for image data. The video output processing unit 1404 performs format conversion, conversion into an analog signal and so forth for image data and outputs the resulting analog signal as a reproduced video signal, for example, to the connectivity 1321 and so forth.

The frame memory 1405 is a memory for image data shared by the video input processing unit 1401, first image scaling unit 1402, second image scaling unit 1403, video output processing unit 1404 and encode-decode engine 1407. The frame memory 1405 is implemented as a semiconductor memory such as, for example, a DRAM or the like.

The memory controlling unit 1406 receives a synchronizing signal from the encode-decode engine 1407 and controls writing and reading out access to the frame memory 1405 in accordance with an access schedule to the frame memory 1405 written in an access management table 1406A. The access management table 1406A is updated by the memory controlling unit 1406 in response to a process executed by the encode-decode engine 1407, first image scaling unit 1402, second image scaling unit 1403 or the like.

The encode-decode engine 1407 performs an encoding process of image data and a decoding process of a video stream that is encoded data of image data. For example, the encode-decode engine 1407 encodes image data read out from the frame memory 1405 and successively writes the encoded image data as a video stream into the video ES buffer 1408A. Further, for example, the encode-decode engine 1407 successively reads out and decodes a video stream from the video ES buffer 1408B and successively writes the decoded video stream as image data into the frame memory 1405. The encode-decode engine 1407 uses the frame memory 1405 as a working area in such encoding and decoding. Further, the encode-decode engine 1407 outputs a synchronizing signal to the memory controlling unit 1406 at a timing at which, for example, processing for each macro block is to be started.

The video ES buffer 1408A buffers a video stream generated by the encode-decode engine 1407 and supplies the buffered video stream to the multiplexing unit (MUX) 1412. The video ES buffer 1408B buffers a video stream supplied from the demultiplexing unit (DMUX) 1413 and supplies the buffered video stream to the encode-decode engine 1407.

The audio ES buffer 1409A buffers an audio stream generated by the audio encoder 1410 and supplies the buffered audio stream to the multiplexing unit (MUX) 1412. The audio ES buffer 1409B buffers an audio stream supplied from the demultiplexing unit (DMUX) 1413 and supplies the buffered audio stream to the audio decoder 1411.

The audio encoder 1410, for example, digitally converts an audio signal inputted from the connectivity 1321 or the like and encodes the digital audio signal by a predetermined method such as, for example, an MPEG audio method, an AC3 (Audio Code number 3) method or the like. The audio encoder 1410 successively writes an audio stream, which is encoded data of an audio signal, into the audio ES buffer 1409A. The audio decoder 1411 decodes an audio stream supplied from the audio ES buffer 1409B, performs, for example, conversion into an analog signal or the like, and supplies the resulting analog signal as a reproduced audio signal, for example, to the connectivity 1321 or the like.

The multiplexing unit (MUX) 1412 multiplexes a video stream and an audio stream. The method of the multiplexing (namely, the format of a bit stream to be generated by the multiplexing) is arbitrary. Further, upon such multiplexing, also it is possible for the multiplexing unit (MUX) 1412 to add predetermined header information and so forth to the bit stream. In other words, the multiplexing unit (MUX) 1412 can convert the format of the stream by the multiplexing. For example, the multiplexing unit (MUX) 1412 multiplexes a video stream and an audio stream to convert the streams into a transport stream that is a bit stream of a format for transfer. Further, for example, the multiplexing unit (MUX) 1412 multiplexes a video stream and an audio stream to convert them into data of a file format for recording (file data).

The demultiplexing unit (DMUX) 1413 demultiplexes a bit stream, in which a video stream and an audio stream are multiplexed, by a method corresponding to that of the multiplexing by the multiplexing unit (MUX) 1412. In short, the demultiplexing unit (DMUX) 1413 extracts a video stream and an audio stream from a bit stream read out from the stream buffer 1414 (separates a video stream and an audio stream from each other). In short, the demultiplexing unit (DMUX) 1413 can convert the format of a stream by demultiplexing (reverse conversion to the conversion by the multiplexing unit (MUX) 1412). For example, the demultiplexing unit (DMUX) 1413 can convert a transport stream supplied, for example, from the connectivity 1321, broadband modem 1333 or the like into a video stream and an audio stream by acquiring the transport stream through the stream buffer 1414 and demultiplexing the transport stream. Further, for example, the demultiplexing unit (DMUX) 1413 can convert file data read out from various recording media, for example, by the connectivity 1321 into a video stream and an audio stream by acquiring the file data through the stream buffer 1414 and demultiplexing the file data.

The stream buffer 1414 buffers a bit stream. For example, the stream buffer 1414 buffers a transport stream supplied from the multiplexing unit (MUX) 1412 and supplies the buffered transport stream, for example, to the connectivity 1321, broadband modem 1333 and so forth at a predetermined timing or on the basis of a request from the outside or the like.

Further, the stream buffer 1414 buffers file data supplied from the multiplexing unit (MUX) 1412 and supplies the buffered file data, for example, to the connectivity 1321 and so forth at a predetermined timing or on the basis of a request from the outside or the like such that the file data is recorded on various recording media.

Furthermore, the stream buffer 1414 buffers a transport stream acquired, for example, through the connectivity 1321, broadband modem 1333 or the like and supplies the buffered transport stream to the demultiplexing unit (DMUX) 1413 at a predetermined timing or on the basis of a request from the outside or the like.

Further, the stream buffer 1414 buffers file data read out from various recording media, for example, by the connectivity 1321 or the like and supplies the buffered file data to the demultiplexing unit (DMUX) 1413 at a predetermined timing or on the basis of a request from the outside or the like.

Now, an example of operation of the video processor 1332 having such a configuration as described above is described. For example, a video signal inputted from the connectivity 1321 or the like to the video processor 1332 is converted into digital image data of a predetermined method such as a 4:2:2 Y/Cb/Cr method or the like by the video input processing unit 1401 and is successively written into the frame memory 1405. The digital image data are read out into the first image scaling unit 1402 or the second image scaling unit 1403 and subjected to format conversion to that of a predetermined method such as the 4:2:0 Y/Cb/Cr method and a scaling process, and then are written into the frame memory 1405 again. The image data is encoded by the encode-decode engine 1407 and written as a video stream into the video ES buffer 1408A.

Meanwhile, an audio signal inputted from the connectivity 1321 or the like to the video processor 1332 is encoded by the audio encoder 1410 and written as an audio stream into the audio ES buffer 1409A.

The video stream of the video ES buffer 1408A and the audio stream of the audio ES buffer 1409A are read out to and multiplexed by the multiplexing unit (MUX) 1412 such that they are converted into a transport stream, file data or the like. The transport stream generated by the multiplexing unit (MUX) 1412 is buffered by the stream buffer 1414 and then is outputted to an external network, for example, through the connectivity 1321, broadband modem 1333 or the like. Meanwhile, the file data generated by the multiplexing unit (MUX) 1412 is buffered by the stream buffer 1414 and then outputted, for example, to the connectivity 1321 or the like and then recorded into various recording media.

On the other hand, a transport stream inputted from an external network to the video processor 1332, for example, through the connectivity 1321, broadband modem 1333 and so forth is buffered by the stream buffer 1414 and then demultiplexed by the demultiplexing unit (DMUX) 1413. Meanwhile, file data read out from various recording media, for example, by the connectivity 1321 or the like and inputted to the video processor 1332 is buffered by the stream buffer 1414 and then demultiplexed by the demultiplexing unit (DMUX) 1413. In short, a transport stream or file data inputted to the video processor 1332 is demultiplexed into a video stream and an audio stream by the demultiplexing unit (DMUX) 1413.

The audio stream is supplied through the audio ES buffer 1409B to and decoded by the audio decoder 1411 to reproduce an audio signal. Meanwhile, the video stream is successively read out, after written into the video ES buffer 1408B, and decoded by the encode-decode engine 1407 and written into the frame memory 1405. The decoded image data is subjected to a scaling process by the second image scaling unit 1403 and is written into the frame memory 1405. Then, the decoded image data is read out into the video output processing section 1404 and is format converted to a predetermined format such as the 4:2:2 Y/Cb/Cr format, whereafter it is converted into an analog signal and a video signal is reproduced and outputted.

In the case where the present technology is to be applied to the video processor 1332 configured in such a manner as described above, the present technology according to the embodiment described above may be applied to the encode-decode engine 1407. In particular, for example, the encode-decode engine 1407 may have the function of the encoding apparatus 10 or the function of the decoding apparatus 20 described above or both of them. This makes it possible to obtain advantageous effects similar to those of the encoding apparatus 10 or the decoding apparatus 20 of the embodiment described hereinabove.

It is to be noted that, in the encode-decode engine 1407, the present technology (namely, the function of the encoding apparatus 10 or the function of the decoding apparatus 20 or both of them) may be implemented by hardware such as logic circuits or the like or may be implemented by software such as an incorporated program or the like or else may be implemented by both of them.

<Other Examples of Configuration of Video Processor>

FIG. 35 is a view depicting a different example of a schematic configuration of the video processor 1332 to which the present technology is applied.

In the case of the example of FIG. 35, the video processor 1332 has a function for encoding and decoding video data by a predetermined method.

More particularly, as depicted in FIG. 35, the video processor 1332 includes a control unit 1511, a display interface 1512, a display engine 1513, an image processing engine 1514 and an internal memory 1515. The video processor 1332 further includes a codec engine 1516, a memory interface 1517, a multiplexing and demultiplexing unit (MUX DMUX) 1518, a network interface 1519 and a video interface 1520.

The control unit 1511 controls operation of the processing units in the video processor 1332 such as the display interface 1512, display engine 1513, image processing engine 1514, codec engine 1516 and so forth.

As depicted in FIG. 35, the control unit 1511 includes, for example, a main CPU 1531, a sub CPU 1532 and a system controller 1533. The main CPU 1531 executes a program and for forth for controlling operation of the processing units in the video processor 1332. The main CPU 1531 generates a control signal in accordance with the program and so forth and supplies the control signal to the processing units (namely, controls operation of the processing units). The sub CPU 1532 plays an auxiliary role of the main CPU 1531. For example, the sub CPU 1532 executes a child process, a subroutine or the like of the program or the like executed by the main CPU 1531. The system controller 1533 controls operation of the main CPU 1531 and the sub CPU 1532 such as to designate programs to be executed by the main CPU 1531 and the sub CPU 1532 or the like.

The display interface 1512 outputs image data, for example, to the connectivity 1321 and so forth under the control of the control unit 1511. For example, the display interface 1512 converts image data in the form of digital data into an analog signal and outputs the image data as a reproduced video signal, or the image data of digital data as they are, to a monitor apparatus or the like of the connectivity 1321.

The display engine 1513 performs various conversion processes such as format conversion, size conversion, color region conversion and so forth for the image data under the control of the control unit 1511 such that the image data satisfies hardware specifications of a monitor apparatus or the like on which an image of the image data is to be displayed.

The image processing engine 1514 carries out predetermined image processing such as, for example, a filtering process and so forth for picture quality improvement for the image data under the control of the control unit 1511.

The internal memory 1515 is a memory provided in the inside of the video processor 1332 such that it is shared by the display engine 1513, image processing engine 1514 and codec engine 1516. The internal memory 1515 is used for transfer of data performed, for example, between the display engine 1513, image processing engine 1514 and codec engine 1516. For example, the internal memory 1515 stores data supplied from the display engine 1513, image processing engine 1514 or codec engine 1516 and supplies, as occasion demands (for example, in accordance with a request), the data to the display engine 1513, image processing engine 1514 or codec engine 1516. Although this internal memory 1515 may be implemented by any storage device, since it is frequently utilized for storage of a small amount of data such as image data in a unit of a block, parameters or the like, preferably it is implemented by a semiconductor memory that has a comparatively (for example, in comparison with the external memory 1312) small capacity but is high in response speed like, for example, an SRAM (Static Random Access Memory).

The codec engine 1516 performs a process relating to encoding or decoding of image data. The method for encoding and decoding with which the codec engine 1516 is compatible is arbitrary, and the number of such methods may be one or a plural number. For example, the codec engine 1516 may have codec functions of a plurality of encoding and decoding methods and perform encoding of image data or decoding of encoded data by a codec function selected from the codec functions.

In the example depicted in FIG. 35, the codec engine 1516 includes, as functional blocks for processing relating to the codec, for example, an MPEG-2 Video 1541, an AVC/H.264 1542, an HEVC/H.265 1543, an HEVC/H.265 (Scalable) 1544, an HEVC/H.265 (Multi-view) 1545 and an MPEG-DASH 1551.

The MPEG-2 Video 1541 is a functional block that encodes or decodes image data by the MPEG-2 method. The AVC/H.264 1542 is a functional block that encodes or decodes image data by the AVC method. The HEVC/H.265 1543 is a functional block that encodes or decodes image data by the HEVC method. The HEVC/H.265 (Scalable) 1544 is a functional block that scalably encodes or scalably decodes image data by the HEVC method. The HEVC/H.265 (Multi-view) 1545 is a functional block that multi-visually encodes or multi-visually decodes image data by the HEVC method.

The MPEG-DASH 1551 is a functional block for transmitting and receiving image data by the MPEG-DASH (MPEG-Dynamic Adaptive Streaming over HTTP) method. MPEG-DASH is a technology for performing streaming of a video using the HTTP (Hyper Text Transfer Protocol) and has one of characteristics in that appropriate encoded data is selected and transmitted in a unit of a segment from among a plurality of encoded data that are prepared in advance and are different from each other in resolution and so forth. The MPEG-DASH 1551 performs generation of a stream that complies with the standard, transmission control of the stream and so forth, and for encoding and decoding of image data, the MPEG-2 Video 1541 to HEVC/H.265 (Multi-view) 1545 described above are utilized.

The memory interface 1517 is an interface for the external memory 1312. Data supplied from the image processing engine 1514 or the codec engine 1516 is supplied to the external memory 1312 through the memory interface 1517. Meanwhile, data read out from the external memory 1312 is supplied to the video processor 1332 (image processing engine 1514 or codec engine 1516) through the memory interface 1517.

The multiplexing and demultiplexing unit (MUX DMUX) 1518 performs multiplexing and demultiplexing of various data relating to an image such as a bit stream of encoded data, image data, a video signal and so forth. The method for the multiplexing and demultiplexing is arbitrary. For example, upon multiplexing, the multiplexing and demultiplexing unit (MUX DMUX) 1518 not only can collect a plurality of data into one data but also can add predetermined header information and so forth to the data. Further, upon demultiplexing, the multiplexing and demultiplexing unit (MUX DMUX) 1518 not only can divide one data into a plurality of data but also can add predetermined header information and so forth to the divisional data. In short, the multiplexing and demultiplexing unit (MUX DMUX) 1518 can convert the data format by multiplexing and demultiplexing. For example, the multiplexing and demultiplexing unit (MUX DMUX) 1518 can multiplex bit streams to convert them into a transport stream that is a bit stream of a format for transfer or data of a file format for recording (file data). Naturally, the multiplexing and demultiplexing unit (MUX DMUX) 1518 can perform inverse conversion by demultiplexing.

The network interface 1519 is an interface, for example, for the broadband model 1333, connectivity 1321 and so forth. The video interface 1520 is an interface, for example, for the connectivity 1321, camera 1322 and so forth.

Now, an example of operation of such a video processor 1332 as described above is described. For example, if a transport stream is received from an external network through the connectivity 1321, broadband modem 1333 or the like, then the transport stream is supplied through the network interface 1519 to and demultiplexed by the multiplexing and demultiplexing unit (MUX DMUX) 1518 and then is decoded by the codec engine 1516. Image data obtained by decoding of the codec engine 1516 is subjected, for example, to predetermined image processing by the image processing engine 1514 and is supplied, for example, to the connectivity 1321 or the like through the display interface 1512 such that an image thereof is displayed on the monitor. Meanwhile, for example, image data obtained by decoding of the codec engine 1516 is re-encoded by the codec engine 1516 and multiplexed by the multiplexing and demultiplexing unit (MUX DMUX) 1518 such that it is converted into file data. The file data is outputted to the connectivity 1321 or the like through the video interface 1520 and is recorded on various recording media.

Furthermore, file data of encoded data, which are encoded image data, read out from a recording medium not depicted, for example, by the connectivity 1321 or the like are supplied through the video interface 1520 to and demultiplexed by the multiplexing and demultiplexing unit (MUX DMUX) 1518, whereafter they are decoded by the codec engine 1516. Image data obtained by the decoding of the codec engine 1516 are subjected to predetermined image processing by the image processing engine 1514 and further to predetermined conversion by the display engine 1513, whereafter they are supplied through the display interface 1512, for example, to the connectivity 1321 or the like such that an image thereof is displayed on the monitor. Meanwhile, for example, image data obtained by decoding of the codec engine 1516 are re-encoded by the codec engine 1516 and multiplexed by the multiplexing and demultiplexing unit (MUX DMUX) 1518 such that they are converted into a transport stream. The transport stream is supplied, for example, to the connectivity 1321, broadband modem 1333 and so forth through the network interface 1519 and transmitted to a different apparatus not depicted.

It is to be noted that transfer of image data or other data between the processing units in the video processor 1332 is performed utilizing, for example, the internal memory 1515 or the external memory 1312. Further, the power management module 1313 controls power supply, for example, to the control unit 1511.

In the case where the present technology is applied to the video processor 1332 configured in such a manner as described above, the present technology according to the embodiment described hereinabove may be applied to the codec engine 1516. In short, for example, the codec engine 1516 may have the function of the encoding apparatus 10 or the function of the decoding apparatus 20 described above or both of them. By this, advantageous effects similar to those of the encoding apparatus 10 and the decoding apparatus 20 described hereinabove can be achieved.

It is to be noted that, in the codec engine 1516, the present technology (namely, the functions of the encoding apparatus 10 and the decoding apparatus 20) may be implemented by hardware such as logic circuits and so forth, may be implemented by software such as an embedded program or the like or may be implemented by both of them.

While two examples of the configuration of the video processor 1332 are exemplified above, the configuration of the video processor 1332 is arbitrary and may be any other than the two examples described above. Further, although this video processor 1332 may be configured as a single semiconductor chip, it may otherwise be configured as a plurality of semiconductor chips. For example, the video processor 1332 may be, for example, a three-dimensional layered LSI in which a plurality of semiconductors are stacked. Further, the video processor 1332 may be implemented by a plurality of LSIs.

<Example of Application to Apparatus>

The video set 1300 can be incorporated into various apparatus that process image data. For example, the video set 1300 can be incorporated into the television apparatus 1200 (FIG. 29), portable telephone set 1220 (FIG. 30), recording and reproduction apparatus 1240 (FIG. 31), image pickup apparatus 1260 (FIG. 32) and so forth. By incorporating the video set 1300, the apparatus can achieve advantageous effects similar to those of the encoding apparatus 10 or the decoding apparatus 20 described hereinabove.

It is to be noted that even part of the constitutions of the video set 1300 described above can be carried out as the configuration to which the present technology is applied if it includes the video processor 1332. For example, only the video processor 1332 can be carried out as a video processor to which the present technology is applied. Further, for example, the processor indicated by the broke line 1341, the video module 1311 or the like can be carried out as a processor, a module or the like to which the present technology is applied as described hereinabove. Furthermore, for example, the video module 1311, external memory 1312, power management module 1313 and front end module 1314 can be combined such that they are carried out as a video unit 1361 to which the present technology is applied. In the case of any configuration, advantageous effects similar to those of the encoding apparatus 10 or decoding apparatus 20 described above can be achieved.

In short, any configuration can be incorporated into various apparatus that process image data similarly as in the case of the video set 1300 if the configuration includes the video processor 1332. For example, the video processor 1332, processor indicated by the broken line 1341, video module 1311, or video unit 1361 can be incorporated into the television apparatus 1200 (FIG. 29), portable telephone set 1220 (FIG. 30), recording and reproduction apparatus 1240 (FIG. 31), image pickup apparatus 1260 (FIG. 32) and so forth. Thus, by incorporating any of the configurations to which the present technology is applied, the apparatus can achieve advantageous effects similar to those of the encoding apparatus 10 or the decoding apparatus 20 described hereinabove similarly as in the case of the video set 1300.

It is to be noted that the embodiment of the present technology is not limited to the embodiment described hereinabove but can be altered in various manners without departing from the subject matter of the present technology.

For example, in the present specification, the term system signifies a set of plural constitutions (apparatus, modules (parts) and so forth) and does not matter whether or not all constitutions are placed in a same housing. Accordingly, both of a plurality of apparatus that are accommodated in separate housings and are connected to each other by a network and one apparatus in which a plurality of modules are accommodated in one housing are systems.

Further, for example, a constitution described as one apparatus (or one processing unit) may be divided and configured as a plurality of apparatus (or processing units). Conversely, constitutions described as a plurality of apparatus (or processing units) in the foregoing description may be collected such that they are configured as one apparatus (processing unit). Further, a constitution other than those may naturally be added to the configuration of each apparatus (or each processing unit). Furthermore, if a constitution or operation as an entire system is substantially same, then part of constitutions of a certain apparatus (or a certain processing unit) may be included in constitutions of a different apparatus (or a difference processing unit).

Further, for example, the present technology can assume a configuration for cloud computing in which one function is shared and processed in cooperation by a plurality of apparatus through a network.

Further, for example, the program described hereinabove can be executed by an arbitrary apparatus. In this case, the apparatus may be configured such that it has necessary functions (functional blocks and so forth) and can acquire necessary information.

Further, for example, the steps described in connection with the flow charts described hereinabove can be executed by one apparatus and further can be shared and executed by a plurality of apparatus. Furthermore, in the case where a plurality of processes are included in one step, the plurality of processes included in the one step can be executed by one apparatus and also can be shared and executed by a plurality of apparatus.

It is to be noted that the program to be executed by the computer may be of the type by which the processes at steps by which the program is described are executed in a time series in the order as described in the present specification or of the type by which the processes are executed in parallel or executed individually at necessary timings such as when the process is called. In short, the processes at the steps may be executed in an order different from the order described hereinabove unless inconsistency occurs. Furthermore, the processes at the steps by which the program is executed may be executed in parallel to processes of a different program or may be executed in combination with processes of a different apparatus.

It is to be noted that the plurality of present technologies described in the present specification can individually be carried out solely and independently of each other unless inconsistency occurs. Naturally, also it is possible to carry out an arbitrary plurality of present technologies in combination. For example, also it is possible to carry out the present technology described in the description of any embodiment in combination with the present technology described in the description of a different embodiment. Also it is possible to carry out an arbitrary one of the present technologies described hereinabove in combination with a different technology that is not described hereinabove.

It is to be noted that the advantageous effects described in the present specification are exemplary to the last and are not restrictive, and other advantageous effects may be applicable.

It is to be noted that the present technology can take the following configurations.

<1>

An encoding apparatus, including:

an encoding unit configured to encode an input image by a non-reversible encoding method;

a database in which a plurality of texture components are registered; and a transmission unit configured to transmit identification information for identifying match components that are, from among the plurality of texture components registered in the database, the texture components that match with the input image and encoded data obtained by encoding the input image.

<2>

The encoding apparatus according to <1>, in which bases of the texture components obtained by converting the texture components each into a basis are registered in the database.

<3>

The encoding apparatus according to <2>, further including:

a separation unit configured to separate a low frequency component of the input image from the input image;

a basis synthesis unit configured to generate, in regard to each of the plurality of texture components registered in the database, a restoration component that restores a texture component of the input image by basis synthesis in which the low frequency component of the input image and the basis of the texture component are used; and a match component determination unit configured to determine, as the match component, the restoration component whose error with respect to the input image is in the minimum from among the restoration components individually generated in regard to the plurality of texture components registered in the database.

<4>

The encoding apparatus according to <2>, further including:

a decoding unit configured to decode the encoded data into a decoded image;

a basis synthesis unit configured to generate, in regard to each of the plurality of texture components registered in the database, a restoration component that restores the texture component of the input image by basis synthesis in which the decoded image and the basis of the texture component are used; and a match component determination unit configured to determine, as the match component, the restoration component whose error with respect to the input image is in the minimum from among the restoration components individually generated in regard to the plurality of texture components registered in the database.

<5>

The encoding apparatus according to any one of <2> to <4>, further including:

a data transmission unit configured to transmit data of the database in response to a request from a decoding apparatus that decodes the encoded data.

<6>

The encoding apparatus according to any one of <2> to <4>, further including:

an updating unit configured to acquire data from a server and update the database.

<7>

The encoding apparatus according to any one of <2> to <6>, further including:

a registration unit configured to register a basis of the texture component into the database.

<8>

The encoding apparatus according to <7>, in which the registration unit temporarily registers the basis of the texture component of the input image as a basis of a new texture component into the database, and definitively registers the basis of the new texture component where a given condition is satisfied.

<9>

The encoding apparatus according to <8>, in which the registration unit definitively registers the basis of the new texture component into the database taking it as the given condition that:

an S/N (Signal to Noise ratio) of the match component where the basis of the new texture component is registered in the database with respect to the input image is superior by a fixed value or more to an S/N of the match component where the basis of the new texture component is not registered in the database with respect to the input image; or that an RD (Rate-Distortion) curve where the basis of the new texture component is registered in the database is superior by a fixed value or more to an RD curve where the basis of the new texture components is not registered in the database.

<10>

The encoding apparatus according to <8> or <9>, in which, where an error of the match component where the basis of the new texture component is not registered in the database with respect to the input image is equal to or greater than a threshold value, the registration unit temporarily registers a basis of the texture component of the input image as a basis of the new texture component into the database.

<11>

The encoding apparatus according to any one of <1> to <10>, in which the encoding unit encodes a difference between the input image and the match component.

<12>

An encoding method, including:

encoding an input image by a non-reversible encoding method; and transmitting identification information for identifying a match component that is a texture component that matches with the input image from among a plurality of texture components registered in a database in which the plurality of texture components are registered and encoded data obtained by encoding the input image.

<13>

A decoding apparatus, including:

a reception unit configured to receive encoded data obtained by encoding an input image by a non-reversible encoding method and identification information for identifying a match component that is a texture component that matches with the input image;

a decoding unit configured to decode the encoded data into a decoded image;

a database in which a plurality of texture components are registered; and a synthesis unit configured to synthesize the texture component as the match component identified by the identification information from among the plurality of texture components registered in the database and the decoded image.

<14>

The decoding apparatus according to <13>, in which bases of the texture components obtained by converting the texture components are registered in the database.

<15>

The decoding apparatus according to <14>, further including:

a basis synthesis unit configured to generate a restoration component that restores the match component by basis synthesis in which the decoded image or a low frequency component of the decoded image and a basis of the match component are used; and in which the synthesis unit synthesizes the restoration component and the decoded image.

<16>

The decoding apparatus according to <14> or <15>, further including:

an updating unit configured to request an encoding apparatus, which encodes the input image, and acquire data to be registered into the database to update the database.

<17>

The decoding apparatus according to <14> or <15>, further including:

an updating unit configured to acquire data from a server to update the database.

<18>

A decoding method, including:

receiving encoded data obtained by encoding an input image by a non-reversible encoding method and identification information for identifying a match component that is a texture component that matches with the input image;

decoding the encoded data into a decoded image; and synthesizing the texture component as the match component identified by the identification information from among a plurality of texture components registered in a database in which the plurality of texture components are registered and the decoded image.

REFERENCE SIGNS LIST

10 Encoding apparatus, 11 Texture component extraction unit, 12 Removal unit, 13 Encoding unit, 20 Decoding apparatus, 21 Decoding unit, 11 Texture component restoration unit, 23 Synthesis unit, 30 Encoding apparatus, 31 Texture DB, 32 Texture component acquisition unit, 33

Removal unit, 34 Encoding unit, 35 Transmission unit, 40 Decoding apparatus, 41 Reception unit, 42 Decoding unit, 43 Texture DB, 44 Texture component acquisition unit, 45 Synthesis unit, 50 Encoding apparatus, 51 Texture DB, 52 Separation unit, 53 Basis synthesis unit, 54 Match component determination unit, 55 Removal unit, 56 Encoding unit, 57 Transmission unit, 60 Decoding apparatus, 61 Reception unit, 62 Decoding unit, 63 Texture DB, 64 Basis synthesis unit, 65 Separation unit, 66 Synthesis unit, 81 Decoding unit, 101 Data transmission unit, 111, 121, 131 Updating unit, 141, 141 Server, 151 Registration unit, 161 Basis learning unit, 162 Registration decision unit

The invention claimed is:

1. An encoding apparatus, comprising:
   an encoding unit configured to encode an input image by a non-reversible encoding method, wherein encoded data is obtained by encoding the input image;
   a database configured to:
      register a plurality of texture components; and
      register a plurality of bases of the plurality of texture components, wherein the plurality of bases is obtained based on conversion of each texture component of the plurality of texture components into a basis;
   a decoding unit configured to decode the encoded data into a decoded image;
   a basis synthesis unit configured to generate a restoration component for each texture component of the plurality of texture components registered in the database, wherein
   the restoration component restores a texture component of the input image, and
   the restoration component is generated based on a basis synthesis in which the decoded image and a basis of a texture component of the plurality of texture components are used;
   a match component determination unit configured to determine, as a match component, the restoration component whose error with respect to the input image is minimum from among a plurality of restoration components generated for the plurality of texture components registered in the database; and
   a transmission unit configured to transmit identification information and the encoded data, wherein
   the identification information is for identification of the match component from among the plurality of texture components registered in the database, and
   the match component is a texture component that matches with the input image.

2. The encoding apparatus according to claim 1, further comprising:
   a data transmission unit configured to transmit data of the database based on a request from a decoding apparatus that decodes the encoded data.

3. The encoding apparatus according to claim 1, further comprising:
   an updating unit configured to:
      acquire data from a server; and
      update the database.

4. The encoding apparatus according to claim 1, further comprising
   a registration unit configured to register the basis of the texture component of the plurality of texture components of the input image into the database.

5. The encoding apparatus according to claim 4, wherein the registration unit is further configured to:
   temporarily register the basis of the texture component of the plurality of texture components of the input image as a basis of a new texture component into the database; and
   definitively register the basis of the new texture component based on satisfaction of a given condition.

6. The encoding apparatus according to claim 5, wherein the given condition is one of:
   an S/N (Signal to Noise ratio) of the match component where the basis of the new texture component is registered in the database with respect to the input image is superior by a first fixed value or more to an S/N of the match component where the basis of the new texture component is not registered in the database with respect to the input image; or
   an RD (Rate-Distortion) curve where the basis of the new texture component is registered in the database is superior by a second fixed value or more to an RD curve where the basis of the new texture component is not registered in the database.

7. The encoding apparatus according to claim 5, wherein, based on an error of the match component where the basis of the new texture component is not registered in the database with respect to the input image that is equal to or greater than a threshold value, the registration unit is further configured to temporarily register the basis of the texture component of the plurality of texture components of the input image as the basis of the new texture component into the database.

8. The encoding apparatus according to claim 1, wherein the encoding unit is further configured to encode a difference between the input image and the match component.

9. An encoding method, comprising:
   encoding an input image by a non-reversible encoding method, wherein encoded data is obtained by encoding the input image;
   decoding the encoded data into a decoded image;
   generating a restoration component for each texture component of a plurality of texture components registered in a database, wherein
   a plurality of bases of the plurality of texture components is registered in the database,
   the plurality of bases is obtained based on conversion of each texture component of the plurality of texture components into a basis,
   the restoration component restores a texture component of the input image, and
   the restoration component is generated based on a basis synthesis in which the decoded image and a basis of a texture component of the plurality of texture components are used;
   determining, as a match component, the restoration component whose error with respect to the input image is minimum from among a plurality of restoration components generated for the plurality of texture components registered in the database; and
   transmitting identification information and the encoded data, wherein
   the identification information is for identification of the match component from among the plurality of texture components registered in the database, and
   the match component is a texture component that matches with the input image.

10. A decoding apparatus, comprising:
    a reception unit configured to receive encoded data and identification information from an encoding apparatus, wherein the encoded data is obtained by encoding an input image by a non-reversible encoding method, the identification information is for identification of a match component that is a texture component that matches with the input image, the match component corresponds to a restoration component whose error with respect to the input image is minimum from among a plurality of restoration components generated for a plurality of texture components, the plurality of restoration components is generated by the encoding apparatus based on a first basis synthesis in which a first decoded image and a basis of a texture component of the plurality of texture components are used, the encoded data is decoded into the first decoded image by the encoding apparatus, and the restoration component restores a texture component of the input image;

a decoding unit configured to decode the encoded data into a second decoded image;

a database configured to:
  register the plurality of texture components; and
  register a plurality of bases of the plurality of texture components, wherein the plurality of bases is obtained based on conversion of each texture component of the plurality of texture components into a basis; and a synthesis unit configured to synthesize the second decoded image and the match component, wherein the match component is identified from among the plurality of texture components registered in the database, and the match component is identified by the identification information.

11. The decoding apparatus according to claim 10, further comprising
a basis synthesis unit configured to generate a restored component based on a second basis synthesis in which the second decoded image or a low frequency component of the second decoded image and a basis of the match component are used,
wherein the synthesis unit is further configured to synthesize the restored component and the second decoded image.

12. The decoding apparatus according to claim 10, further comprising
an updating unit configured to:
  request the encoding apparatus, which encodes the input image; and
  acquire data to be registered into the database to update the database.

13. The decoding apparatus according to claim 10, further comprising
an updating unit configured to acquire data from a server to update the database.

14. A decoding method, comprising:
receiving encoded data and identification information from an encoding apparatus, wherein
the encoded data is obtained by encoding an input image by a non-reversible encoding method;
the identification information is for identification of a match component that is a texture component that matches with the input image;
the match component corresponds to a restoration component whose error with respect to the input image is minimum from among a plurality of restoration components generated for a plurality of texture components registered in a database,
a plurality of bases of the plurality of texture components is registered in the database,
the plurality of bases is obtained based on conversion of each texture component of the plurality of texture components into a basis,
the plurality of restoration components is generated by the encoding apparatus based on a basis synthesis in which a first decoded image and a basis of a texture component of the plurality of texture components registered in the database are used,
the encoded data is decoded into the first decoded image by the encoding apparatus, and
the restoration component restores a texture component of the input image;
decoding the encoded data into a second decoded image; and
synthesizing the second decoded image and the match component, wherein
the match component is identified from among the plurality of texture components registered in the database, and
the match component is identified by the identification information.

15. An encoding apparatus, comprising:
an encoding unit configured to encode an input image by a non-reversible encoding method;
a database configured to:
  register a plurality of texture components; and
  register a plurality of bases of the plurality of texture components, wherein the plurality of bases is obtained based on conversion of each texture component of the plurality of texture components into a basis;
a separation unit configured to separate a low frequency component of the input image from the input image;
a basis synthesis unit configured to generate a restoration component for each texture component of the plurality of texture components registered in the database, wherein
the restoration component restores a texture component of the input image, and
the restoration component is generated based on a basis synthesis in which the low frequency component of the input image and a basis of a texture component of the plurality of texture components are used;
a match component determination unit configured to determine, as a match component, the restoration component whose error with respect to the input image is minimum from among a plurality of restoration components generated for the plurality of texture components registered in the database; and
a transmission unit configured to transmit identification information and encoded data, wherein
the identification information is for identification of the match component from among the plurality of texture components registered in the database,
the match component is a texture component that matches with the input image, and
the encoded data is obtained by encoding the input image.

* * * * *